(12) United States Patent
Geller et al.

(10) Patent No.: US 6,300,948 B1
(45) Date of Patent: *Oct. 9, 2001

(54) METHODS AND SYSTEMS FOR USER INTERFACES AND CONSTRAINT HANDLING IN CONFIGURATION SOFTWARE

(76) Inventors: Scott D. Geller, 24 Normandy Ct., Atlanta, GA (US) 30324; Michael S. Heyda, 5049 Old Ivy Rd., Duluth, GA (US) 30136; Robert Nees, 363 Wooten Dr., Canton, GA (US) 30114

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,852

(22) Filed: Nov. 25, 1998

Related U.S. Application Data

(63) Continuation of application No. 08/718,645, filed on Sep. 17, 1996, now Pat. No. 5,844,554.

(51) Int. Cl.[7] ................................................ G06F 13/00
(52) U.S. Cl. ........................ 345/333; 345/335; 345/347; 345/962
(58) Field of Search .................... 345/326, 333, 345/335, 339, 342, 343, 347, 348, 962, 964, 965, 967, 970; 705/1–4, 26, 27, 28, 29

(56) References Cited

U.S. PATENT DOCUMENTS

| | | |
|---|---|---|
| 4,591,983 | 5/1986 | Bennett et al. .................. 706/53 |
| 4,688,195 | 8/1987 | Thompson et al. ............... 706/11 |
| 4,920,499 | 4/1990 | Skeirik ........................... 706/11 |

(List continued on next page.)

OTHER PUBLICATIONS

The advertising brochure "Trilogy PriceBuilder", Trilogy Development, Inc. The date of availability of this brochure and of the described item is not known, but is believed to be more than one year before the filing date of the present application.

The advertising brochure "SC Config",Trilogy Development, Inc. The date of availability of this brochure and of the described item is not known, but is believed to be more than one year before the filing date of the present application.

(List continued on next page.)

*Primary Examiner*—Ba Huynh
(74) *Attorney, Agent, or Firm*—Morris, Manning & Martin, LLP

(57) ABSTRACT

A computer implemented method of generating a user product configuration program module from a development environment. The user product configuration program module includes user controls that allow user input of information for use in configuration computations. Methods are disclosed for creating and maintaining the logic for a configuration program module in the form of configuration parameters; creating and maintaining the visual controls and user interface; and linking created visual controls with underlying structure represented by the parameters. Parameters assume values and are indicated as valid or invalid through operation of constraints and queries. Further methods include display of parameter creation and selection windows, and query creation and selection windows for creating SQL queries to access data in external tables. Parameters, queries, and constraints can be displayed in expandable and collapsible hierarchies, and quickly utilized in formulas, queries, and logical expressions by clicking in an expanded hierarchical display. Dependencies occurring in the underlying configuration logic are evaluated in both the forward and reverse direction so as to provide for very fast execution of the resultant configuration program module when a user provides new data via a user control.

7 Claims, 49 Drawing Sheets

U.S. PATENT DOCUMENTS

| | | | | |
|---|---|---|---|---|
| 4,992,940 | | 2/1991 | Dworkin | 705/26 |
| 5,032,989 | | 7/1991 | Tornetta | 705/1 |
| 5,212,634 | | 5/1993 | Washizaki et al. | 364/400 |
| 5,228,116 | | 7/1993 | Harris et al. | 706/50 |
| 5,260,866 | | 11/1993 | Lisinski et al. | 705/29 |
| 5,267,146 | | 11/1993 | Shimizu et al. | 395/500.01 |
| 5,307,260 | | 4/1994 | Watanabe et al. | 395/500.23 |
| 5,307,261 | | 4/1994 | Maki et al. | 705/29 |
| 5,311,424 | | 5/1994 | Mukherjee et al. | 705/29 |
| 5,367,627 | | 11/1994 | Johnson | 345/357 |
| 5,369,732 | | 11/1994 | Lynch et al. | 706/46 |
| 5,446,653 | | 8/1995 | Miller et al. | 705/4 |
| 5,471,596 | | 11/1995 | Brown, III | 707/103 |
| 5,493,490 | | 2/1996 | Johnson | 705/26 |
| 5,515,269 | | 5/1996 | Willis et al. | 705/29 |
| 5,515,524 | | 5/1996 | Lynch et al. | 395/500.34 |
| 5,523,942 | | 6/1996 | Tyler et al. | 705/4 |
| 5,630,025 | * | 5/1997 | Dolby et al. | 706/46 |
| 5,745,765 | | 4/1998 | Paseman | 395/701 |
| 5,825,651 | | 10/1998 | Gupta et al. | 364/468.09 |
| 5,877,966 | * | 3/1999 | Morris et al. | 395/500.05 |

OTHER PUBLICATIONS

The advertising brochure "selling Point™", Concentra Corporation, Burlington, MA. Except for the copyright notice date of 1995 printed on the brochure, the date of availability of this brochure and of the described item is not known.

The advertising brochure "SalesLogic™", OBJIX System Development, Inc. Except for the copyright notice date of 1996 printed on the brochure, the date of availability of this brochure and of the described item is not known.

The advertising brochure "CLASSYS", Antalys. The date of availability of this brochure and of the described item is not known.

A CD–ROM identified as "Calico Demos", Calico Technology, Inc., San Jose, California. The date of availability of Calico Technology's configurator software is not known, but is believed to be more than one year before the filing date of the present application.

* cited by examiner

Prior art interpreted engine configuration software

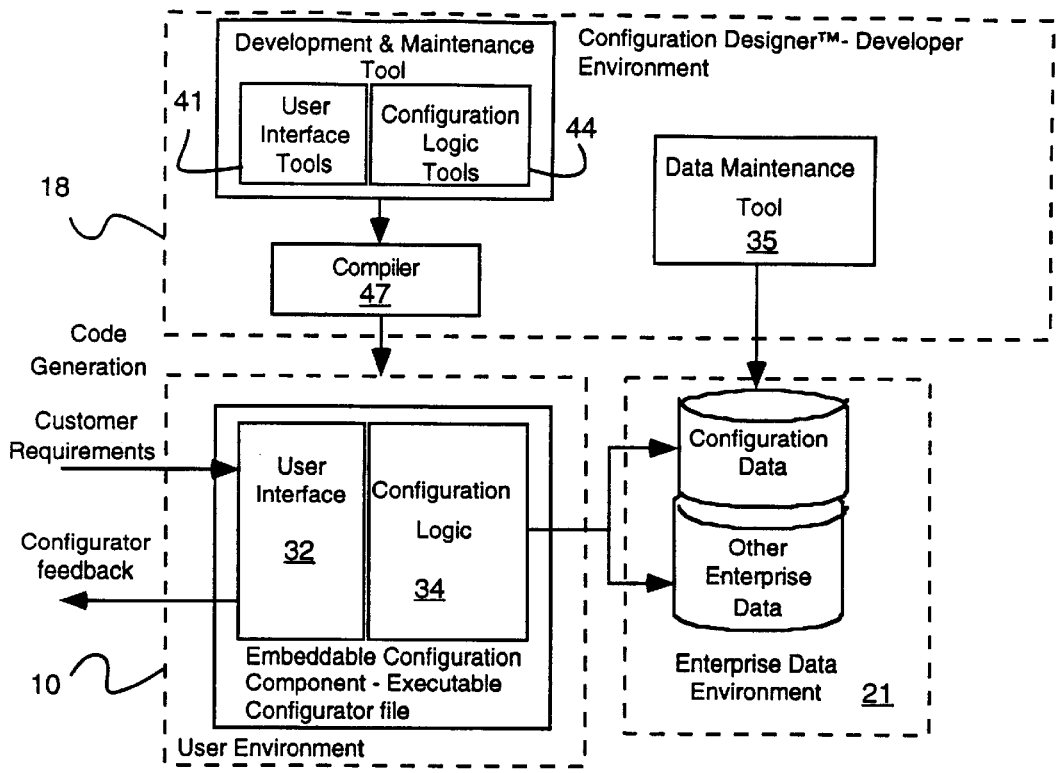
FIG. 3  Preferred embodiment-component based configurator architecture
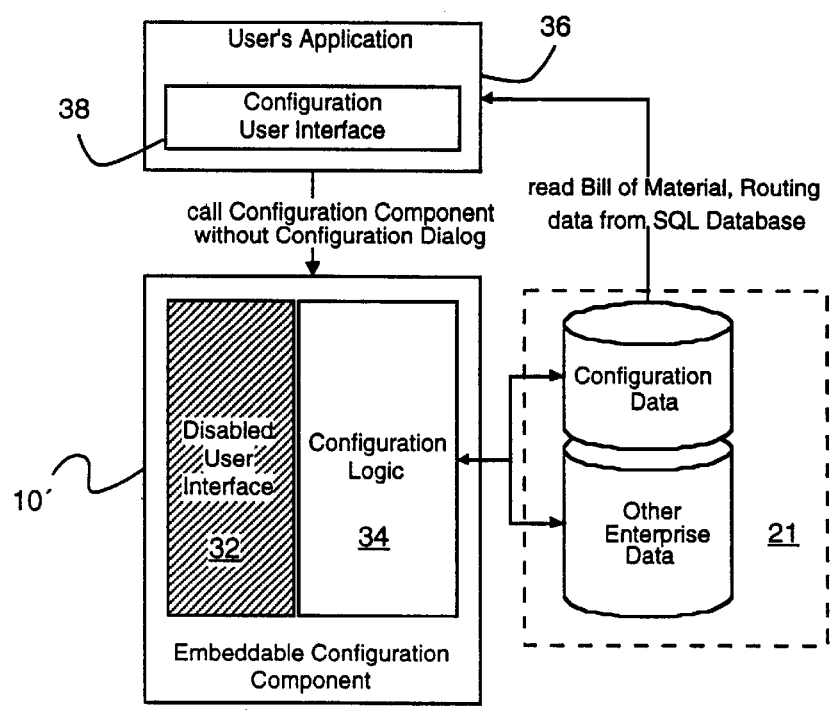
FIG. 4  Alternative embodiment-disabled user interface

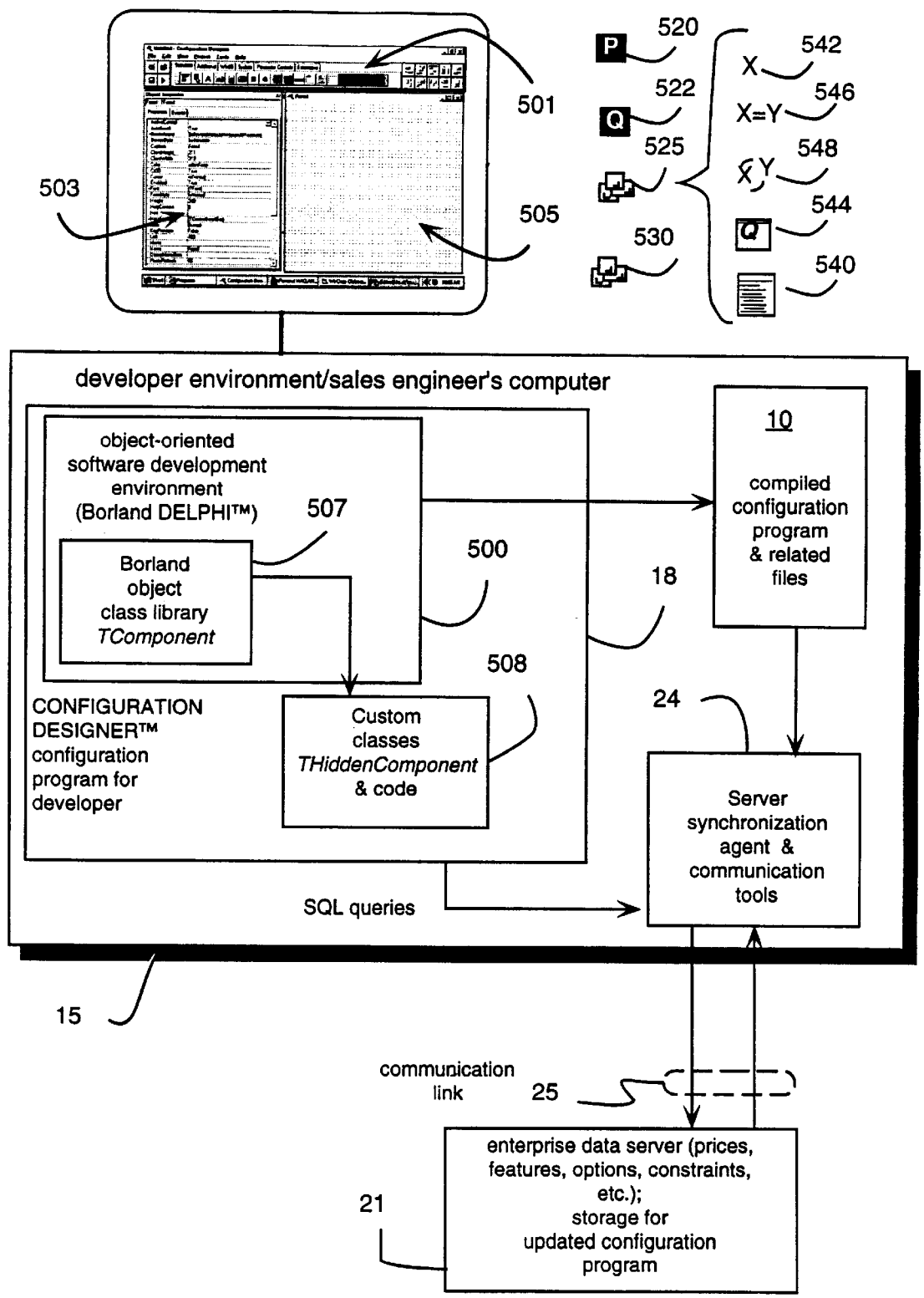
FIG. 5  Architecture of preferred configuration software

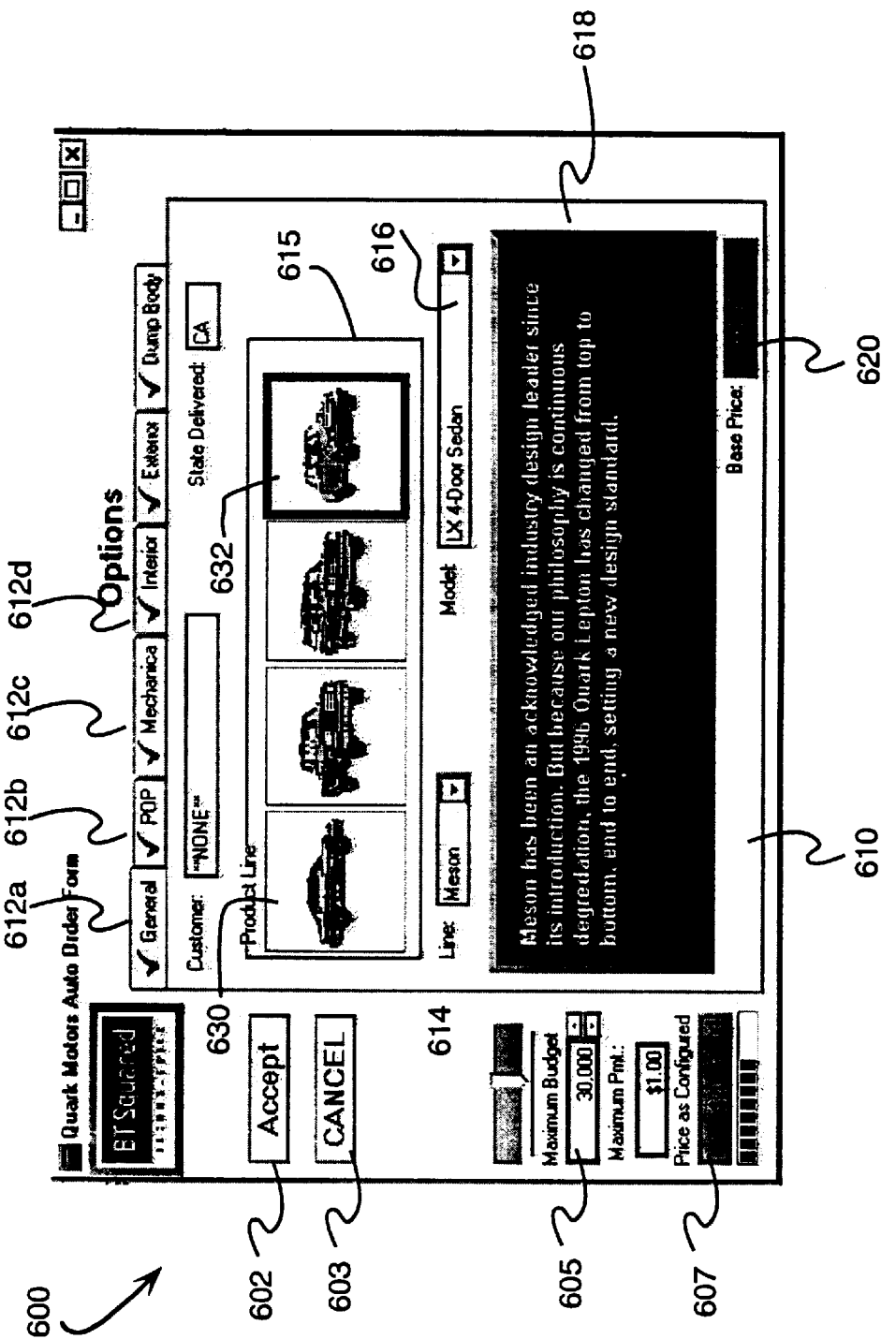
FIG. 6  Example automotive configuration, user mode, main screen

FIG. 7 Example configuration, mechanical tab display (subscreen)

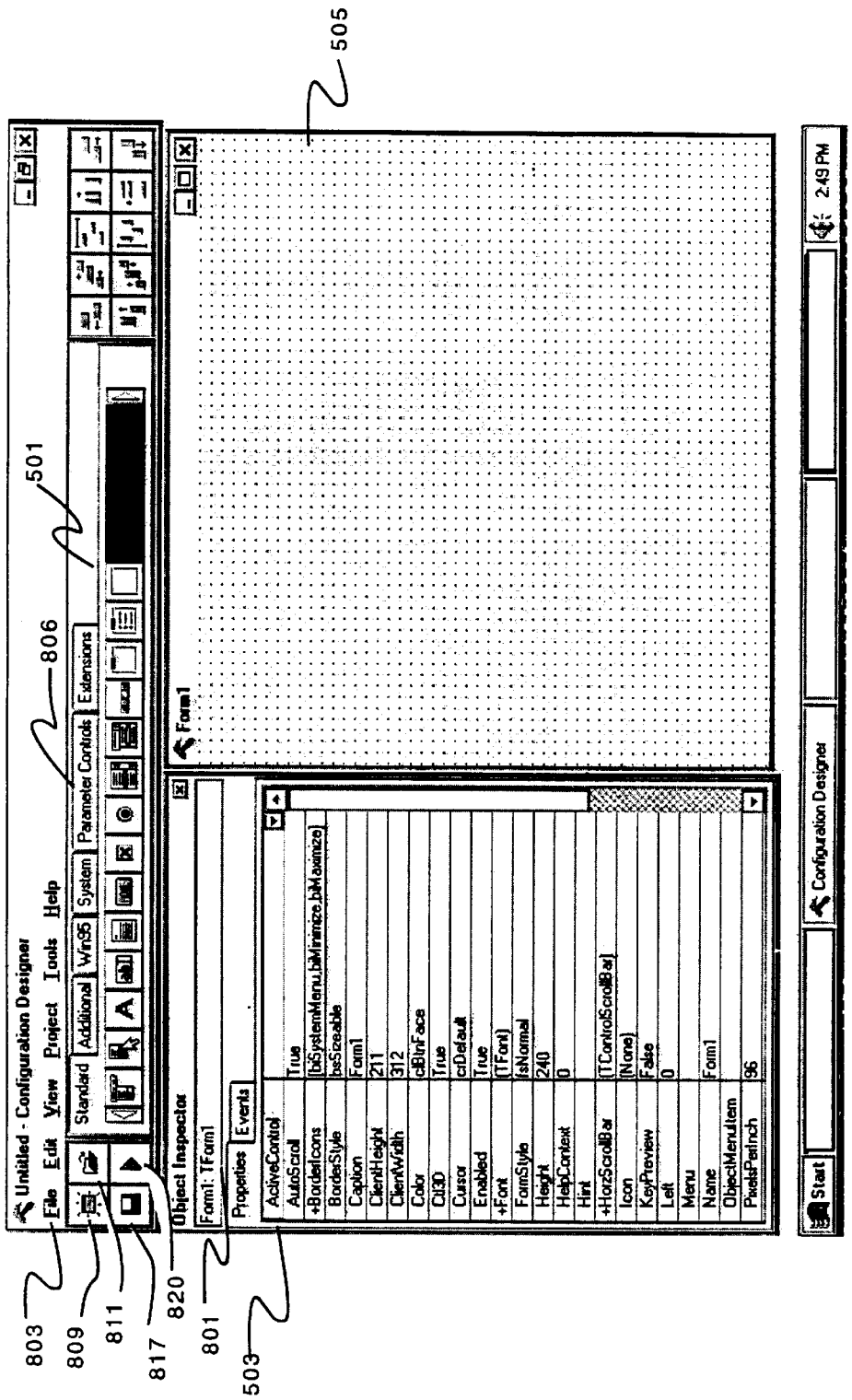
FIG. 8    Developer environment with new user screen

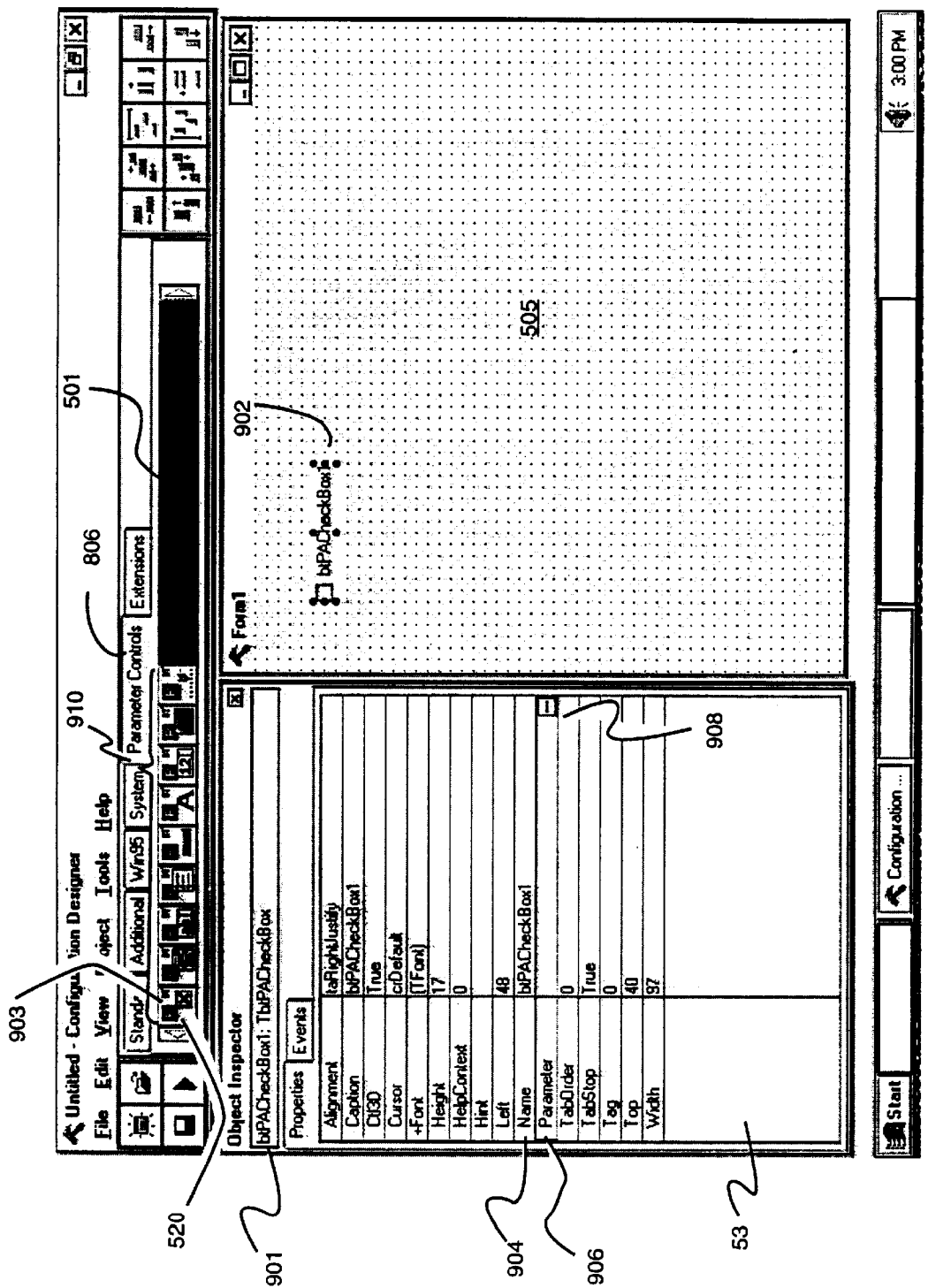
FIG. 9    Example new user screen, with new checkbox user control added

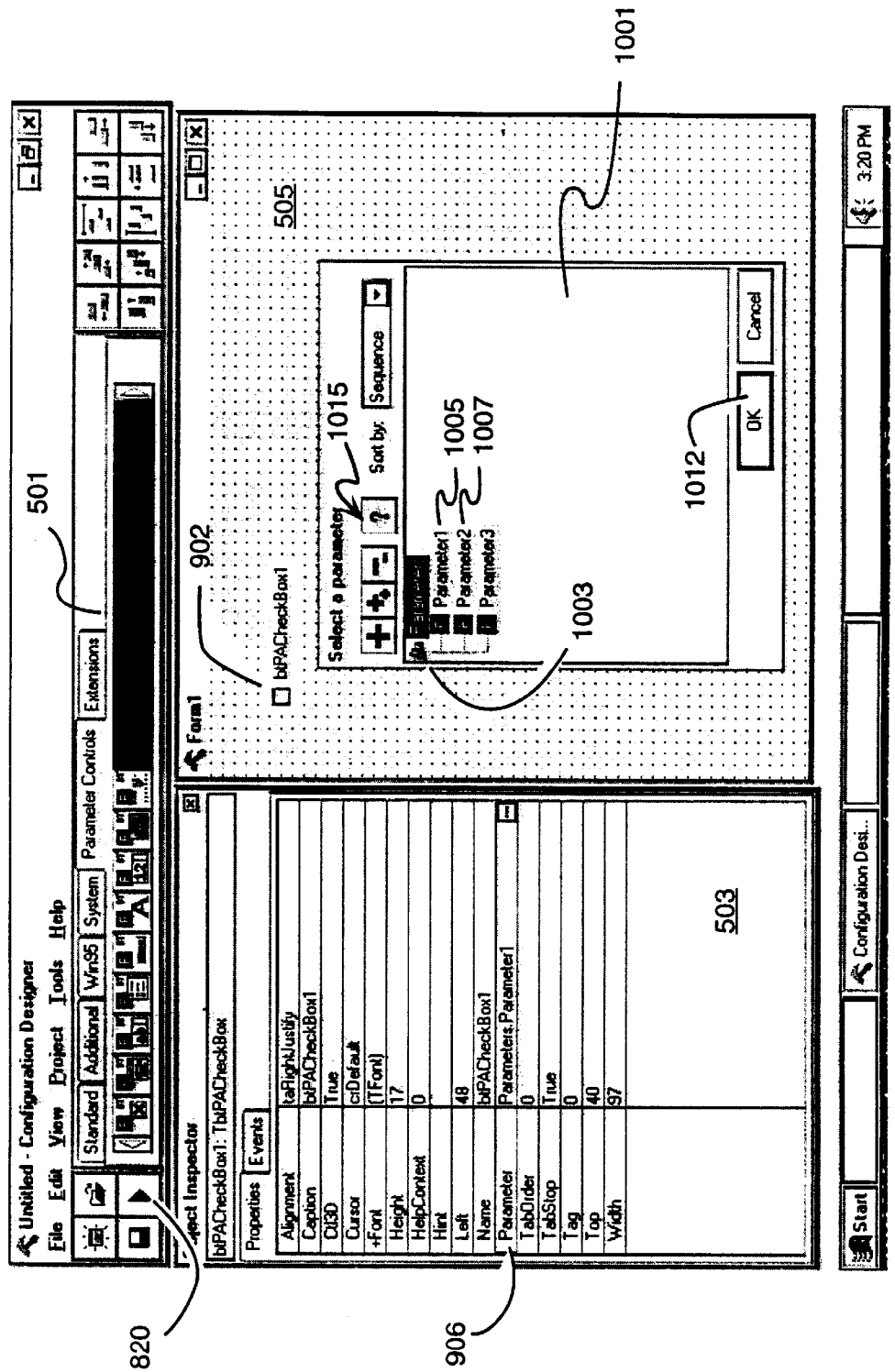
FIG. 10  Example new user screen, showing parameter selector for new check box user control

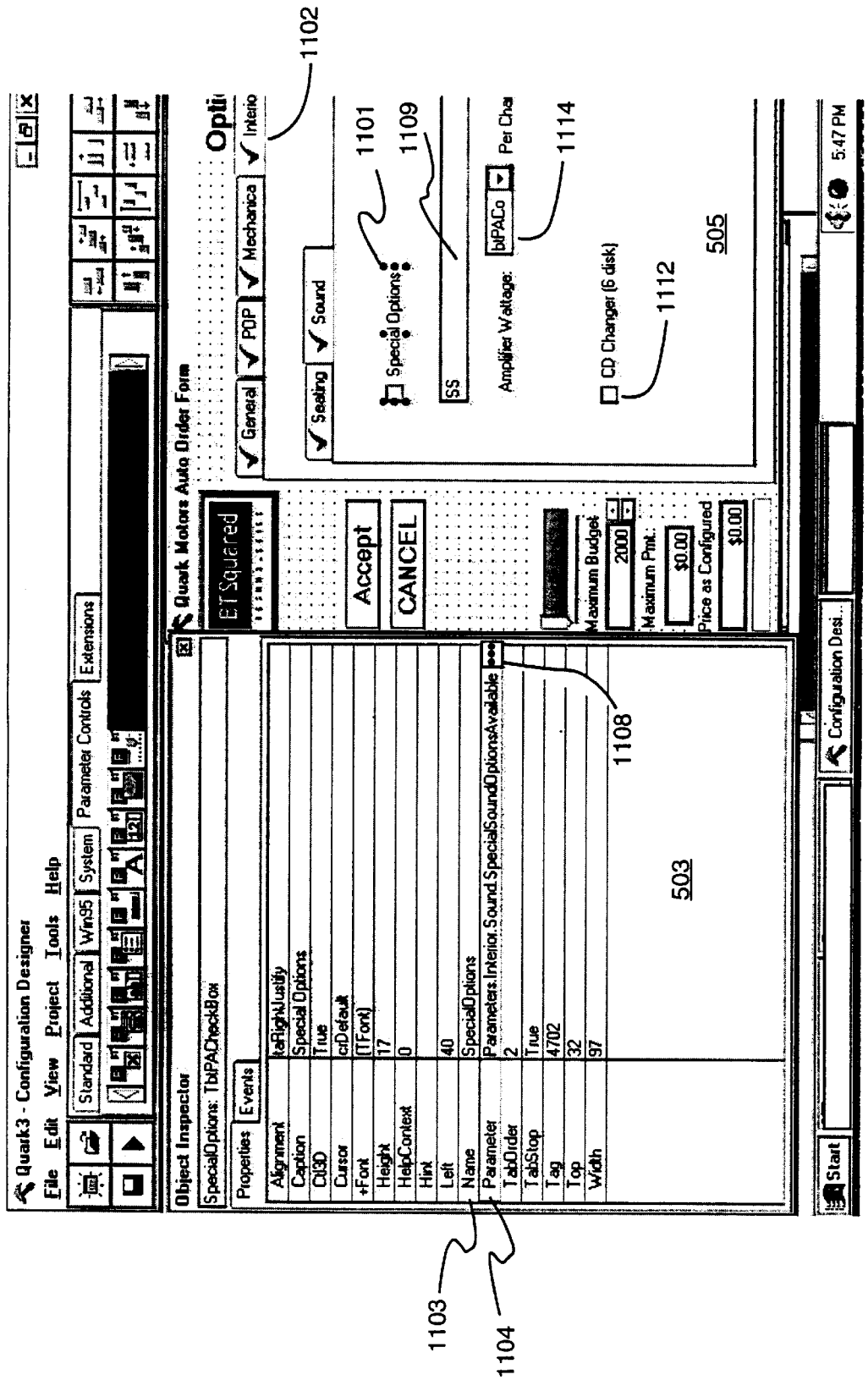
FIG. 11 Example configuration, developer environment, showing full parameter path name assigned to check box

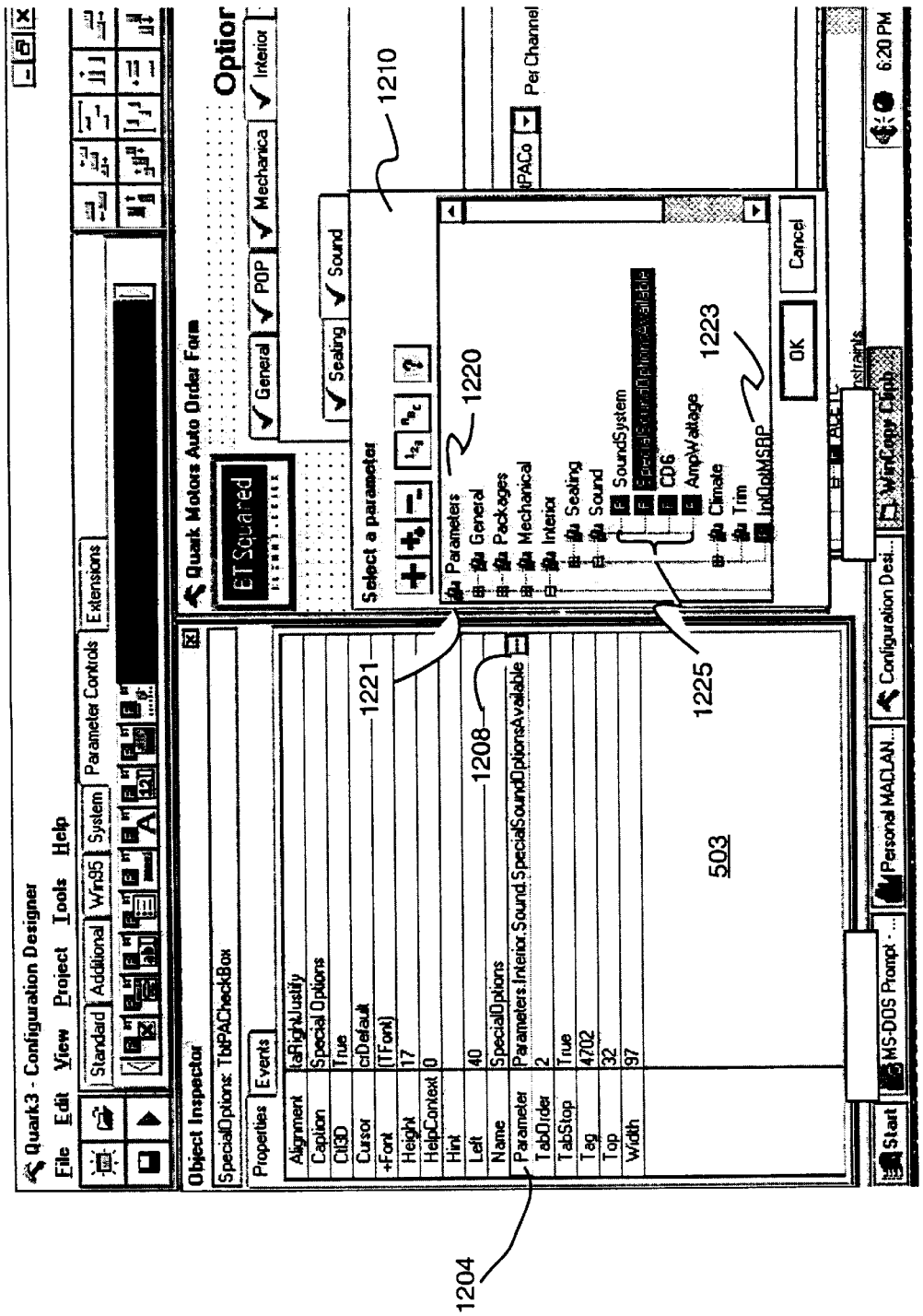
FIG. 12  Example configuration, developer mode, showing parameter associated with check box VALID Indication        INVALID Indication
                        (red highlighting)
Combo box
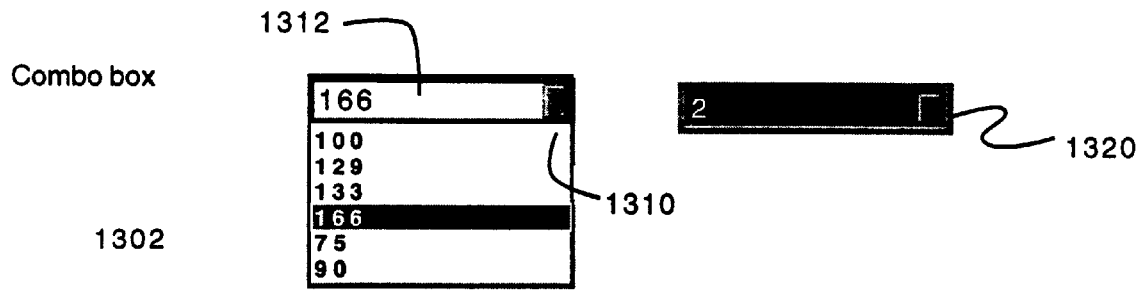
1302
Text entry ("edit") box
Radiobutton set
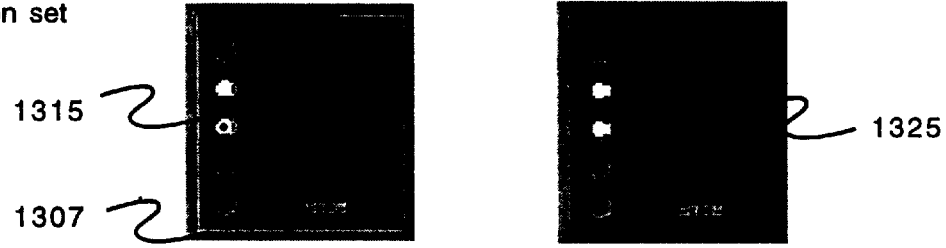
FIG. 13

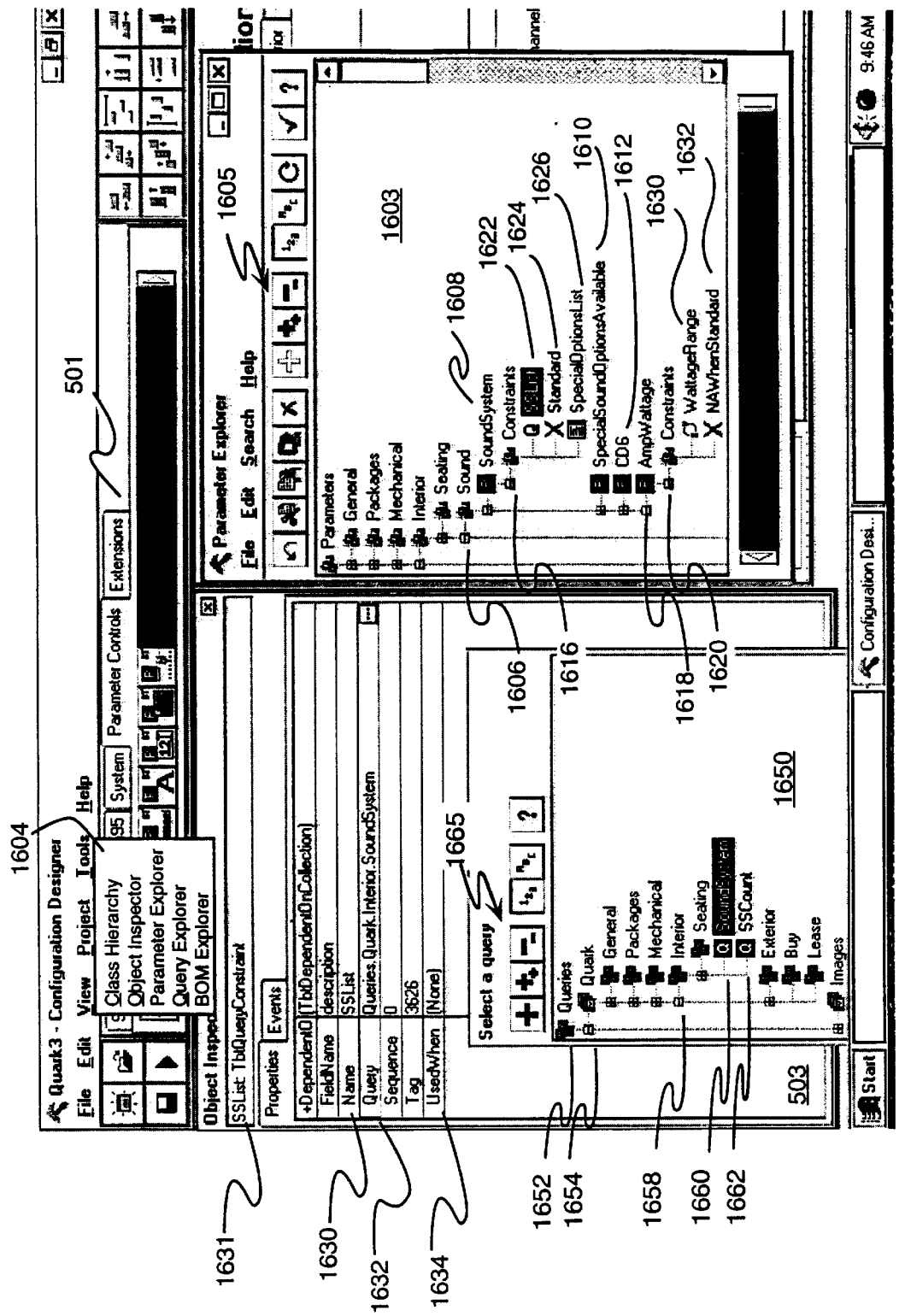
FIG. 16A  Example configuration, developer environment, application of query constraint to SoundSystem parameter

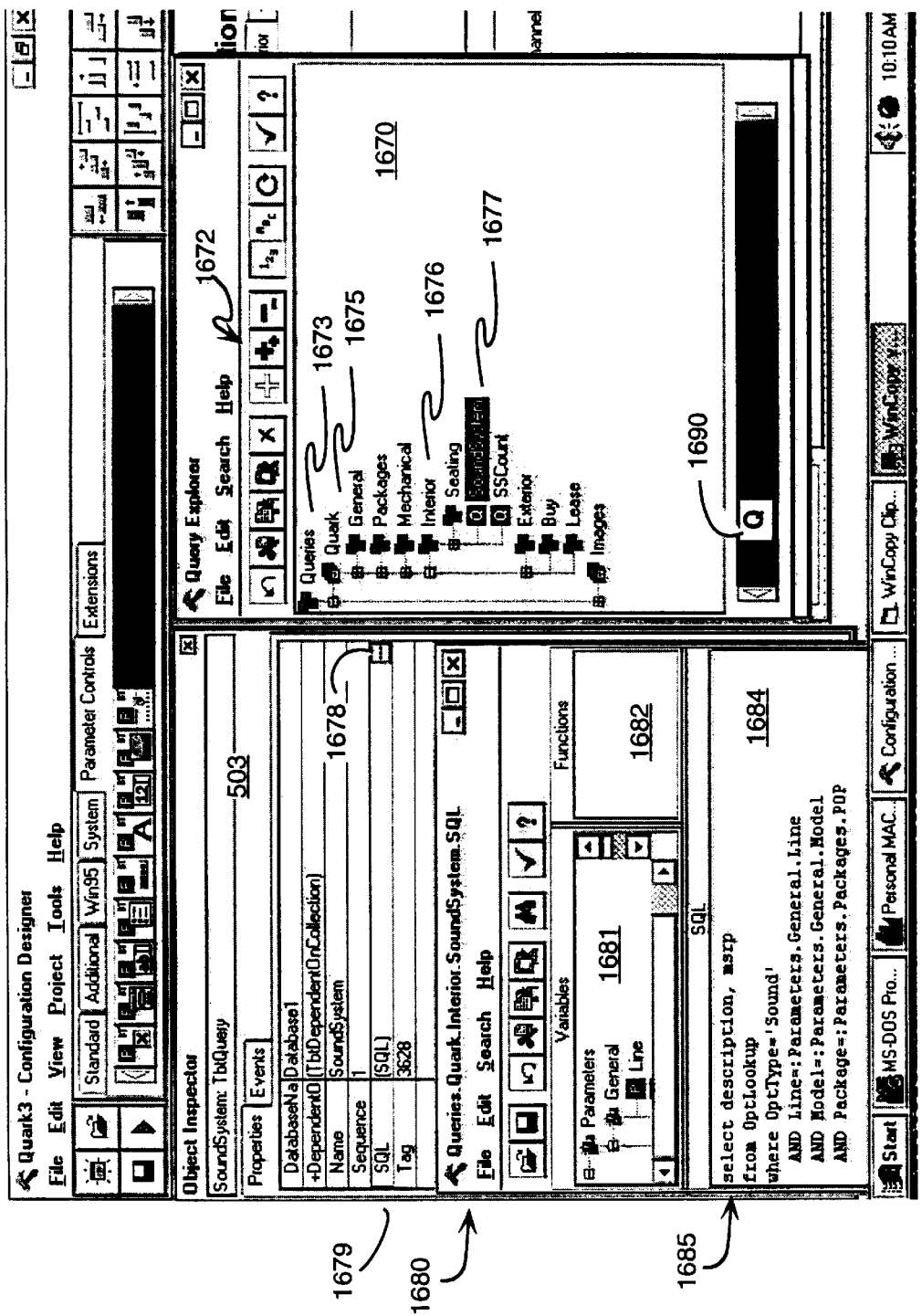
FIG. 16B  Example configuration, developer environment, query explorer window, with example SQL query

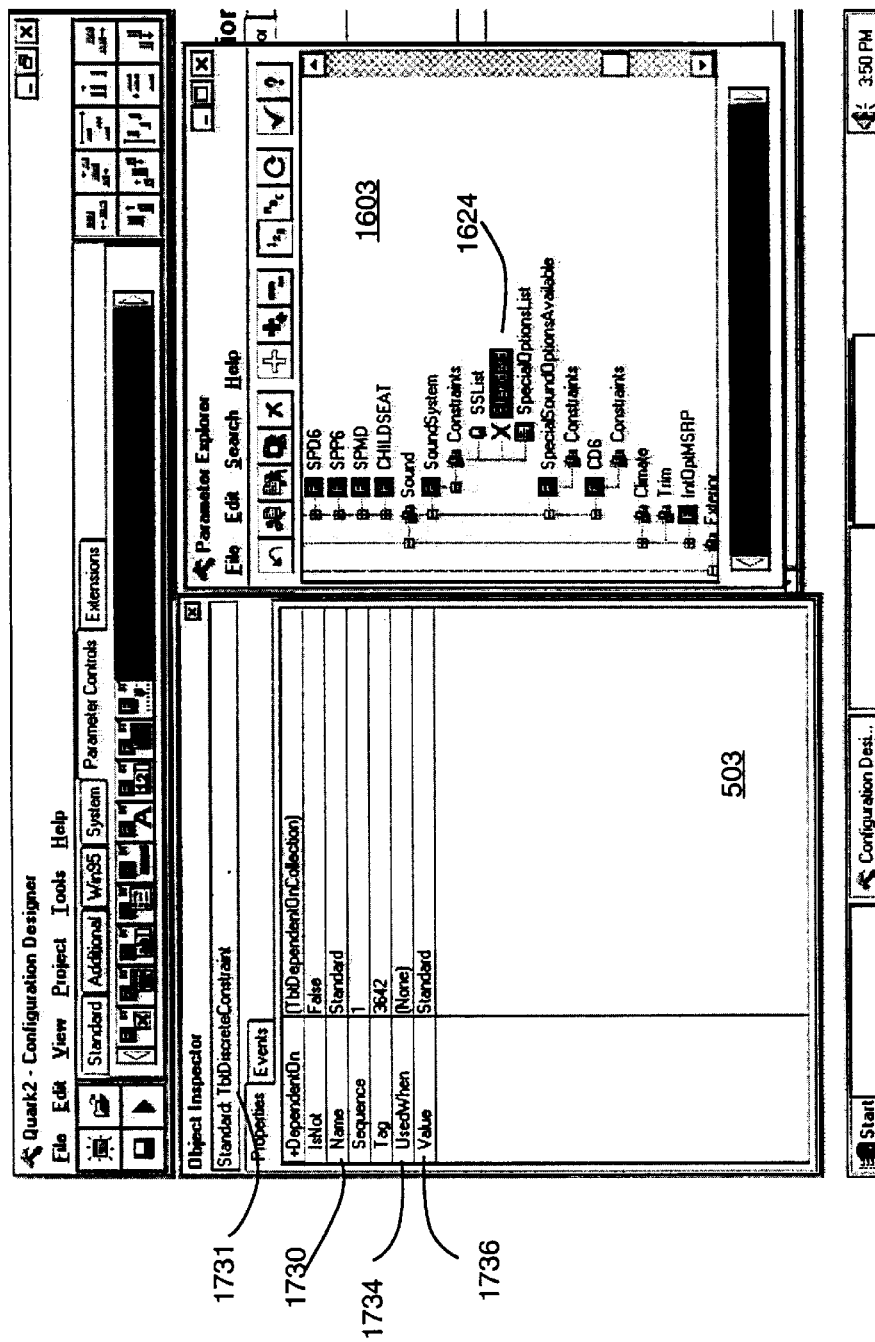
FIG. 17 Example configuration, developer environment, application of discrete constraint to SoundSystem parameter

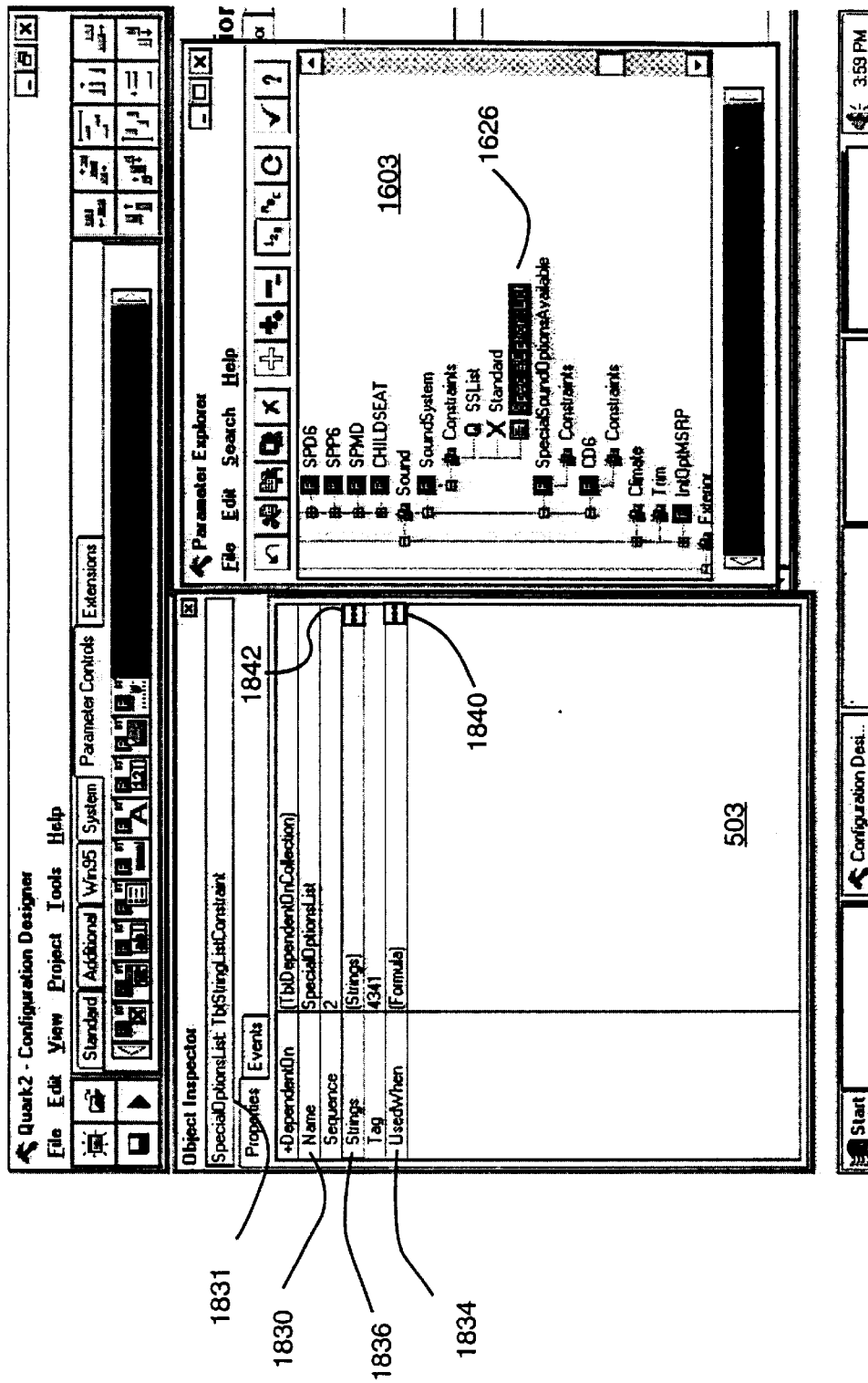
FIG. 18 Example configuration, developer environment, application of string list constraint to SoundSystem parameter Example configuration, developer environment, application of string list constraint to SoundSystem parameter, Strings Editor

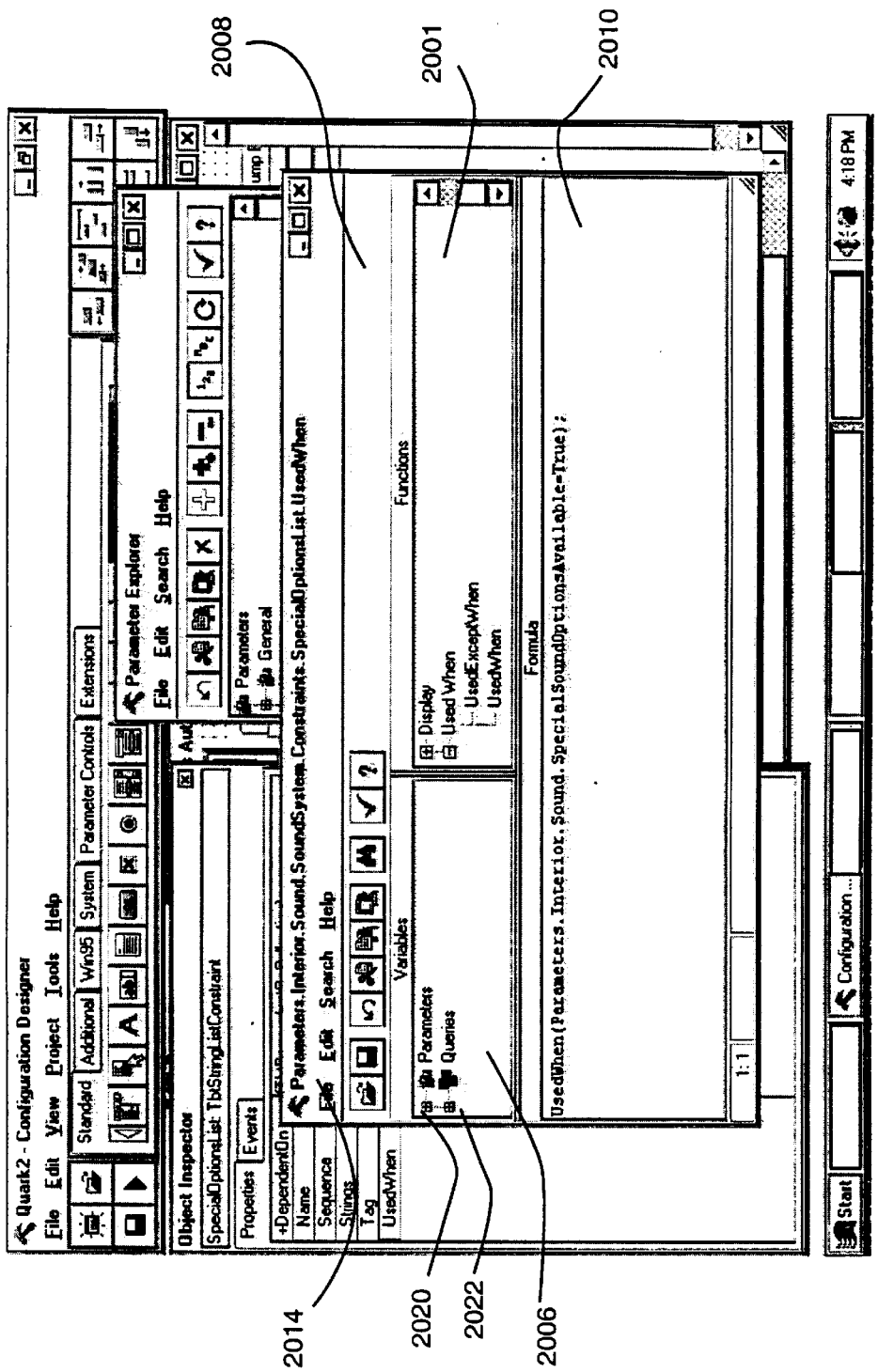
FIG. 20   Example configuration, developer environment, formula builder window displayed for conditional logic (e.g. UsedWhen) for application of constraint to SoundSystem parameter

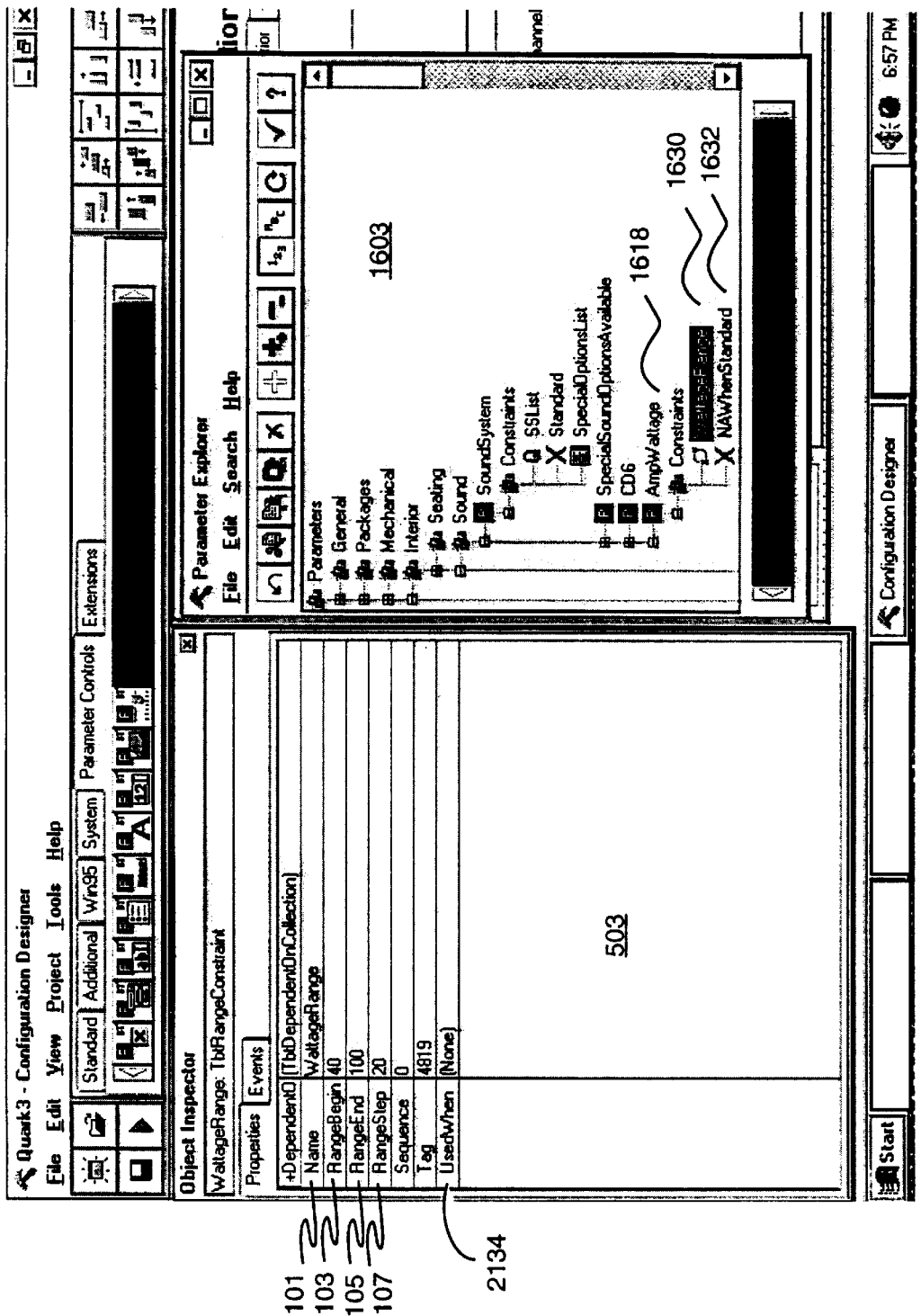
FIG. 21A  Example configuration, developer environment, range constraint applied to AmpWattage parameter

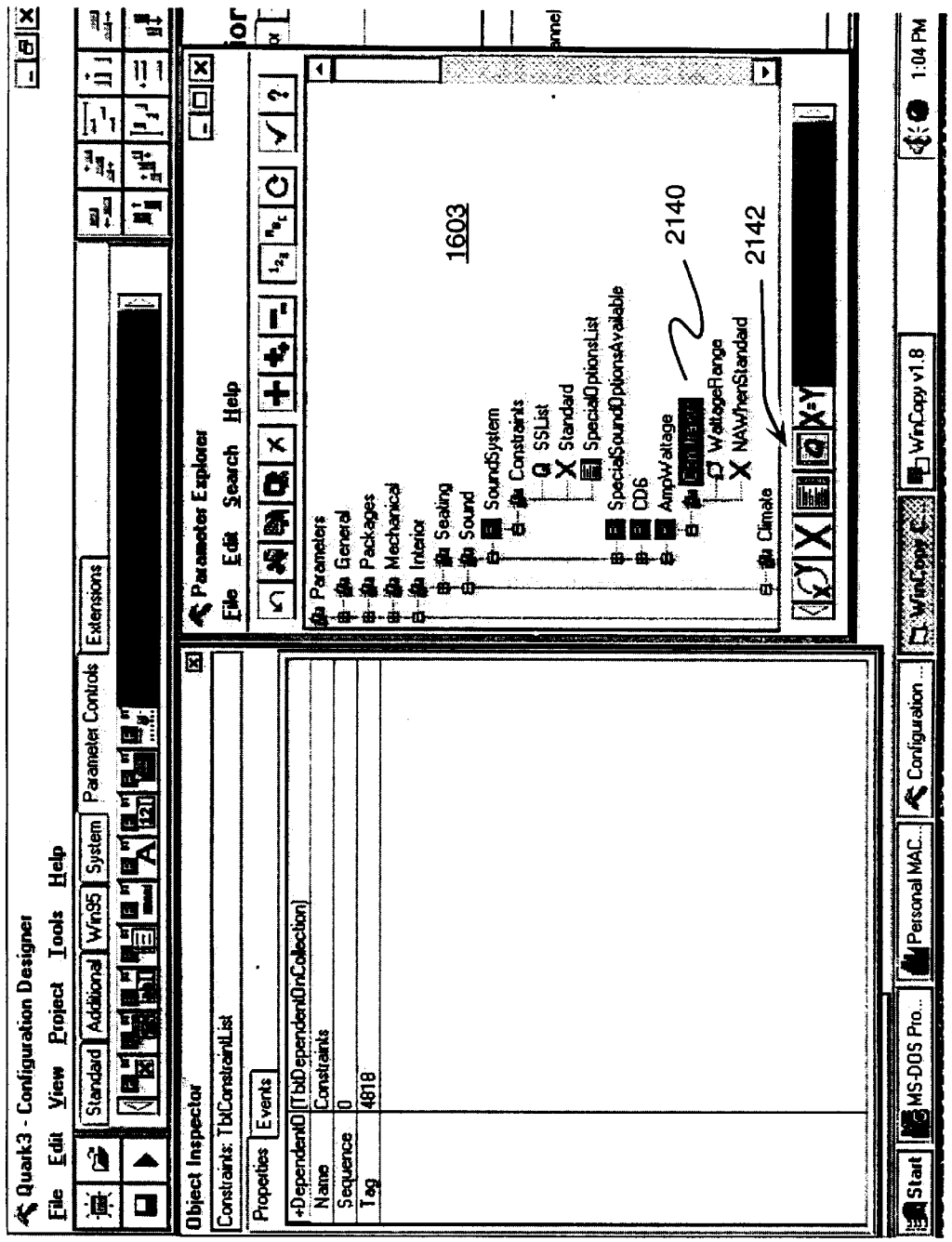
FIG. 21B   Example configuration, developer environment, constraint group icon selected for creation of new constraint

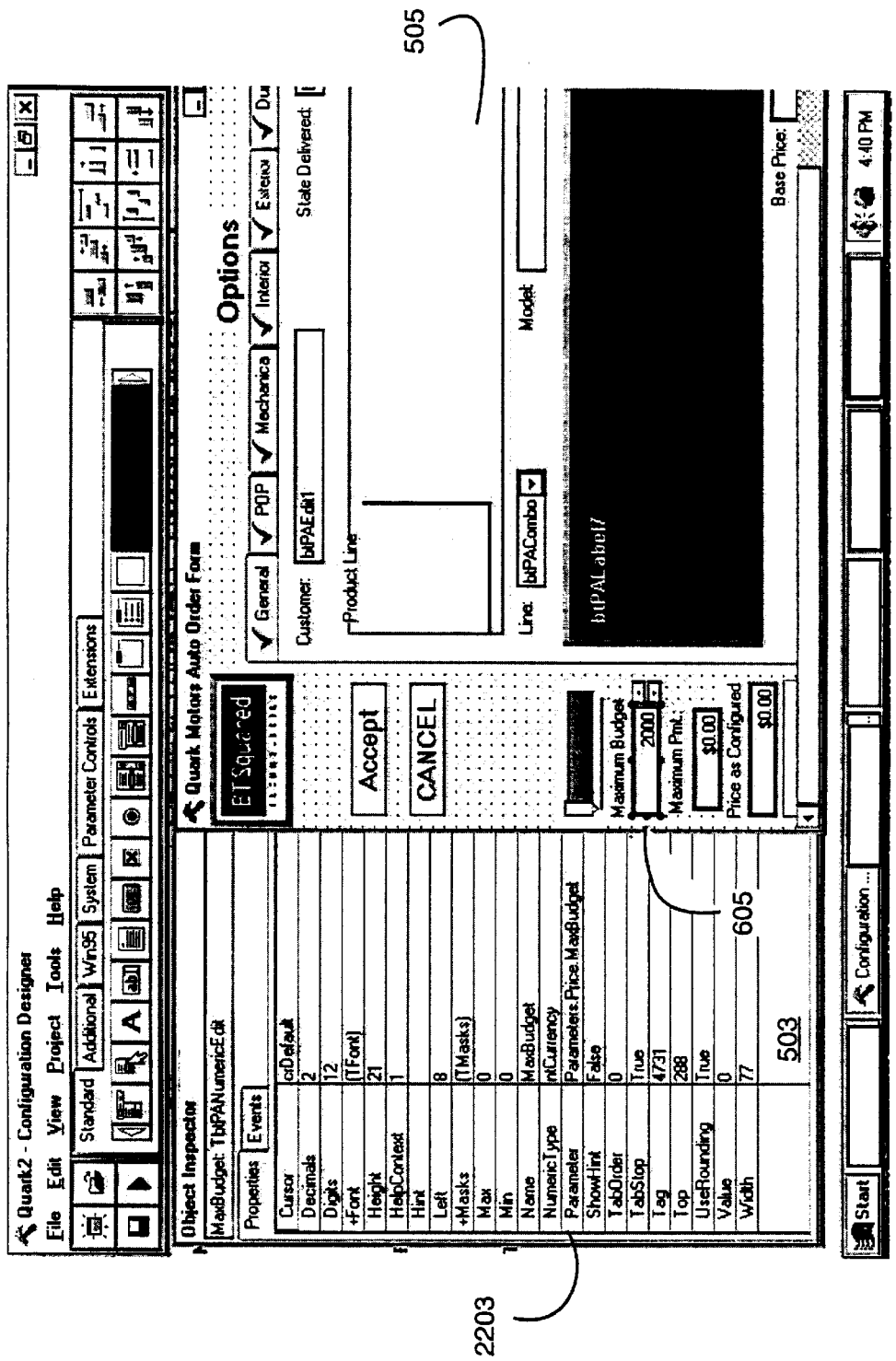
FIG. 22  Example configuration, developer environment, formula constraint applied to MaxBudget parameter

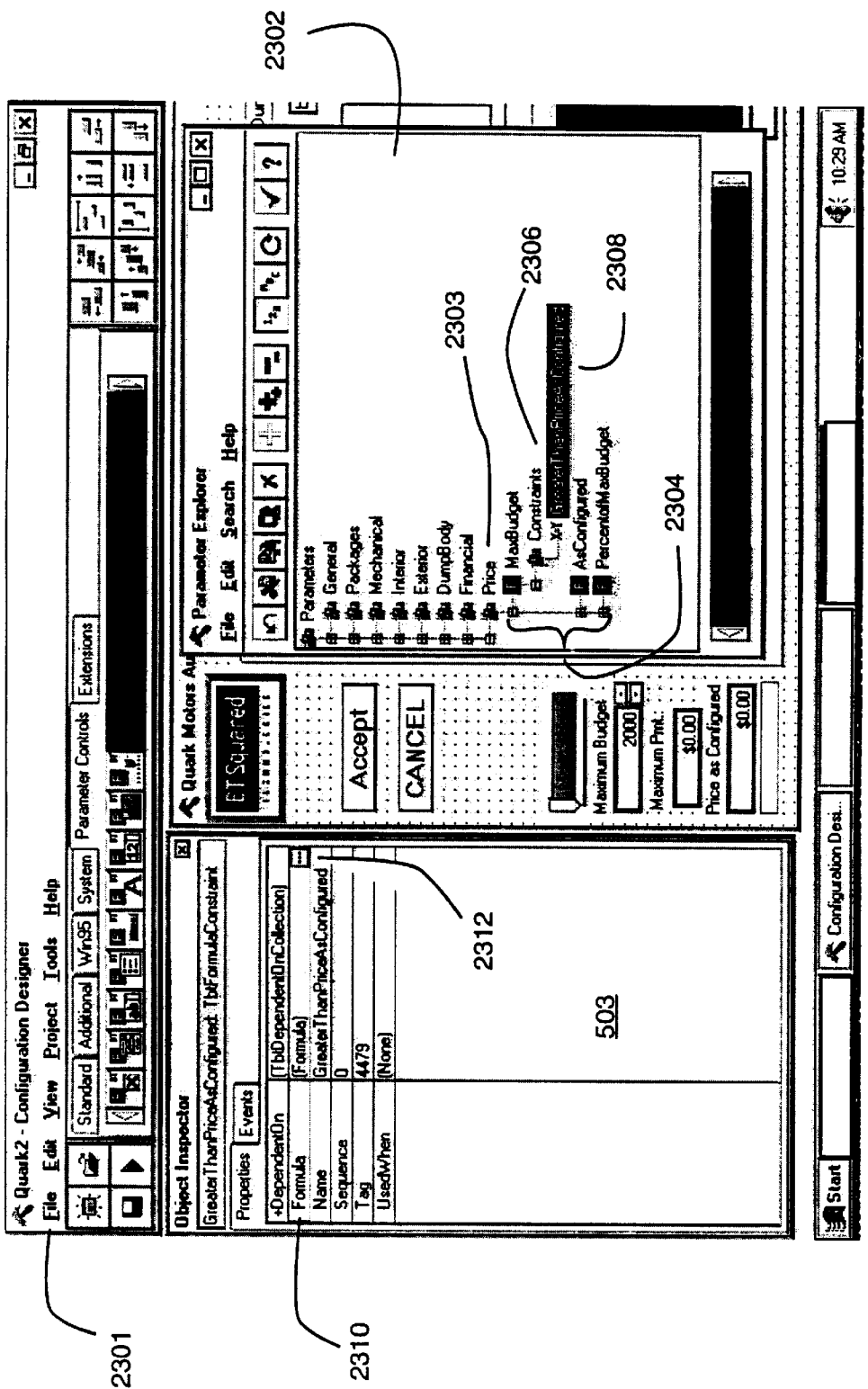
FIG. 23 Example configuration, developer environment, formula constraint applied to MaxBudget parameter

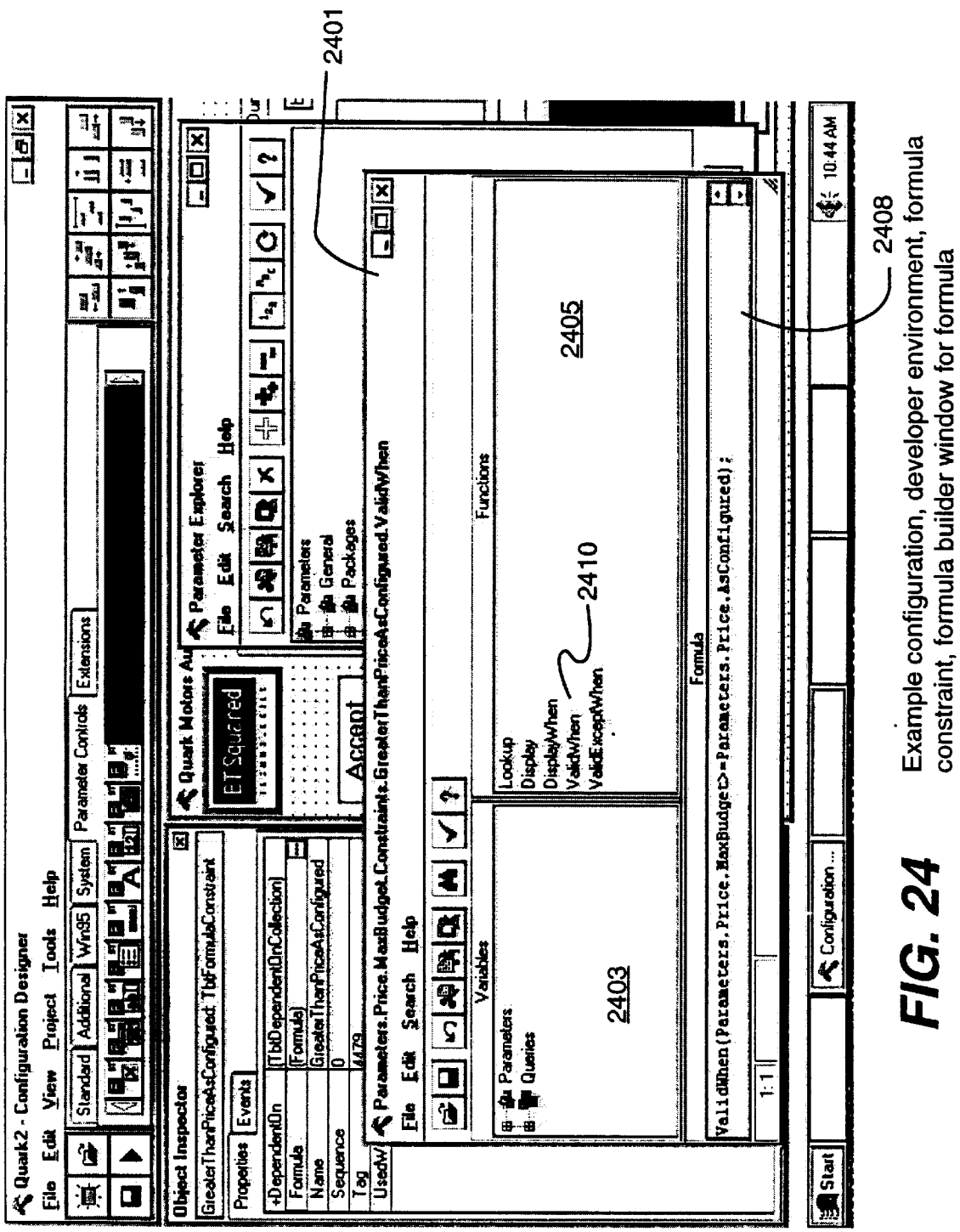
FIG. 24  Example configuration, developer environment, formula constraint, formula builder window for formula

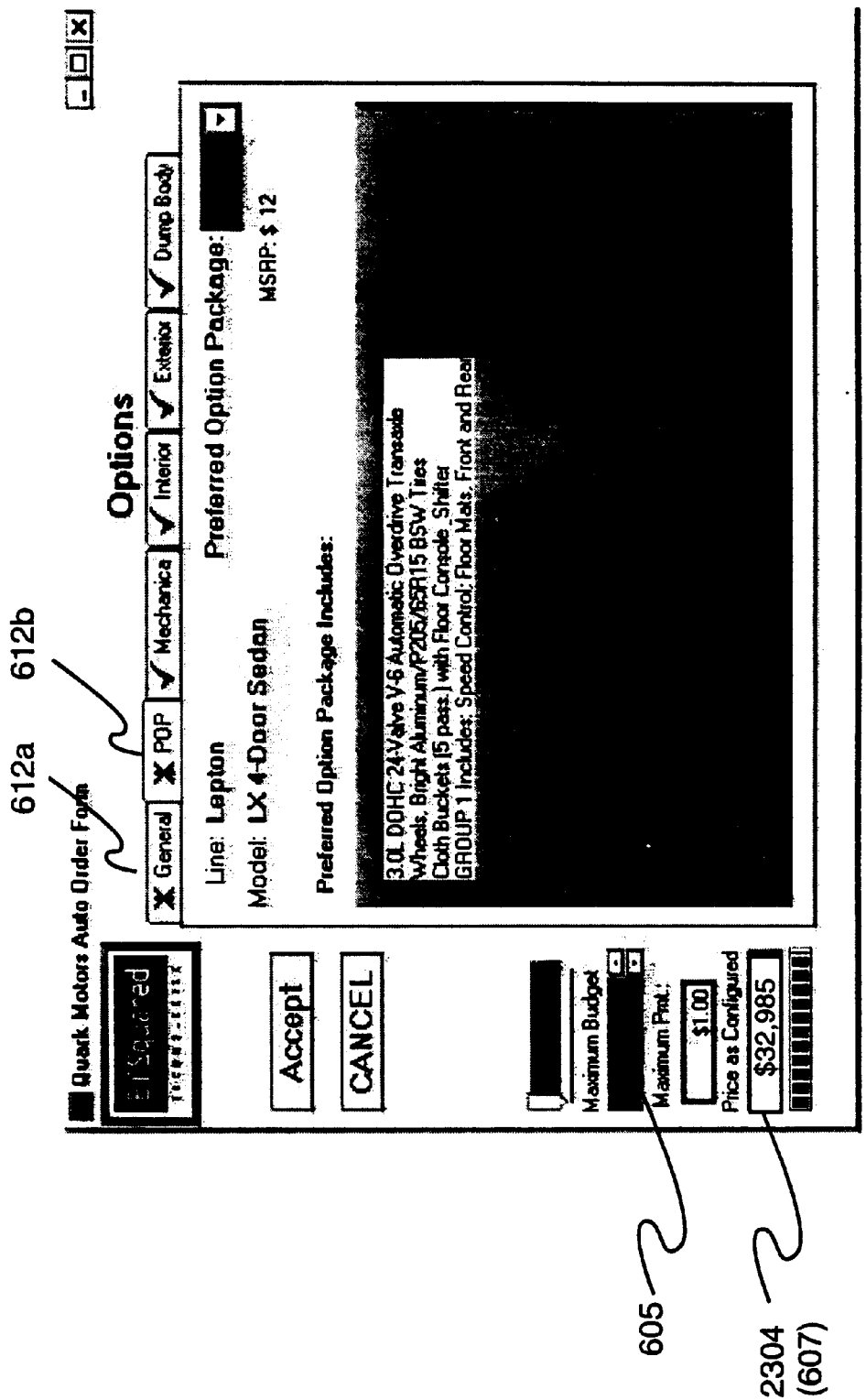
FIG. 25  Example configuration, invalid option(s) selected

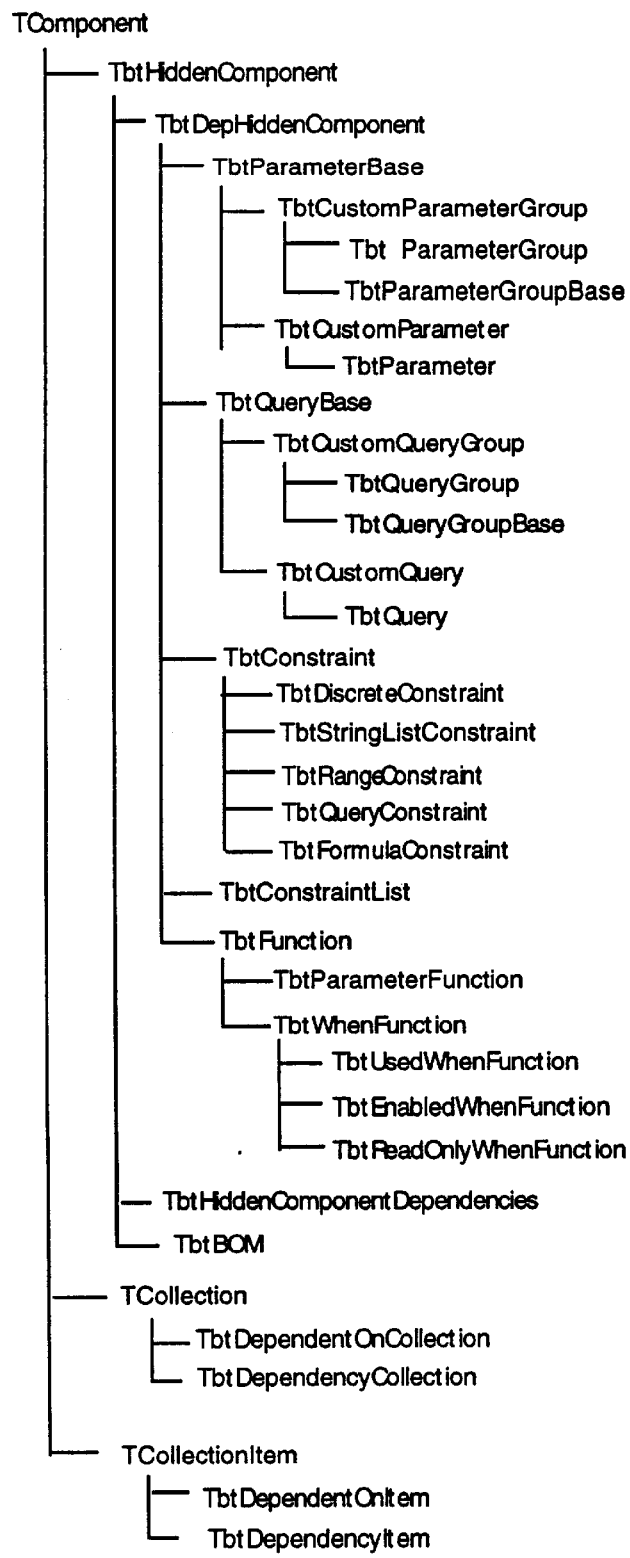
FIG. 26  Object classes

General object dependency relationships

Target screen event

File command event

Parameter Control

Parameter Selector

Query Selector

Parameter Explorer

Query Explorer

Constraint evaluation

METHODS AND SYSTEMS FOR USER INTERFACES AND CONSTRAINT HANDLING IN CONFIGURATION SOFTWARE

CROSS REFERENCE TO RELATED APPLICATION

This application is a continuation of U.S. patent application Ser. No. 08/718,645, filed Sep. 17, 1996, now U.S. Pat. No. 5,844,554.

TECHNICAL FIELD

The present invention relates generally to configuration software, and relates more specifically to methods and systems for creating a user interface and handling constraints in a product configurator computer program.

BACKGROUND OF THE INVENTION

For the past decade, product manufacturers have been reengineering and automating their businesses in order to survive and grow in fiercely competitive global markets. Yet the sales channels for these same companies—including inside and outside salespeople, distributors and resellers—frequently resemble their 1950's counterparts. Sales forces have only recently begun to using computers to assist in the sales process. Even if a sales force has been equipped with a laptop to assist in the sales process, in many cases salespeople still conduct business by using reams of paper catalogs, price lists, and quote sheets.

A new type of sales automation software, known as "configuration" software or "configurators", has recently emerged to assist in the product sales process. One example of known configuration software is the Calico Quote software, manufactured by Calico Technology, San Jose, Calif. With configuration software, a salesperson with a computer (often a laptop or notebook computer) engages in an information gathering session with a prospective customer, and receives information about the customer's product needs, such as budget constraints, model preferences, features desires, configuration options, etc. This information is interactively entered into the configuration software, and the software responds by providing indications that certain configurations are not valid (e.g. providing seat belts for the back seat of a 2-seat sports car that has no back seat!), computing the price of the product as configured, generating a purchase order and bill of materials ("BOM") for manufacturing, and so on.

It will come as no surprise that the sales channel has remained the final frontier for automation in many companies. Configuration software and computers are often difficult to learn and utilize. Furthermore, it is important that the configuration software is kept current, so that changes to the product, prices, configurations, options, availability, etc. are reflected in the configuration software.

Prior art configurators have traditionally used an, interpreted engine-based architecture, similar to the one depicted in FIG. 1. In such an architecture, the configuration software must have access to a configuration database, as well as other data relevant to the business, and access this data in response to user input to determine the validity and cost of a configuration. The use of an interpreted engine has its origins in expert systems and artificial intelligence technology. Execution of a set of rules and/or constraints is governed by a program, called an "engine": The engine determines what set of rules or constraints are relevant given the current state of the configuration, and allocates and deallocates memory for their execution.

The interpreted engine architecture has several drawbacks. First, configuration logic is typically expressed in a configuration language that is interpreted by a run-time engine on the salesperson's computer. Configuration languages tend to be arcane, complex, and difficult to learn. Second, although interpreted engines provide immediate feedback during application testing, they tend to require much more memory and processing resources during execution. Interpreted engines therefore tend to run slowly and are tedious to use. Third, interpreted engines tend to be more difficult to integrate with other applications on a user's computer, and often store at least part of their data in a proprietary format.

In the past, product configurator software has typically been "hard coded". That is, the configurator software is written in a programming language by computer programmers, and the constraints and information relating to the product are a part and parcel of the actual program code. Further, the data associated with the configuration is coded into the program, and can only be imported into the configurator by a skilled programmer. Because the configurators are hard coded, changes that occur to product configurations are difficult and time consuming to make. Only skilled programmers who are familiar with the code of the configurator software are able to effect the changes.

There is a need for a next-generation product configurator computer program that allows a sales engineering force—who need not also be computer programmers—to create and update a product configurator computer program. It would be desirable to have a configurator program that is easily customizable for a particular organization (i.e., have a custom user interface), and that is easily updated with new data and constraints on product configurations. It would also be desirable to have the data and constraints stored in a conventional database maintained by the enterprise, and easily read or written into the product configurator. These features would allow the product configurator program to be kept updated easily by sales engineers who are not necessarily expert computer programmers, and utilize a company's existing product database when updating the computers of the sales personnel.

One important aspect of a product configurator is the manner in which it handles "constraints". A "constraint" is a limitation of some sort placed upon some aspect of the product being sold. A good example is a customer's price range ("range constraint"). For example, the product configurator program may include a field that allows input of a range of prices that the customer may be willing to pay, for example, between $10,000 and $20,000 for a compact car. There may also be a "step size" indicating that increments of a predetermined amount, e.g., $500 are permitted, but others are not.

A range constraint then is implemented during execution of the product configurator program, by displaying a field for entry of a customer price range. If the product configuration yields a final price greater than $20,000 or less than $10,000, or an increment therebetween that is not an even $500, the product configurator should indicate an invalid condition. The invalid condition indicates that a presently selected product configuration (with certain options, features, etc.) violates the customer's price range constraint.

Typically, a constraint violation in the product configurator is indicated to a user (sales person) by a visual indication on the display screen, for example, a red flag or icon displayed in association with the data that causes the constraint violation. For example, the known Calico Technology configurator software shows invalid conditions with a red mark on a tab on the screen. The constraint violation must be corrected before a valid configuration can be determined (to obtain a final price, bill of materials, etc.).

Many prior art configurators handle constraints internally in an awkward manner. In particular, prior art configurators often include an expert system or inference engine that must continuously evaluate the state of the product configuration, typically with rules-based reasoning, in order to detect a constraint violation. Prior art configurators either require a user to create a user interface with an external visual interface tool (e.g. VISUAL BASIC), or provide a user interface with only limited flexibility. Constraints in prior art systems are typically hard-coded and therefore difficult to maintain and update.

Thus, there is a need for improved configurator software that is easier to create and maintain than prior art configurators. There is also a need for a configurator that is flexible and allows easy creation of a custom user interface that can be tailored to the needs of a particular enterprise by allowing inclusion of graphics, operational features such as radio buttons and check boxes, data entry fields, selectable choices on menus, etc., without requiring a developer or user to write program code.

SUMMARY OF THE INVENTION

Briefly described, the present invention provides development tools in the form of a computer program for creating and maintaining the logic and visual interface of a product configuration computer program. The invention lets a user—a configuration developer—create both a visual end user interface (for the salesperson) and the underlying configuration logic. An integrated user interface builder allows the developer to design a configuration screen by dragging and dropping parameters, such as engines available in certain model automobiles, interior features, etc. onto a form. Complex constraints (e.g., what are valid engines for certain model cars and when they are valid) are also defined for parameters to ensure the accuracy and consistency of the salespersons's selections. Formulas specify calculations during parameter entry, such as pricing and default values, and creation of a parts list and descriptive text upon completion of parameter entry. A built-in query tool (based on SQL) enables constraints and formulas to access data easily from existing databases.

Rather than relying on an interpreted configuration runtime engine, the disclosed configuration program developer environment automatically generates and compiles a standalone executable program and does not require any special runtime or engine. This architecture and provides maximum performance while simplifying integration with the user interface aspects of the configuration program application.

The configurator developer environment allows a developer, typically a person such as a sales engineer, to create customized screens with graphics, logos, and other useful sales information, that can be put into the configurator program which is ultimately provided to the sales force. Thus, the output of the developer environment is an executable computer program that, when installed on a salesperson's computer, displays screens to the salesperson which are customized for that particular organization.

The developer environment is itself a computer program. When running, the developer environment typically displays a user interface control palette (from which controls are selected), a target display screen display or template, and an object inspector screen that allows inspection and modification of aspects of a control, parameters, queries, etc. The output of the developer environment is the executable configurator computer program for the salesperson's computer.

The developer environment for creating a user interface is object-oriented, and allows the drag and drop creation of the user interface. The developer selects particular user interface controls (e.g. radio buttons, check boxes, graphic elements, text boxes, labels, etc.) from a palette in the development environment. These controls are placed as desired by the developer on the target configurator screen display template, to create a user interface screen as desired.

Attributes of the controls are manipulated through the object inspector, which is a window that displays properties of a control. These properties include a "parameter" property, which relates to information that is utilized in the configurator.

Another aspect of the present invention is the ability for information that is associated with a control to be derived from an external database or table via SQL queries. This information is retrieved from a disk file, a network connection, or other source, which can be maintained independently of the configurator software. In other words, the sales organization can maintain product information on a database, such as price, colors that are available, engine model numbers, etc. and specify a data file containing this information for usage within the configurator program. The developer/sales engineer who creates or maintains the product configurator program merely specifies a path link to the database or file containing the information. Then, when the sales engineer/developer is required to update the product configurator program and distribute it to the sales force, he or she merely "recompiles" the configurator program in the developer environment, thereby creating a new executable program which retrieves and employs the relevant data.

Accordingly, the present invention provides a convenient and easy way to create a custom user interface for a sales configurator computer program, and to maintain the logic and the user interface of the sales configurator computer program in an updated fashion with information drawn from external tables or databases. The sales engineer/developer need not be a skilled computer programmer; therefore maintenance of the configurator software is much simpler, and quicker.

Another aspect of the present invention relates to representation of constraints within the user product configuration program module. This aspect of the invention comprises storing parameters associated with the product configurator in a hierarchical arrangement in memory of the computer running the developer environment. The parameters are displayed in a "parameter explorer" window, which can be to invoked at any time to allow creation and modification of the parameters underlying the configurator.

When the developer selects one of the parameters from the hierarchy in the parameter explorer window, a Constraint list icon is displayed in association with the selected parameter. In response to selection of the Constraint icon, a menu comprising a selectable constraint-type controls is displayed. The developer can select one of the constraint-type controls, which creates a hew constraint object in the parameter hierarchy. In response to selection of this new constraint object, the properties of the selected constraint object are displayed in the object inspector region of the developer environment. Properties of the constraint object are then modifiable in the object inspector.

Types of constraints that can be selected include a range constraint (described above), a discrete constraint (e.g. a constant number), a string constraint, a query constraint (which can be used to query an external database or table), and a formula constraint (which can be employed to construct mathematical expressions that determine the constraint). A formula is constructed in a "formula builder" window that can be activated upon creation of a formula type constraint.

The present invention therefore provides at least two significant improvements in configurator computer program construction. First, the invention provides a "configurator developer environment" for a sales engineer— who is not necessarily a computer programmer—to create a customized user interface for the configurator program. Second, constraints are handled in a unique, and more efficient, manner. When the developer has completed the manipulation of constraints associated with the parameter, the developer runs or compiles the developer environment to create a new executable program, which is then suitable for distribution to the sales force. (All constraints are automatically applied at run time of the product configurator computer program.)

Thus, it is an object of the present invention to provide an improved system and methods for creating custom user interfaces for configuration software.

It is another object of the present invention to provide a novel method and systems for representing parameters and constraints in configuration software.

It is another object of the invention to provide an integrated development environment for creating and maintaining both the user interface and the underlying logic of a product configuration computer program.

It is another object of the present invention to provide an integrated visual user interface builder for a configuration computer program that is easy to use and allows rapid and efficient association of underlying parameters with user controls. After linking the parameters to the user control, the behavior of the user interface is then automatic.

Other objects, features, and advantages of the present invention will become apparent upon reading the following specification, when taken in conjunction with the drawings and the appended claims.

BRIEF DESCRIPTION OF THE DRAWINGS

FIG. 3 illustrates the structure of the preferred embodiment of the developer environment and configuration software constructed in accordance with the preferred embodiment of the present invention.

FIG. 4 illustrates an alternative embodiment of the present invention configuration software.

FIG. 5 illustrates the architecture of configuration software constructed in accordance with the preferred embodiment of the present invention.

FIG. 6 is a screen shot of configuration software constructed in accordance with the preferred embodiment of the present invention, showing a main user screen.

FIG. 7 is a screen shot from the example configuration software of FIG. 6, showing the use of organization tabs on the user screen display.

FIG. 8 illustrates the user interface of the developer environment software constructed in accordance with the preferred embodiment of the present invention.

FIG. 9 illustrates the developer environment of FIG. 8, showing a new check box type user control added to the display screen template.

FIG. 10 illustrates the developer environment of FIG. 8, showing the parameter selector window for the new check box user control added in FIG. 9.

FIG. 11 illustrates a user screen displayed in the developer environment of the example configuration of FIG. 6, showing a full parameter path name assigned to a check box user control shown on the display screen template.

FIG. 12 illustrates the example configuration of the developer environment showing a parameter selector window.

FIG. 13 illustrates visual indications of invalid conditions occurring in the configuration software.

FIG. 16, consisting of FIGS. 16A and 16B, illustrates the example automotive configuration in the developer environment with a query constraint applied, the query selector window, and the query explorer window.

FIG. 17 illustrates the example automotive configuration in the developer environment with a discrete constraint applied.

FIG. 18 illustrates the example automotive configuration in the developer environment with a string list constraint applied.

FIG. 20 illustrates the example automotive configuration in the developer environment showing the UsedWhen conditional application of the string list constraint of FIG. 18.

FIG. 21, consisting of FIGS. 21A and 21B, illustrates the example automotive configuration in the developer environment with a range constraint applied and for creation of a new constraint.

FIG. 22 illustrates the example automotive configuration in the developer environment to show application of a formula constraint.

FIG. 23 illustrates the example automotive configuration in the developer environment with a formula constraint selected.

FIG. 24 illustrates the example automotive configuration in the developer environment showing the formula builder window associated with an applied formula constraint.

FIG. 25 illustrates various indications of an invalid condition.

FIG. 26 illustrates object classes utilized in the preferred embodiment of a configuration program constructed in accordance with the preferred embodiment of the present invention.

DETAILED DESCRIPTION OF THE DISCLOSED EMBODIMENT

Preferred System Overview

Mobile Sales Configurator Overview

Figure 1:
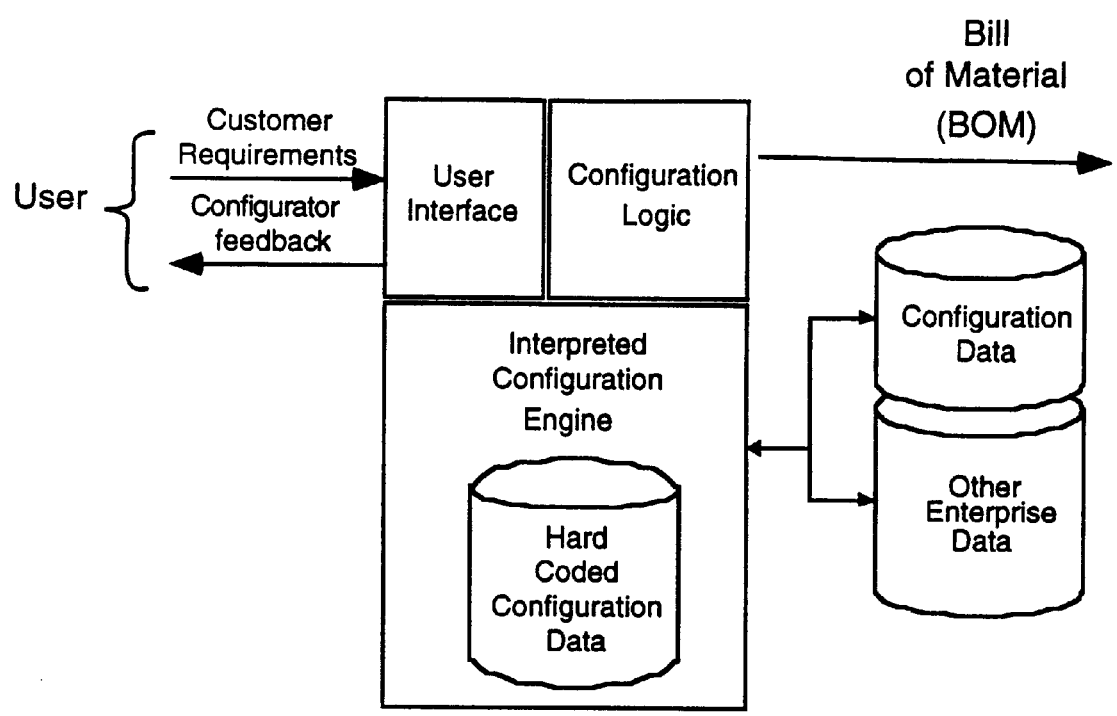
FIG. 1 illustrates prior art interpreted engine configuration software.
Figure 2:
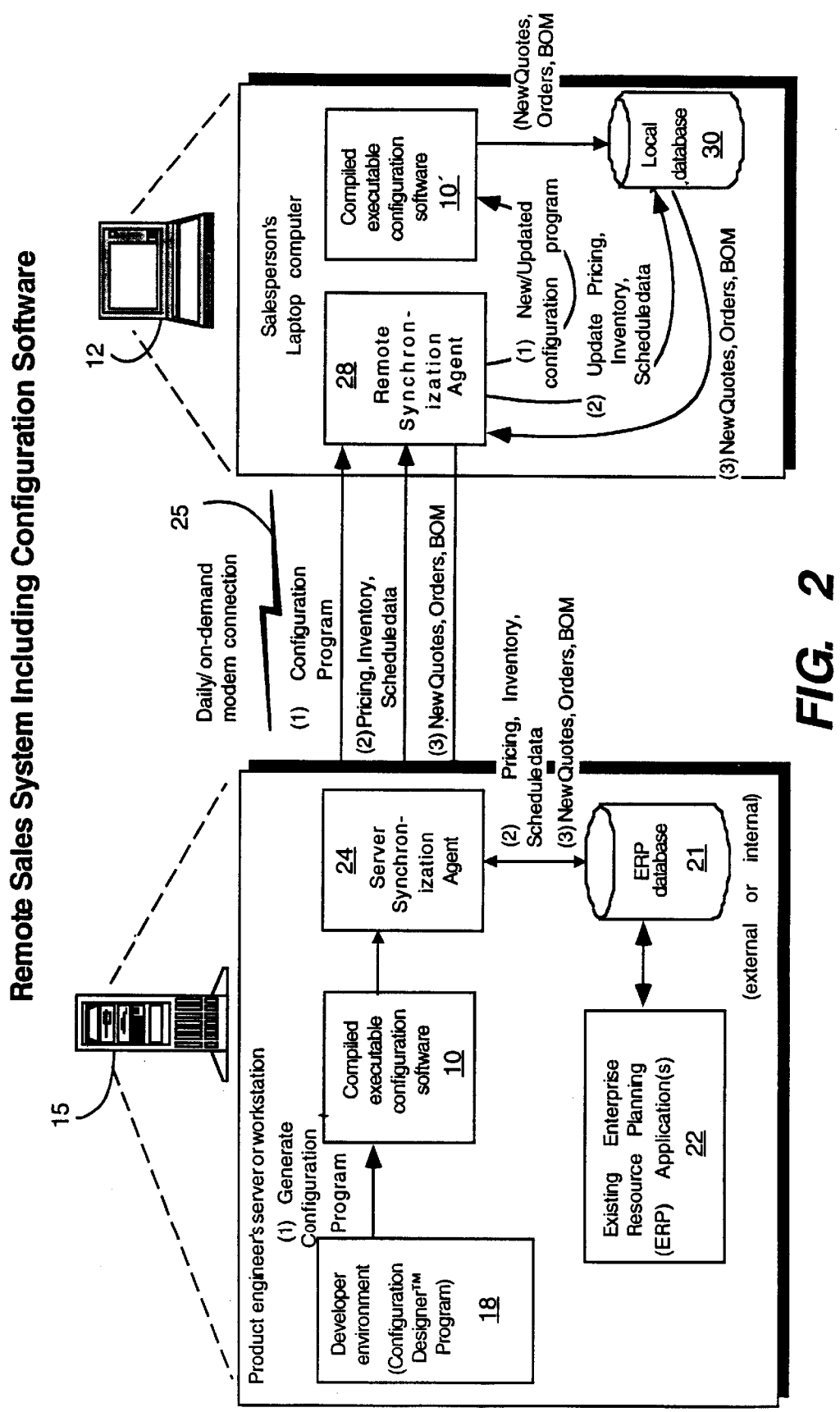
FIG. 2 is a block diagram illustrating a mobile sales system including configuration software and developer environment constructed in accordance with the preferred embodiment of the present invention.

Referring now to the drawings, in which like numerals indicate like elements throughout the several figures, FIG. 2 is an overview of a typical application in a mobile sales environment of the use of configuration software 10 and associated developer environment software 18 constructed in accordance with the preferred embodiment of the present invention. In accordance with the present invention, an executable configuration program module or software 10 is installed on a computer system 12, which in this application is a salesperson's laptop computer. The executable configuration software 10 is constructed in accordance with the present invention, utilizing methods described herein in a developer environment.

As used herein, the term "developer" will be used in connection with a person such as a product engineer who utilizes the developer environment software 18 to create a configuration software program, while the term "user" will be used in connection with the end user of such a configuration software program. Typically, the user will be a person such as a salesperson or other person who actually configures products, services, or other things.

The developer environment 18 comprises a workstation 15, such as a product engineer's computer, on which is installed a program that carries out methods for creating user interfaces and constraint applications as described herein.

The preferred process for creating and using configuration software in accordance with the present invention shown in FIG. 2 is basically a six-step process. First, the developer environment software 18 is invoked by a developer, such as a product or sales engineer, on the product engineer's workstation 15. The developer environment is operative to allow construction of a user interface for the configuration software 10, creation and editing of parameters and constraints of the configuration, accessing existing data of the enterprise, and compiling an executable configuration software program. Existing data of the enterprise, such as pricing, inventory, scheduling, and other data relevant to a product's configuration, are stored in an existing enterprise resource planning (ERP) database 21. The ERP database 21 may be internal to the product engineer's computer 15, or may be an external database that is accessed through conventional communication facilities such as a dial-up link, local area network (LAN), wide area network (WAN), intranet, Internet, or other communication facilities.

The ERP database 21 is maintained by a separate enterprise resource planning (ERP) application program 22, which forms no part of the present invention. The enterprise's ERP applications are responsible for keeping the ERP database 21 updated with current information such as product configuration data. In accordance with the invention, however, data stored in the ERP database 21 can be accessed via SQL queries and incorporated as tables stored locally on the salesperson's laptop computer 12.

After the developer finishes creating the configuration software in the developer environment 18, the code is compiled to create a compiled executable configuration software program module 10. The executable configuration program is now ready to be used by end user, in this case a salesperson with a laptop computer.

Second, a server synchronization agent 24 associated with the product engineer's workstation 15 is operative to transmit the executable configuration software 10 to the salesperson's laptop computer 12. This is effected by modem connection or other data communication connection, as generally shown at 25.

Third, a remote synchronization agent or client program 28 that runs on the laptop computer 12 is employed to download the configuration software 10 from the product engineer's server. When the product engineer's computer 15 is connected for data communications with the salesperson's laptop computer 12, a copy 10' of the executable configuration program 10 is downloaded via a remote synchronization agent or client program 28 that runs on the laptop computer 12. The remote synchronization agent 28 receives the executable configuration software 10' and either updates the executable configuration program or replaces it, as desired.

The executable configuration software 10 is operative to execute SQL queries on any ERP data upon loading of the configuration software for running (i.e., at run time), to open any data tables required to satisfy the query. Also, queries on ERP data are executed when any formula containing a query needs to be recalculated.

Fourth, after the configuration software 10 is downloaded into the laptop computer 12, it is loaded and run to allow the mobile salesperson to assist customers in the selection, configuration, and/or ordering of a product offered by the enterprise. The assistance is provided interactively, as will be understood, as the configuration program 10 allows entry of possible options and other configuration options, and provides immediate feedback to the salesperson in the sales cycle. Such an interactive session between user of the program 10 and a customer may be called a "configuration session."

Fifth, upon completion of a configuration session, any orders, quotes, and/or bills of material (BOM) may be generated as an output of the configuration software 10. Any data generated from a configuration session is initially stored locally in a quote database 30 in the laptop computer 12.

Sixth, at an appropriate time the remote synchronization agent 28 is reconnected to the enterprise via the communication link 25 for transmission of the sales data. (This data communication session need not be to the product engineer's computer, but could be to a different computer system of the enterprise, e.g. an order processing system.) At a communication session between the enterprise and the salesperson's laptop computer 12, any new bills of material (BOM), quotes or orders that have been obtained during use of the configuration software 10 are uploaded via the remote synchronization agent 28 and the server synchronization agent 24, and thence into the ERP database 21 or other enterprise order processing system for handling. From that point, the enterprise's order processing or other system takes over to execute orders, generate work orders on the factory floor, and trigger other enterprise activities designed to fill the order or satisfy the quote.

During the communication session between the salesperson's computer 12 and the enterprise, any new information relating to pricing, inventory, and/or scheduling that is independent of the configuration program but may be required by the salesperson is downloaded by the synchronization agent 28 into the salesperson's database computer.

With the foregoing overview in mind, turn next to FIG. 3 for a discussion of the architecture of the preferred configuration program module 10 and its relationship to other data of the enterprise. First, however, certain technical issues relating to configurators in general will be discussed to provide a context for discussing the preferred configuration software architecture.

General Configurator Problems of Incompleteness, Ambiguity, and Invalidity

The usefulness of the output from use of configuration software can be diminished by several common shortcomings—incompleteness, ambiguity, and invalidity.

An incomplete configuration prevents filling a customer's needs in an efficient manner. A complex product (or service) like a car or a computer system (two products we will use in discussion examples) may have many possible configuration options. Just making a complete listing of every option is a difficult job for an experienced salesperson, let alone a customer. The person configuring the product needs to know what characteristics are configurable, and what options are available for each. All required information must be obtained for the configuration to be complete.

An ambiguous configuration also adversely affects the efficiency of the enterprise. A useful configuration specification will indicate a choice or preference for every configurable option. The value of a configuration specification will be seriously diminished if the recipient (the person creating a formal quote or the shop floor scheduler) has to go back to the customer to clarify some omitted choice. For example, a configuration is ambiguous (as well as incomplete) if the salesperson forgot to ask the customer if he wanted a two or four door model.

An order for an invalid configuration cannot be filled. A selected configuration may not be valid for a number of reasons, including logical, design, and other constraints. An example of a logically invalid configuration might be to specify a rear seat shoulder harness option on a two-seater convertible model automobile. Valid configurations are also constrained by product design decisions. For example, a heavy duty suspension option might be available for a pickup truck, but not for a passenger vehicle. Another type of constraint might be material availability. While not prevented by logic or design, 20 Mb hard drives for computers are no longer commercially available. A configuration specification must be valid against all desired constraints.

Accordingly, a configuration specification must be complete, that is, it must include all configurable characteristics. It must also be unambiguous, which means it must include some choice where a choice is required. Finally, a configuration must contain only valid choices, those allowed by logic, design, or other constraints.

In order to make efficient use of the present invention, an enterprise's configuration software developer must model the product or service and define the relationships between the product, its options, the availability of materiel, and other constraints. A good model possesses the same characteristics as a good configuration specification, and the developer environment 18 constructed in accordance with the present invention program module is an application that will help the developer build a powerful configurator model. The completed executable configurator 10 will help the enterprise's customers and salespeople understand the product, and recognize and choose from the options available. The rules of the model will ensure a valid configuration specification. The preferred software will allow experimentation with different configurations, helping to ensure that the final configuration is really what the customer wants.

There is an aspect of a model we have only touched on so far. A model must be easy to use. With the present invention, the developer environment 18 creates a visual or graphical user interface (GUI) for the configuration software that is easy to use. All user input is handled through on-screen objects called controls. These visible controls include familiar GUI objects like text entry boxes, drop-down select lists, check boxes, and radio buttons. The developer selects particular visual controls that are helpful for the configuration being created, as well as their arrangement and organization, to model the product's configuration options. Preferably, separate controls are provided for aspects of the product being modeled, and these controls are grouped together in a logical manner to facilitate navigation among the controls and selection of configuration options.

Using the example of an automobile as the product for which a configurator is being created, options that relate to the engine or drive train might be grouped together, while interior option packages, e.g. sound system, instrument package, upholstery, etc. might be grouped together, as would exterior type options. This logical modeling allows full advantage of the customer's thought processes, since a buyer considering an ergonomic, automatic seat option would more easily be led next into considering upholstery fabrics than into considering an anti-lock brake option.

So the "real world" is the logical configuration, and the selected visual controls provide the model. This part alone will achieve two of the three requirements for a configuration specification identified earlier. The choices are made complete by including them all on the screen, and non-ambiguity can be enforced by using the correct controls such as check boxes and radio sets. However, the third requirement is still missing. Rules are needed to define valid and invalid configurations. Parameters and constraints are utilized to define rules for the configuration.

A parameter corresponds to a data object variable or field. It is used to contain, save, calculate, compare, and display information. The contents of some of the parameters become the configuration specification when the user's configurator session is complete. Most visual controls on the user interface form will have an underlying parameter.

Constraints on the other hand establish the rules that define the valid relationships between parameters. Parameter values and relationships are used to manipulate the screen (the user interface) of the configuration software. They can be used to enable and disable whole controls, or to dynamically modify the available choices in a radio set, for example. To users of the configurator the parameters are invisible, as is the logic that does the work of the configurator.

Parameters allow great flexibility in defining the rules that enforce validity on a configuration. Logical and design constraints are especially easy to handle with "hard coded" parameters, since they do not change as often. However, certain types of constraints change fairly quickly, and some manner of reflecting these changes is necessary if the model is to remain an accurate representation of the real products options. So as to avoid modification, recompilation, and redistribution of the configuration software every time a minor change occurs, such as upholstery fabric availability for an automobile configurator, or the price of computer memory chips for a computer configurator, the preferred development environment allows creation of configuration software that uses data in external tables. These external tables may be stored locally in the salesperson's computer, or accessed remotely, as required.

External data is maintained by systems not forming a part of the present invention. The preferred development environment 18 supports many types of databases. The database tables can be created and maintained especially to support the configurator, or can be existing tables that are currently serving other enterprise business functions such as inventory, price lists, engineering product data, etc.

It will be understood that the more a developer can utilize existing, well maintained data resources available within the enterprise, the more quickly the developer will be able to build a configurator, and the easier it will be to keep dynamic data up-to-date. For example, if pricing information is drawn from a master price list maintained by the sales department, instead of creating another table for the configurator alone, changes to the master price list made in the normal course of business can be made to automatically affect the configurator, instead of requiring key-in of duplicate data into a configurator-specific table.

Querying of external data tables from the preferred configurator software and/or development environment is achieved using SQL (Structured Query Language) commands. SQL is a standardized method of querying databases well known in the art. It is supported by all major (and most minor) database products. The preferred development environment constructed as described herein provides tools to help the developer create SQL queries quickly and easily, and incorporate such SQL queries into the configuration software.

Queries on external tables may be used several ways by a configurator constructed in accordance with the present invention. One use is to create a dynamic list constraining the items displayed in a combo box (a "combo box" is a display of selectable choices in a list, typically displayed with a drop down menu and selected with a mouse click). An example of this might be a list of the available clock speeds for a computer's CPU, which are subject to change fairly often as a chip manufacturer enhances its technology or renders obsolete some of its product line. Instead of modifying the configurator when a 200 megahertz Pentium™ chip becomes available, a record is simply added to an external table and a combo box that derives its data from an SQL query will obtain and immediately display the new option in its list.

In addition to queries that return multiple records like the example above, some queries are designed to return a single unique record. This type of query, called a "lookup", can be used to display information about a configuration. For example, if a user chooses a model of main circuit board from a list, a lookup query can display additional product information or pricing or availability of that product.

Single record lookups can be used to constrain the enabling of a user control in the GUI. If, in the computer configurator example, a user selects a main circuit board model that has no 30-pin SIMM sockets, a lookup query can disable the appropriate radio button on the memory configuration page.

By using external data tables and SQL queries to constrain, calculate, and display data, the developer of a configurator can effectively model a dynamic product, with a minimum of maintenance.

With the foregoing overview of various technical needs of configuration software in mind, turn now to FIG. 3 for a discussion of the preferred configuration software and its construction. The preferred executable configuration software 10 typically comprises two main components, which are not necessarily integrated. First is the configuration software 10 itself, and second is the enterprise data environment such as ERP database 21. The preferred configuration software 10 is a self-contained executable computer program that, as previously described, is installed on a computer such as the salesperson's laptop computer 12. The executable program 10 handles all of user input, applies the rules and constraints the developer has set up, connects to any. required databases (whether stored locally or access remotely), executes SQL queries on such databases, and handles screen output. The executable program comprises a software component for providing a user interface 32, and a software component for providing the logic of the configuration 34.

The enterprise data environment 21 is transparent to an end user running the configuration software 10. However, if the enterprise's data environment is remotely connected such as by a communication link rather than being stored locally on the salesperson's computer 12, the end user may notice a database connection login dialog box that is customarily provided for security.

In the developer environment 18, tools are provided for creating the user interface component 32 as well as the configuration logic component 34. A user interface creation tool 41 allows a developer to create form or template for a user interface GUI screen, place and modify user controls. A configuration logic tool 44 allows a developer to create and specify parameters and constraints of the configuration. A compiler tool 47 handles creation of software objects, object maintenance, and code compilation to create the executable program.

The developer environment 18 may also include a data maintenance tool 35 that allows access to and manipulation of configuration data and other enterprise data that is stored in the ERP database 21. However, it will be understood that separate means may be provided in the workstation 15 for accessing and maintaining the enterprise's data in the ERP database 21.

As previously described, the present invention involves methods and tools for creation of an embeddable standalone configuration program module 10 including a user interface component 32 and a configuration logic component 34. Referring now to FIG. 4, those skilled in the art will understand that certain aspects of the present invention, in particular the configuration logic aspects relating to representation of parameters and constraints, may be provided for use in separate software with its own user interface maintained by an enterprise. As shown in FIG. 4, an alternative embodiment comprises an embeddable configuration program module 10' which has a disabled user interface component 32 but includes the configuration logic component 34. The developer environment 18 is the same, and is not illustrated in FIG. 4.

In order to utilize the alternative configuration software 10', an application program interface (API) is provided to allow a user's application 35 to employ its own user interface 36 independently of the user interface 32 constructed with the development environment 18 as described herein. However, as in the preferred embodiment, the configuration logic component 34 is operative to access the enterprise data environment 21 in the manner described herein. It will therefore be appreciated that aspects of the present invention relating to parameter and constraint representation and configuration logic are separate inventions having separate utility.

Configuration Software User Interface

One aspect of the present invention relates to methods of generating a user product configuration program module that executes configuration computations, which method is carried out in the developer environment 18. As will be described, the method involves displaying a form creation region on the display, the form creation region comprising a configurator screen display template for display of user controls and information.

A controls palette comprising a plurality of selectable controls is displayed in a palette region on the display. Each of the plurality of controls comprises a control object that, when activated by a command, causes display of a control corresponding to the selected control on the configurator screen display template.

An object inspector region is displayed with information corresponding to one or more predetermined properties of the selected control. These properties include a parameter property corresponding to information utilized in a configuration computation. In response to selection of the parameter property of the selected control in the object inspector region on the display by the developer, a parameter selector window is displayed The parameter selector window comprises an arrangement of a plurality of selectable parameters. In response to selection of one of the selectable parameters in the parameter selector window by the developer, information corresponding to the selected parameter is associated with the selected control.

A parameter explorer window, which is a separately activatable window from the parameter selector window in the disclosed embodiment, allows the developer to define parameters, including the application of various constraints to the parameters and queries use in defining constraints and parameters.

After completing the placement of various controls, and associating configuration parameters, constraints, queries, etc. with the controls, the configuration program is compiled. The output of the developer environment is an executable configuration program module which, when installed on a computer system, causes display of a user configurator screen display corresponding to the configurator screen display template and including the selected controls.

FIG. 5 illustrates in more detail the software component of the developer environment 18 as it is stored and maintained on a product engineer's workstation 15 as shown in FIG. 2, and how it is used to construct configuration software user interfaces in accordance with the present invention. The preferred developer environment 18 is an object-oriented software development environment constructed utilizing the Borland DELPHI™ software development program 500, manufactured by Borland International, Inc., Scotts Valley, Calif. (USA). Although details of the preferred Borland DELPHI™ software development environment are available in the literature supplied by the manufacturer, and the reader is referred thereto for details, certain aspects of the software development environment will be discussed to aid in the understanding of how to make and use the invention.

The Borland DELPHI™ software development environment 500 is a 32-bit visual development environment that allows construction of WINDOWS™ 95 based application programs. The software development environment provides a 32-bit visual component library (VCL) and includes more than 90 customizable, reusable components, including several Window 95 components. A developer can drag-and-drop these components into a target application. Such components include tree views, list boxes, notebook tabs, grids, multimedia controls, check boxes, radio buttons, and many other types of user controls and data display elements. The output of the Borland DELPHI™ development environment is a 32-bit DLL (dynamic link library) of code that can be executed and run on a properly configured Intel-based computer system.

Of particular usefulness in implementing the present invention, the Borland DELPHI™ development environment has tools that allow construction of client and server applications that permit 32-bit SQL links to corporate database servers. Database servers types supported include the known Interbase, Oracle, Sybase, and Microsoft SQL servers. A visual query builder is also provided that allows construction of complex database queries and SQL commands. Advantageously, use of the preferred Borland DELPHI™. software development environment facilitates the construction of custom user interfaces, as well as construction of parameters and constraints that rely upon SQL queries from external database or tables, as described herein.

Still referring in this regard to FIG. 5, those skilled in the art will therefore understand that certain Borland DELPHI™ elements, comprising a visual component toolbar 501, an object inspector region or window 503, and a target screen or template 505, are utilized as provided by the manufacturer, with modification as described herein. As will be described further below, the visual component toolbar 501 provides a number of user interface objects (user controls such as check boxes, text entry fields, radio buttons, etc.) that can be selected utilizing a pointing device, such as a mouse, and then placed in appropriate position onto the target display screen 505. Once placed into the display screen 505, properties of the selected object thereby placed on the screen are displayed in the object inspector region 503. The developer can then manipulate properties or data attributes of the displayed object.

Those skilled in the art will understand that the Borland DELPHI™ software development environment 500 includes an object class library 507 (TComponent) that can be utilized for construction of executable computer software such as the preferred configuration software described herein. As will be known to those skilled in the art, an object class library is a collection of developer-modifiable software objects that implement various computer program functions. These classes take care of basic computer functions such as handling menu commands, updating WINDOWS™ operating system dispatching events, dealing with the operating system, managing memory, printing, and so on. A computer programmer using the Borland DELPHI™ development environment need not write software from scratch for core operations common to WINDOWS 95™ applications. Rather than developing code from scratch with operating system calls, a programmer can implement existing classes in which lower-level interfaces have already been created. Object classes in the Borland object class library 507 all have an abstract type of TObject, from which other classes are descended in object-oriented programming parlance. Any especially-created classes of objects utilized for construction of the preferred configuration software module are designated in FIG. 5 as custom classes 508. These custom classes 508 are derived from the TComponent parent class, and have the class name ThtHiddenComponent, and inherit the program code of the parent class. Further discussion of various software objects that are descended from ThtHiddenComponent will be provided later herein.

A particular important aspect of the custom classes 508 created in the preferred developer environment 18 are visual components especially created for the user interface of the compiled configuration program 10. As will be discussed further below, these visual components include custom objects for parameters, constraints, queries, parameter groups, constraint groups, and query groups, and controls on the toolbar 501 for creating parameter-associated user controls on the target display screen Parameter, constraint, and query objects have associated visual display elements including corresponding display icons and hierarchical displays for selection and editing, which will be described in greater detail below.

A parameter is associated with a parameter icon 520, which is a solid blue box with a yellow capital letter P in the preferred embodiment.

A query is associated with a query icon 522, which is a solid blue box with a yellow capital letter Q in the preferred embodiment.

A constraint is associated with a constraint icon 525, which is a collection of small overlapping boxes in the preferred embodiment (although it will be understood that the design of the icon is completely arbitrary). A constraint applies to parameters; none, one, or many constraints can be applied to a parameter, and arranged for viewing and editing in a list. The list of the constraints can be expanded or collapsed by a developer command, such as clicking or double clicking on the group icon.

A group icon 530 is a collection of small overlapping boxes in the preferred embodiment, and signifies a hierarchically arranged collection of a plurality of related items. A group icon can be associated with parameters or queries. The view of the hierarchical arrangement can be expanded or collapsed by a developer command, such as clicking or double clicking on the group icon.

As described in greater detail elsewhere, there are five types of constraints provided in the preferred embodiment a string constraint associated with document icon 540, a discrete constraint associated with an X icon 542, a query constraint associated with a Q icon 544, a formula constraint associated with an X=Y icon 546, and a range constraint associated with a X( )Y icon 548.

The output of the developer environment 18 is the compiled configuration program module 10, which as described in connection with FIG. 2 is communicated via communication tools, e.g communication link 25 forming a part of the server synchronization agent 24 to the salesperson's laptop computer 12 or enterprise data server 21.

Configurator Discussion Example

Turn next to FIG. 6 for discussion of an exemplary configuration program module 10 constructed in accordance with the preferred embodiment of the present invention, created with the preferred developer environment 18 as described herein. In FIG. 6, it is assumed that the preferred configuration software 10 is executing on a suitable computer such as the salesperson's laptop computer 12 as shown in FIG. 2. For purposes of a discussion example, we will use an automotive product such as an automobile or truck to explain aspects of a typical configuration program module that can be developed using the present invention, and how it is made and used. This example illustrates a typical user interface for an automotive product configurator, and how the user interface is generated.

When running, the configuration program generates a user interface or display screen 600 for user interaction, which include various visual components and elements of a user interface constructed as described herein. The exemplary display screen 600 includes a number of visual elements, for example, a control button 602 labeled Accept, a control button 603 labeled CANCEL, a numerical data entry box 605 labeled "Maximum Budget" that allows entry of a maximum budget data amount of a customer, and a numeric data display box 607 labeled "Price as Configured" for display of the computed price of a configured product. These controls allow a user to input certain information and generally manipulate the configuration across a number of subsidiary screens.

In addition to the foregoing controls, the display screen 600 is organized in the example with a subsidiary tabbed display area 610, which includes a plurality of tab labels 612a, 612b, 612c, . . . A user with a pointing device such as a mouse and cursor can select various subsidiary screens such as General, POP (Preferred Option Preferences), Mechanical, Interior, Exterior, Lease, and Dump Body. As shown in FIG. 6, the General tab 612a has been selected, causing display of the visual elements Product Line 615, which is a series of graphic displays of goods in a product line (in this case automotive vehicles).

The General subscreen 610 further includes selectable drop down data boxes labeled Line 614 and Model 616, an information display window 618 that displays data about a selected Line and selected Model, and a numeric data display box 620 labeled "Base Price" for display of the base price of a selected line and selected model. It will be understood that by clicking on the various tabs 612, other subsidiary display screens associated with the configuration topics of POP, Mechanical, Interior, etc. can be reached.

In the FIG. 6 example, the "Gluon" product line has been selected, as indicated by the highlighted box 630 drawn around the diagram of the Gluon automobile, and as indicated in the Line drop down data selector box 614. A user can select a different product line, e.g. the Meson product line, by clicking on the graphic of the Meson automobile 632, or by using the Line data selector box 614. The configuration is thereby "constrained" in accordance with the selected product line; features and options of the selected product line will be available for further selection in accordance with the configuration presentation scheme determined by the developer.

Those skilled in the art will understand that the preferred configuration software development environment allows creation of the illustrated controls and displays, as well as other types of controls and displays. These controls and display derive from the DELPHI™ class TControl and include buttons (which derive from the class TButtonControl), list boxes (which derive from the class TCustomListBox), combo boxes (which provide for display of a selectable plurality of items and derive from the class TCustomComboBox), scroll bars (which derive from the class TScrollBar), radio groups (which derive from the classes TCustomControl and TCustomRadioGroup), and tabs (which derive from the class TCustomTabControl). Further details of these Borland DELPHI™ objects and classes is available in the literature supplied by the manufacturer.

Figure 7:
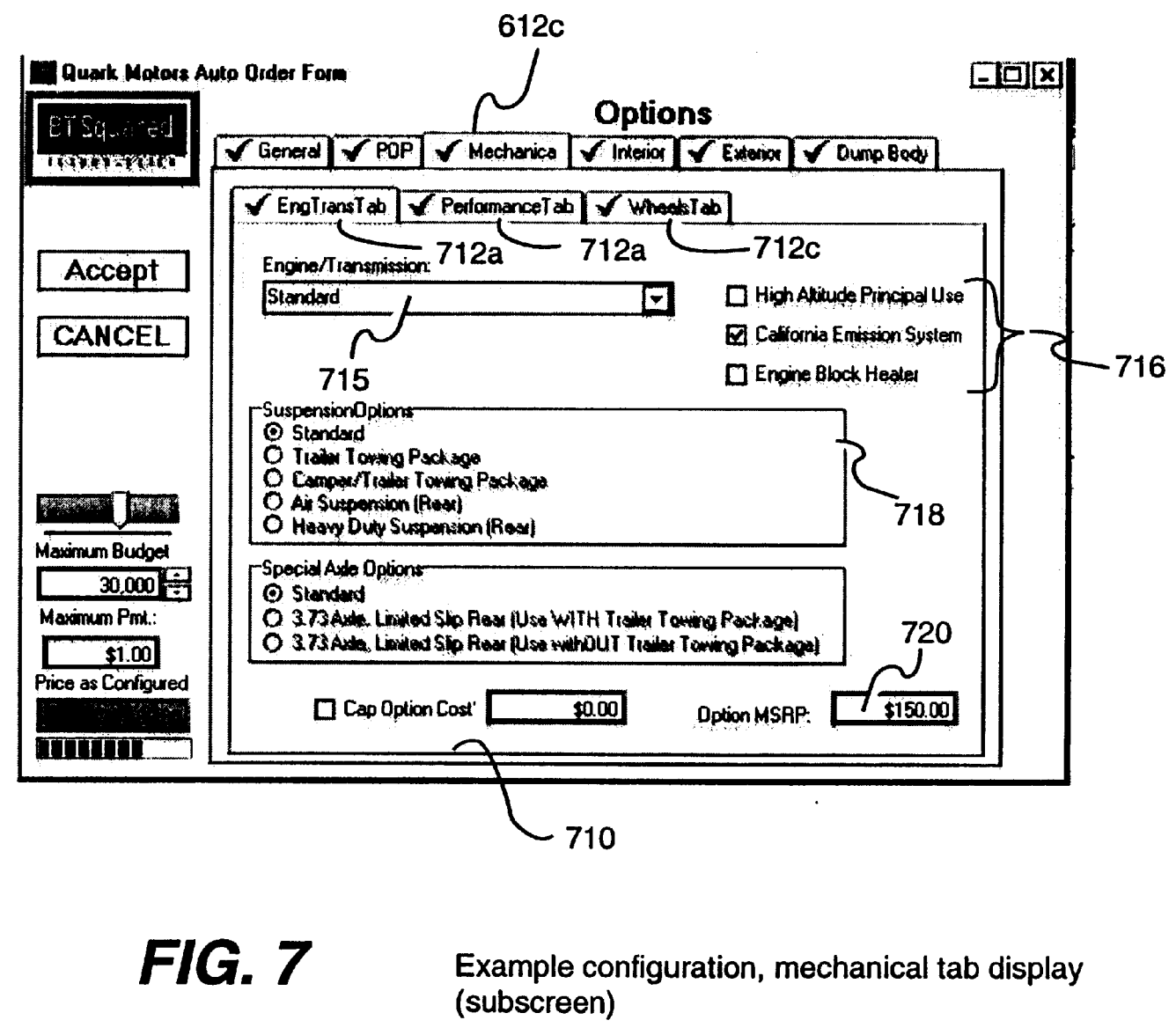

FIG. 7 illustrates an exemplary subscreen or subsidiary display area 710 that is displayed when the user to selects the Mechanical tab 612c from the display screen 600 of FIG. 6. In this example, the display now provides a subset of selection tabs 712a, 712b, 712c for features and options that are particular to the Mechanical aspects of the product being configured. The example shown illustrates a selected engine/transmission subscreen with a tab labeled "EngTransTab", which itself includes several display and control elements. An Engine/Transmission drop down selector box 715 displays a plurality of selectable engine-related items when the arrow is clicked in the known manner. A group of check boxes 716 allow selection of various optional features. A set of radio buttons 718 allows selection of mutually exclusive suspension options in the known manner, and a second set of radio buttons 719 allows selection of a mutually exclusive set of special axle options. An information display window 720 labeled "Option MSRP" displays the computed value of the selected option(s) and shows a subtotal of options based on the selections made in the window 710.

Those skilled in the art will understand that the foregoing discussion of various controls and display elements are by way of example and not by way of limitation, and that other types of user controls and informational display may be incorporated, including those provided in the preferred Borland DELPHI™ development environment as well as custom displays and controls that may be created especially by the developer.

With the foregoing automotive-related configurator example in mind as the discussion example, we will next describe how a configurator and its corresponding user controls and displays of a user interface, and associated parameters, queries, and constraints, is created using the preferred developer environment.

Creating a Configurator in the Developer Environment

In order to illustrate the manner of making and using the user interface of a configuration software module 10, including associated parameters, queries, and constraints, we will first cover the notion of creating a conceptual model of a product being configured, and the basic steps involved in creating the configuration software module itself.

Although the preferred developer environment 18 is a very flexible application, the end result configurator 10 will, after all, be a model of something real to the business of the enterprise. The physical objects, the data objects, and the visual components of the user interface must be tightly integrated in order for a completed configurator session to produce a valuable representation of the product. For example, if the configured product is an automobile, it makes sense to organize the model in a logical sequence around the physical aspects of the automobile, such. as engineer, interior, exterior, etc. Furthermore, it is contemplated that the developer will eventually have to modify the configurator to account for changes in the product or service. Reasonable care and planning at this stage will make such maintenance much easier.

By following the steps in order, a developer using the preferred developer environment 18 will be able to quickly build a quality working configurator. Note that the creation of the user interface form is one of the last steps.

The basic steps required for creation of a configuration software module 10 using the preferred developer environment 18 are as follows:

Define the data requirements and structure.

Create the parameter structure and any associated constraints and formulas.

Prepare any required external data resources.

Create any needed queries.

Create the visual interface/model and connect the underlying parameters.

Compile the program to create an executable configuration software program module.

It should be understood that these basic steps need not be in this particular order, and that other logical sequences of these basic steps are possible and within the scope of the invention.

The data requirements will consist of the parameters needed to completely specify the full range of product configurations, plus additional parameters to hold and display lookup information such as features and prices. The developer will use any existing resources available, such as order forms, price lists, engineering data, options, etc. to help create a complete configuration specification first.

As explained previously, a parameter is like a variable or a field. It is used to contain, save, calculate, compare, and display information. The contents of some of the parameters become the configuration specification when the user's configurator session is complete. Each visual control on the user interface of the configuration program module that relates to a configuration option, or that will be used to calculate, will generally have an underlying parameter. The structure of the data represented by the parameters should parallel the product being configured.

Parameters are used in formulas for defining relationships and constraints. The basic structure of a formula is as follows:

Parameters.InteriorOpt.Fabric.Color="Blue"

where the terms signify organizational arrangement such as topical headings, and the periods signify separation of the organization arrangement and allow presentation of a hierarchical relationship between the parameters. This particular formula involves the assignment of a predetermined character string, "Blue", to a predetermined parameter, Color, which is arranged hierarchically under higher level topics of fabric (Fabric), interior options (InteriorOp), and ultimately a type identifier (Parameter).

Parameters are organized into a logical structure using parameter groups. As will be described elsewhere, parameters may be logically grouped, in association with a displayed parameter group icon for ease of navigation through parameter selection windows for association of parameters with controls and other parameters, and through a parameter explorer window for manipulation of properties of selected parameters. Parameter groups are signified in display windows with a special icon, as is illustrated in FIG. 5.

Parameters are also used in Structured Query Language (SQL) WHERE clauses to reference the values of the screen controls, such as:

SELECT*FROM car WHERE FabricColor=: Parameters.InteriorOpt.Fabric.Color (The designator "car" indicates a selected external table, as will be known to those skilled in the art.)

Parameters are also used in quantitative formula calculations to assign one parameter a value as a function of other parameters. A formula to assign a value to the parameter "Parameters.TotalCost" might appear as follows:

Assign (Parameters.Qty*Parameters.UnitCost)

After the parameters are selected and defined by the developer, including relationships between parameters, the developer will preferably create the parameter structure. A display screen entitled Parameter Explorer, shown and described elsewhere herein, is used to create parameters and parameter groups, and to manipulate the parameter structure.

After the parameter structure is created, any necessary external data resources are prepared. This involves identifying any existing data resources the developer intends to use, and obtaining any documentation necessary to query that data, such as table and column/field names and data types. The more existing resources that can be utilized, the easier it will be to maintain the configurator.

Those skilled in the art will understand that the employment of external data resources and storage of data utilized in parameters is a significant advantage provided in the preferred embodiment of the present invention. As described in the background, a significant drawback with prior art configurator software is that the data employed in the inference engine for making configuration computations is embedded directly (hard-coded) into the configuration software, and a complex programming language expression must be utilized to implement the configuration logic. Prior to the present invention, it has not been possible to employ external data tables for storing information utilized in configuration computations, and to access that external data as needed by a precompiled program module, obviating the re-writing of programming code to incorporate the new data. Stated in other words, the present invention allows external data tables to be updated by means independent of the configuration software.

When the preferred configuration software 10 is utilized in its intended environment by a user, if it contains any SQL queries defining parameters, those SQL queries are executed upon tables utilizing path names or communication tools provided, and the data is obtained and utilized to define the parameters. Preferably, any SQL queries are effected at design time, that is, the time they are accepted in the SQL builder window (see FIG. 16B) so that the validity and syntax of the queries can be checked. As previously mentioned, SQL queries are also executed at run time of the compiled configuration software 18, and when any formula containing a query needs to be recalculated as a result of user input. The compiled software with its updated information is then made available to the sales force by communication tools previously described. In other applications, the compiled software with its embedded SQL queries can execute the queries directly from the computer system executing the configuration software thereby accessing and importing the required data for defining parameters.

Because of the utilization of external data resources, it will be appreciated that the updating of the configurator software merely entails executing SQL queries, and not rewriting program code. Furthermore, a compiled configuration software module that utilizes external data from tables results in very rapid execution time and quick response by the system to a user's command during a configuration session with a customer, as compared to an interpreted engine.

Returning to the discussion of configuration setup, the developer, using the tools of choice, will create any configurator-specific external tables in any SQL compliant database environment. Table data types should match the data types of the parameters as much as possible. The developer will use a display window denominated Query Explorer, shown and described elsewhere herein, to create and organize queries. The Query Explorer window allows creation of SQL queries by developer text entry and selection of parameters in a selectably displayable window denominated a "query builder", shown and described elsewhere.

A query builder window is displayed in response to a developer command such as clicking on a particular icon in an object property that supports a query.

Similarly, any mathematical or logical expressions are created or built in a selectably displayable window denominated a "formula builder", shown and described elsewhere. A formula builder window is displayed in response to a developer command such as clicking on a particular icon in an object property that supports a formula.

Since the builder windows (e.g. formula builder window, query builder window) and editors allow tree-type hierarchical navigation and double-click selection, well organized queries enhance the developer's ability and efficiency in developing and maintaining the configurator.

A primary property of a query object is the SQL property. Clicking a builder button, shown as a box with three dots  in the object inspector window 503 in the preferred embodiment will opens a SQL builder window. The developer uses the SQL builder to enter the SQL code itself.

The developer then create queries for any foreseen dynamic constraints, such as combo box lists, control enabling, or data display. These queries are selected or added when adding query constraints.

Next, the developer creates the visual interface. Turning next in this regard to FIG. 8, the developer, using the user interface for the developer environment 18 (or "developer interface"), utilizes the toolbar 501 to create a user interface screen, place controls, inspect properties of selected objects, and compile the program. The preferred developer environment provides the user interface regions of toolbar 501 (which provides a number of tools, some parameter-related, some system related, and some more general), the object inspector region 503, and the target screen display or template 505. In addition, other tools or clickable icons are provided for system control, for example a "new file" icon 809 that causes creation of a new configurator file, an "open" icon 811 that generates a menu for selecting a previously created configurator file, a "save" icon 817 that generates a menu to save the current configurator file to disk or other storage medium, and a "compile" icon 820 that causes the developer environment to compile the code representing the current configurator and create the executable configuration program module that can be run by a user. These system commands are also available under the File menu 803, in the conventional manner.

Typically, the developer first initiates a new user target screen display or template 505 by invoking the New command (not shown) under the File menu or by clicking the new file icon 809.

In response to the New command, a blank configurator visual user interface is displayed for placement of user controls and information. The template 505, like almost everything else in the preferred object-oriented developer environment, is a software object derived as an instance of a preexisting parent class having properties that can be edited or customized.

Once the blank template 505 is created, properties of the template as a data object are displayed in the object inspector window 503. As shown in FIG. 8, there are various properties of the template that can be adjusted by the developer. The blank form template 55 is a software object of type TForm1, derived from a Borland DELPHI™ class, which is displayed in an object name region 801 in the object inspector window. After the screen display template 505 has been created, the developer will "drop" various controls onto the form that allow users of the compiled program to specify product configuration. These controls can be selected from the toolbar 501, which as shown in FIG. 8 provides a collection of selectable general control objects under tabs labeled Standard, Additional, Win95, System, Parameter Controls, and Extensions. As will be described, the Parameter Controls are employed to create user controls associated with configuration parameters; the other types of controls are provided in case the developer wishes to utilize the general controls such as provided in the preferred DELPHI environment.

As an aside, it is recommended that the developer incorporate one or more organizational controls such as multi-tab controls or subscreen objects shown in FIG. 6 and FIG. 7, as such objects are provided in the DELPHI™ development environment. Such organizational controls facilitate a useful, user-friendly interface for navigating around complicated products or services.

Next, the developer will begin creating the user controls to which parameters are attached for purposes of determining the configuration. This step is invoked by clicking on the Parameter Controls tab 806, which causes the toolbar 501 to change from that shown in FIG. 8 to that shown in FIG. 9.

In FIG. 9, a plurality of parameter-associated type user controls are displayed in region 910; each parameter-associated type control is identified in the toolbar 51 with the "P in a box" icon 520 like that shown in FIG. 5.

FIG. 9 shows new check box type parameter-associated control object 902, labeled TbtPACheckBox, placed onto the template 505. The check box control 902 is placed by first clicking on the check box type control 903 and then clicking at a location on the template 505 where the control is desired. In the preferred developer environment, properties of the object will immediately appear in the object inspector 503, including the parent class of the object in the object-name region 901. The name of the particular control object 902 can be set by an entry of text in the Name property 904, and a parameter can be associated with the check box by entry of data into the Parameter property 906.

Still referring to FIG. 9, if the developer selects the Parameter property 906, it will be highlighted and a selector box (a box with three dots) 908 appears. If the user clicks in the parameter selector activation box 908, a parameter selector window appears.

Referring in this regard to FIG. 10, the parameter selector window 1001 comprises a window showing a hierarchical display of pre-created parameters. The parameter selector window 1001 includes a parameter group icon 1003 with a hierarchy of associated exemplary parameters labeled Parameter1 1005, Parameter2 1007, etc. In addition, the parameter selector window includes expand/contract buttons or icons 1015 that can be selected for causing the hierarchy of parameters under a given parameter group icon such as 1003 to expand or collapse, as desired.

In this example, the parameters are designated as Parameter1, Parameter2, Parameter3. A selected one of these parameters can be associated with the newly created check box 902 by a customary selection method such as double clicking on the small icon to the left of the named parameter, e.g. Parameter1 in the window 1001. Once the parameter has been associated with the control, the developer clicks the OK button 1012. The parameter, e.g. Parameter1, with its full path will appear in the parameter property setting under Parameter 906. An example of a full path name is provided later.

It will be understood at this juncture that if the developer has not yet created parameters, it is meaningless to associate blank parameters with a control. Accordingly, the developer should have already followed the preceding steps to create parameters. Furthermore, any required queries and/or constraints must be applied to selected parameters.

In order to more particularly illustrate these points, we will now abandon the general discussion of setting up a new configurator and turn to a discussion of the specific application of parameters to controls in connection with the automotive example introduced in FIG. 6 and FIG. 7.

However, before so doing, we conclude this discussion with the following as to how the process is completed—the developer continues the process of creating user controls, assigning parameters, etc. until the configuration is complete. Then, the program is compiled to create the executable configuration program module. This is effected by pressing the "compile" button 820, a small triangular icon, on the left side of the toolbar. This causes the developer environment to compile the program, check for errors, and (assuming no errors) provide a compiled DLL as an output.

Application of Parameters to User Control—Specific Example

Referring now to FIG. 11, we return to a specific example, namely the developer mode of the automobile-based configuration module whose user screen is shown in FIG. 6 and 7. In FIG. 11, the target display screen 505 for this configurator is set to display the Interior options, by selection of the Interior tab 1102. The display includes a selected check box 1101 labeled "Special Options", having a Name in the object inspector properties name box 1103 as "SpecialOptions" with an associated parameter designated:

"Parameters.Interior.Sound.SpecialSoundOptionsAvailable."

The full path name indicates selection of a parameter, under the Interior subheading, under the sub-subheading Sound, and the particular parameter SpecialSoundOptionsAvailable.

In addition to the check box 1101, there is a drop-down text selector box 1109 labeled "SS", a check box 1112 labeled "CD Changer (6 disk)", and an edit box 1114 labeled "Amplifier Wattage". These controls provide additional sound-system related options for the configuration. As will be seen, these controls are related to one another through the underlying parameter structure.

Assume next that the developer has clicked on the parameter selector activation box 1108, shown in connection with the Parameter property 1104 in the object inspector window 503. This causes display, as previously described, of a parameter selector window as shown in FIG. 12.

In FIG. 12, the parameter selector window 1210 is similar to the parameter selector window 1001 in FIG. 10, except it displays the particular parameter structure for the automotive example being discussed. The parameter selector window 1210 comprises a hierarchical display of available parameters, organized topically so that selection of an appropriate parameter is facilitated by navigating through the hierarchy until the desired parameter is displayed. The parameter selector window 1210 comprises a principal heading labeled Parameters 1220, with a parameter group icon 1221 displayed to the left. Positioned beneath and indented to the right of the Parameters heading are a plurality of subsidiary parameter headings, each bearing a parameter group icon to the left, and labeled General, Packages, Mechanical, Interior, Exterior, and Dump Body.

The Interior subheading itself contains subsidiary headings, each again having an associated parameter group icon to the left, bearing labels Seating, Sound, Climate, and Trim., as well as a particular parameter 1223 labeled "IntOptMSRP".

The Sound parameter group subheading is associated with, and includes, four separate actual parameters: SoundSystem, SpecialSoundOptionsAvailable, CD6, and AmpWattage. Each of these actual parameters have the parameter icon associated therewith, as shown at 1225. These are the actual selectable parameters that can be associated with a selected object, which it will be recalled is a check box 1101 in FIG. 11 in the example being discussed.

Assume in FIG. 12 that the parameter SpecialSoundOptionsAvailable has been selected by the developer, by pointing and clicking. Note that the full path name for the selected parameter is shown in the parameter name field 1204 as:

Parameters.Interior.Sound.Special.OptionsAvailable

It will therefore be appreciated that the parameter group headings, each of which are associated with a parameter group icon such as that shown at 1221, forms a part of the full parameter name as displayed in the Parameter property 1204 of the Special Options check box 1101, whose properties are still visible in the object inspector window 503. The developer can select different ones of these parameters, as desired, in order to associate a parameter with a control, and construct the user interface in the manner described herein.

Upon completing the association of all desired parameters with all desired controls, the developer will be finished with creating the user interface for the configuration program module, and is ready to create the compiled configuration program module. Although further discussion will be provided below for the subjects of creating queries and for applying constraints to selected parameters, for the time being it will be understood that the next and final step is to compile the program. The steps of applying constraints and formulating queries relate primarily to the creation and application of parameters, and less to the notion of the manner in which a parameter is represented in the developer environment, which forms one aspect of the present invention.

Representation and Application of Constraints to Parameters

As previously mentioned, constraints govern the retrieval, calculation, and display of information in a configurator form. In the preferred embodiment of the invention, there are five different types of constraints—a range constraint, a discrete constraint, a string constraint, a query constraint, and a formula constraint. Examples of the application of these different constraint types will be provided.

A constraint will generally evaluate to true or false, valid or invalid, for a given data condition. The visible effect of that result depends on the type of constraint and where it is used. For example, FIG. 13 illustrates how an exemplary parameter "Clock Speed" associated with three different types of user controls—a combo box 1302, a text entry box 1305, and a radio button set 1307—is displayed. Assume that the parameter is constrained by a query (not shown) on an external table that returns a list of computer processor speeds based on a selected CPU. The combo box 1302 shows all the various choices available with a drop-down menu that is activated by clicking on a drop down arrow 1310. The text entry box 1305 allows entry of a desired choice of processor speed. The radio button set 1307 allows a mutually exclusive choice of one from a number of choices of CPU speeds. The visible results of a valid choice will be selection of the appropriate data, for example, the indication of the processor speed "166" in the data entry region 1312 of the combo box, or inside the text entry box, or a depressed button 1315 besides the 166 in the radio set.

On the other hand, an invalid condition is indicated by red highlighting, which is shown in reverse video (white characters on a black background). For example, "2" is not a valid choice amongst the available choices in the drop down menu 1302. Thus, for the combo box, an attempt to enter 2 causes the numeral 2 to the entered, but the constraint, when applied, realizes that this is not a valid choice and causes the invalid condition to be indicated by highlighting the combo box, as shown at 1320. The invalid condition for the text entry box 1305 is similarly indicated in reverse video, as shown at 1322.

For a radio button, it is not possible for the user to directly enter an invalid "2", since the only manner of data entry for a radio button set such as 1307 is selection of one of the available (non-grayed) choices. However, it is possible that through indirection, a parameter such as "Clock Speed" could be set through a formula or another control elsewhere in the configurator. In case the parameter "Clock Speed" is set indirectly, a radio button set associated with the parameter having a different set of valid alternatives will "gray out" the choices in the radio button, thereby preventing the user from selecting the invalid choice. This is indicated at 1325 in FIG. 13.

It will be recalled from above that constraints are associated with parameters, and that constraints are applied through a parameter explorer window which is utilized to edit properties of parameters, create formulas, and apply constraints. If no constraint is specified for a selected parameter, that parameter is considered "unconstrained" and all values legal for the data type are valid. However, if any constraint is specified, it becomes a constrained parameter. An entry in a control associated with a constrained parameter must be permitted by some constraint for a valid condition to exist.

In the preferred embodiment of the present invention, constraint values are additive. That is, the developer can provide multiple instances of a single type of constraint, and can provide multiple types of constraints on the same parameter. To be valid and provide data for the parameter, a data entry need only satisfy one of the conditions indicated by the constraint.

An example of the additive nature of the constraint values is illustrated in FIG. 14, which is an example based on the automotive example of FIG. 6 and FIG. 7. Consider in particular first that a particular product line of automobile (e.g. Gluon) has been selected in FIG. 6, and second that the Interior tab 612d in FIG. 6 has been selected to cause display of a subwindow of options associated with the interior of a vehicle being configured. A subsidiary display screen 1401 for the interior options is displayed, which in turn includes a sub-subscreen 1405 having a pair of tabs, one labeled Seating 1402 and one labeled Sound 1406.

Assume in FIG. 14 that the Sound tab 1403 has been selected, thereby causing the display of the sub-subscreen 1405, which includes three controls: a special options check box 1408, a sound system drop down selector or combo box 1410, and a CD Changer check box 1412. In the normal mode with the Special Options box 1408 not checked, the drop down combo box 1410 displays two selectable options "Standard" and "Electronic AM/FM Stereo/Cassette" to indicate that these options are available for selection.

If the user checks the Special Options check box 1408, a different display of options appears in the combo box 1410, as indicated in FIG. 14B. In this case the combo box indicates five choices of: Standard, Electronic AM/FM Stereo/Cassette, High Performance Package #1, High Performance Package #2, and After Market Setup Only.

Figure 14A:
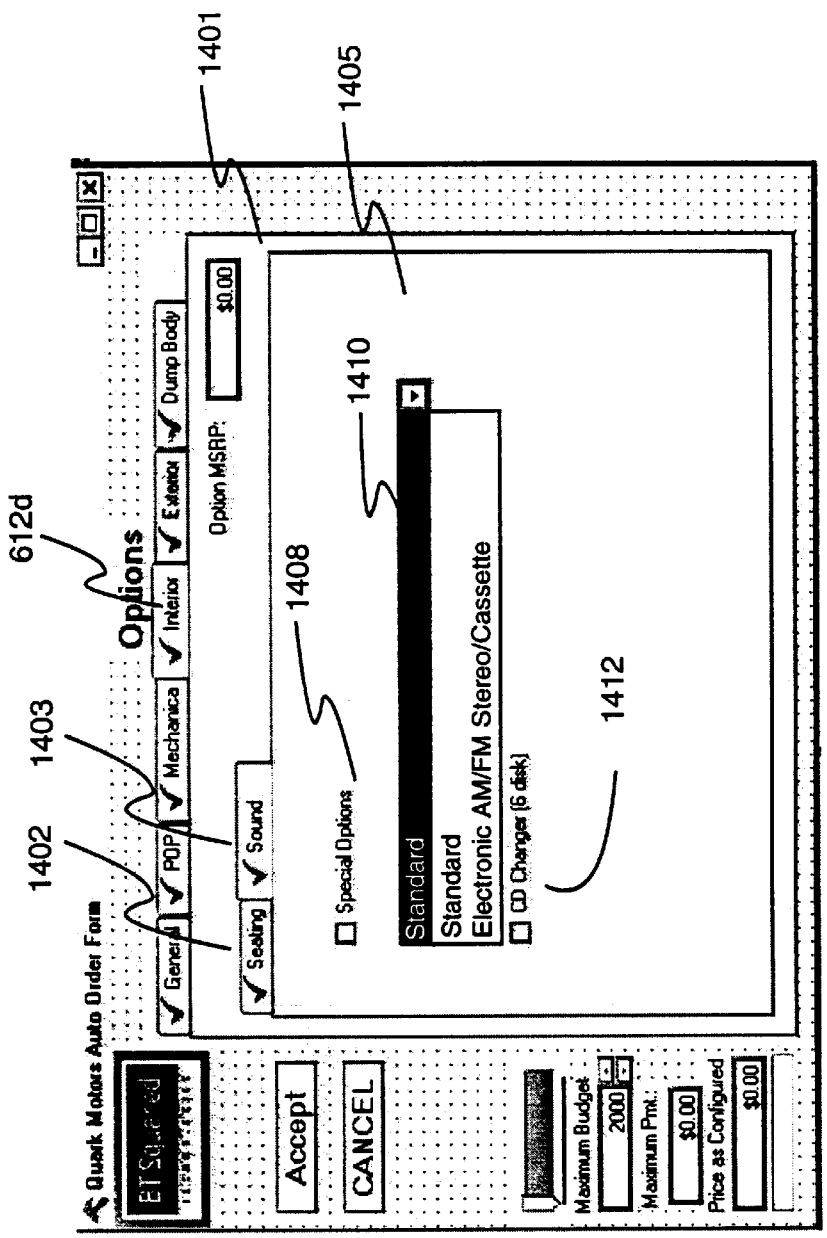
FIG. 14, consisting of FIGS. 14A and 14B, illustrates the user mode of the example automotive configuration, showing the effect of the application of constraints for a particular product model.
Figure 14B:
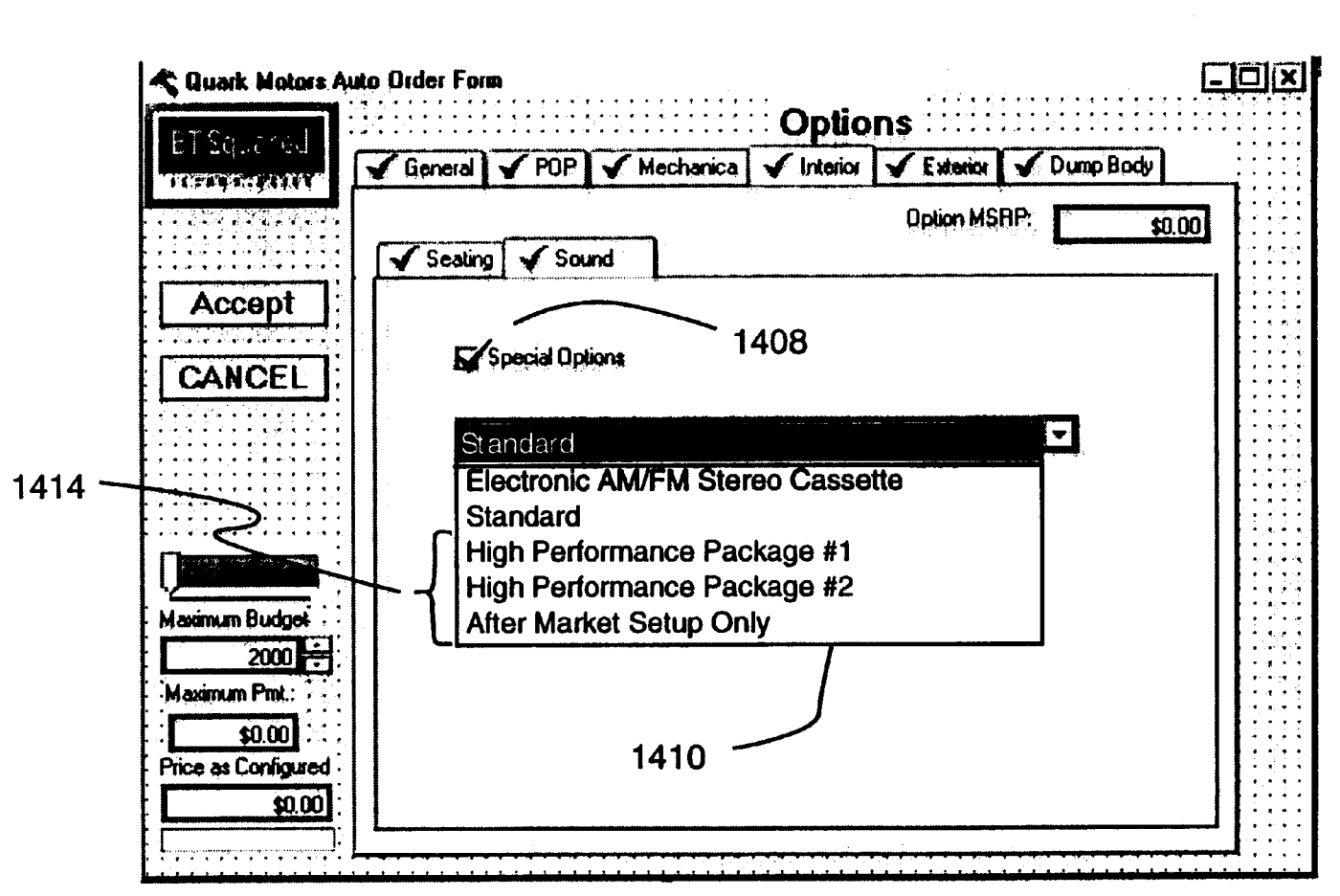

It will be appreciated that the options available without the box 1408 being checked in FIG. 14A have been added to the options available with the box check in FIG. 14B. This illustrates the additive nature of constraints, for the example shown.

It should be understood at this juncture that the data value Standard provided in the combo box 1410 is the result of application of a discrete constraint, the data value Electronic AM/FM Stereo/Cassette is the result of a query constraint, and the group of three data values 1414 of High Performance Package #1, High Performance Package #2, and After Market Setup Only are the result of a string constraint. The application of these constraints is discussed in connection with later figures.

Figure 15A:
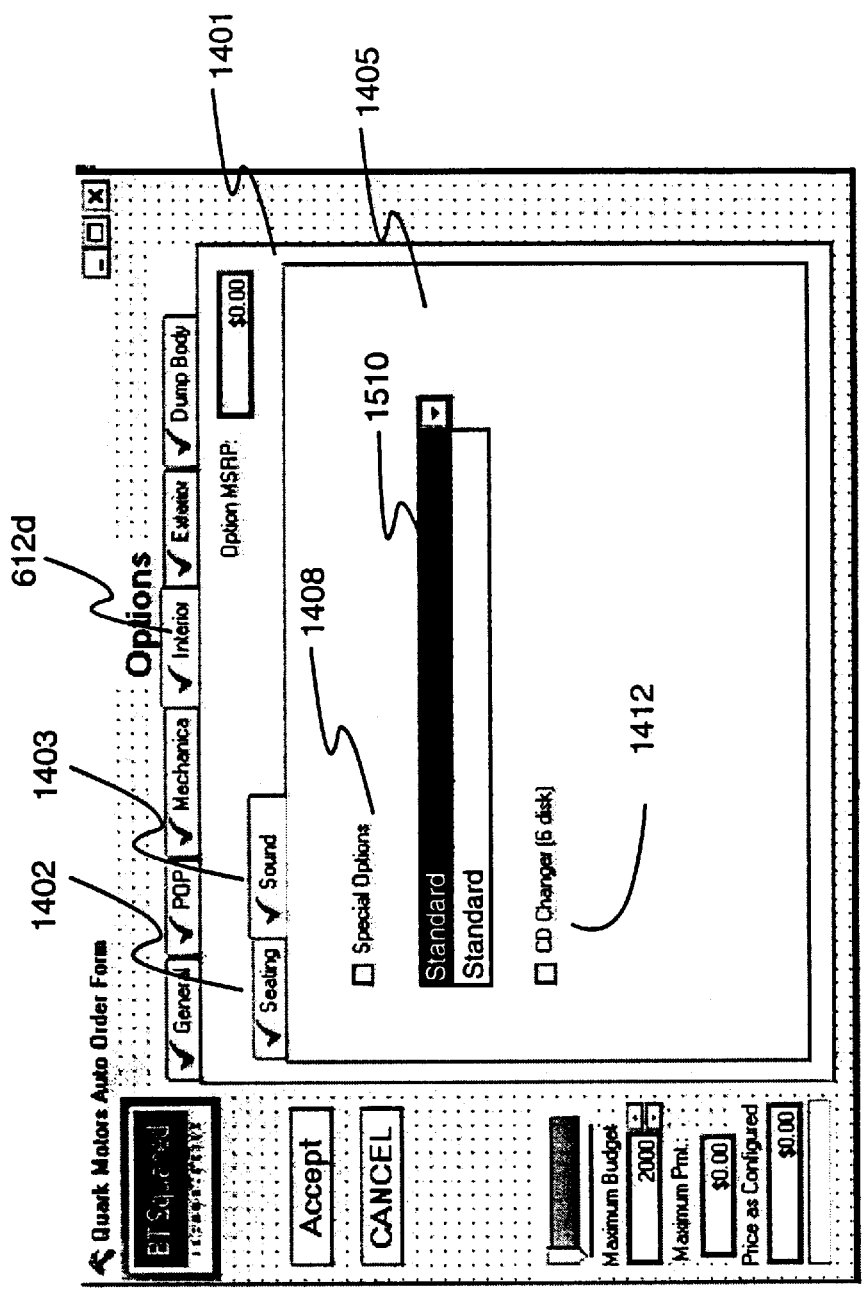
FIG. 15, consisting of FIGS. 15A and 15B, illustrates the user mode of the example automotive configuration, showing the effect of the application of constraints for a different product model than that of FIG. 14.

It should also be understood at this juncture that constraints can be keyed to other parameters. The example of FIG. 14 is keyed to the parameter of product line, as the Gluon product line was selected. If the user selects a different product line (e.g. Meson) in the screen as shown in FIG. 6, a different set of choices may be displayed. For example, assume now that the Meson product line has been selected. In FIG. 15A with the Special Options box 1408 not checked, the drop down combo box 1410 now displays two selectable options "Standard" and "CD Changer (6 Disc)" to indicate that these options are available for selection. Notice that the "Electronic AM/FM Stereo/Cassette" is not available for this product line.

Figure 15B:
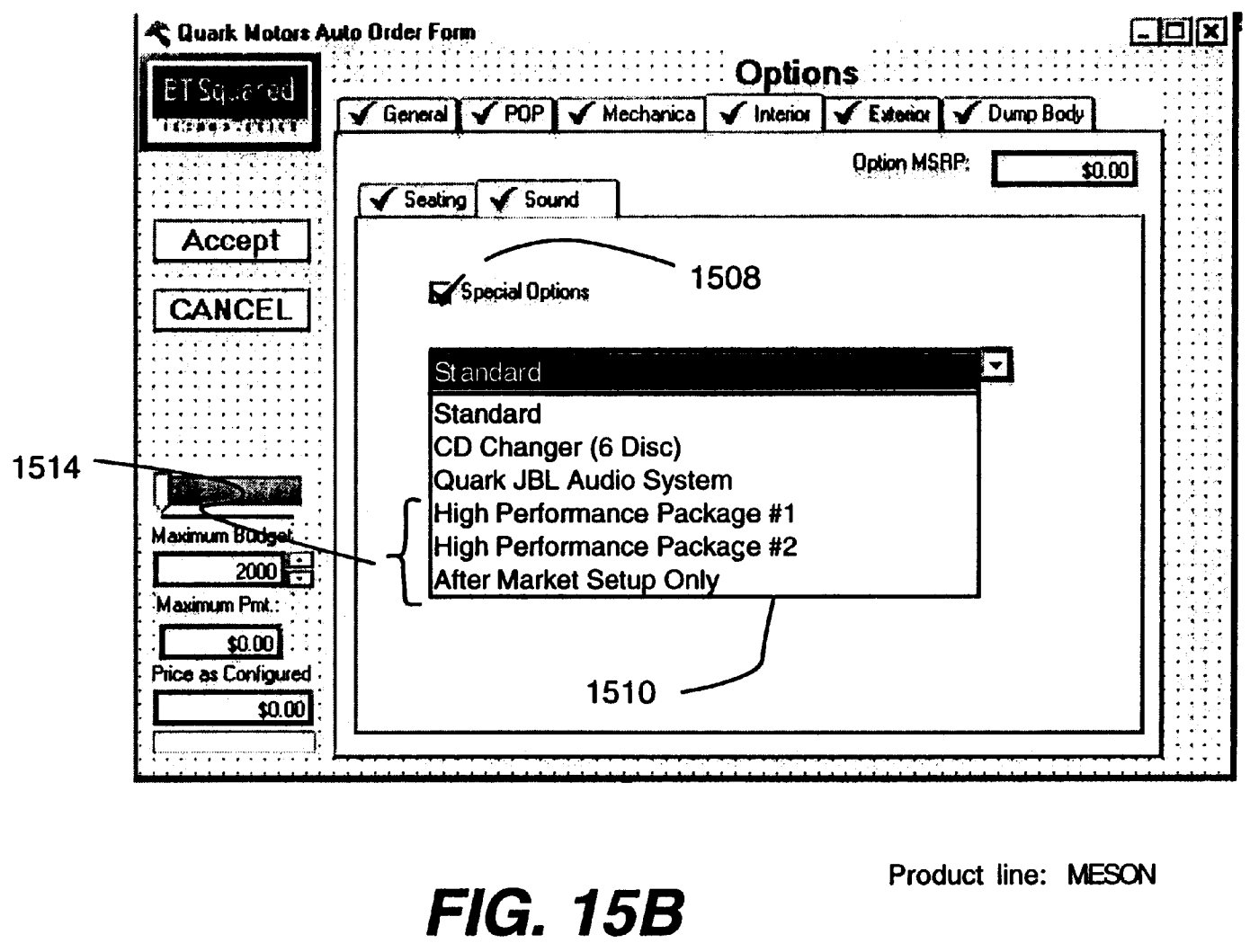

With the Meson product line selected, if the user checks the Special Options check box 1408, a different display of options appears in the combo box 1410, as indicated in FIG. 15B. In this case the combo box indicates six choices of: Standard, CD Changer (6 Disc), Quark JBL Audio System, High Performance Package #1, High Performance Package #2, and After Market Setup Only. Again, it will be appreciated that tire options available without the box 1408 being checked in FIG. 15A have been added to the options available with the box check in FIG. 15B, again illustrating the additive nature of constraints.

It will be noted at this juncture that the examples, of FIG. 14 and FIG. 15 illustrate how a parameter, e.g. Sound system, can be constrained in different manners, as well as the additive nature of constraints in the preferred embodiment of the present invention. The parameter Sound system has three different constraints applied to it—a query constraint, a discrete constraint, and a string constraint. The manner of applying these constraints is discussed below.

It will therefore be understood at this juncture that the data value Standard provided in the combo box 1510 is the result of application of a discrete constraint, the data values CD Changer (6 Disc) and Quark JBL Audio System are the result of a query constraint based on product line, and the group of three data values 1514 of High Performance Package #1, High Performance Package #2, and After Market Setup Only are the result of a string constraint. The application of these constraints is discussed in connection with later figures.

As will be discussed in greater detail below, the particular options indicated as available in FIG. 14B and FIG. 15B are particular to a selected product line, and are the result of a query to a database which fills in the options information based on the particular product line. Accordingly, it will be understood that the information displayed in the drop down combo box 1410 is dependent upon parameters, queries, and the state of conditions such as whether or not a control (a check box) is activated by user.

It will be appreciated that a developer can define configuration options, e.g. a car's sound system options, by applying multiple constraints. For example, "Standard" could be a valid entry for all products defined by a discrete constraint. "CD Player" could be a valid option for most models, defined by a list constraint. Other options that are particular to a certain product line could be defined by an additional discrete constraint, or in the example mentioned, a query constraint, with data being derived from an external database.

A constraint is applied, or turned on or off, by use of a formula in the "Used when" property of the constraint, as viewed in the parameter explorer window. The properties of a constraint item, as represented in a display oil constraints to be described next, includes a conditional application property indicated as "UsedWhen". In response to the developer's command relating to the conditional application property, a formula builder window is displayed on the display, which comprises a region for developer input of a logical condition for application of the constraint represented by a constraint item to the parameter.

The developer should be certain to ensure that a formula evaluates to a true condition when it is desired that the constraint's values permit a valid condition. When the developer wants the values allowed by the constraint to be ignored, or not considered a valid match, then the formula should evaluate to a false condition. For example, a Used when formula for a constraint could test the value of a Model parameter the evaluate to a false condition if the vehicle was an economy mode, making "CD Player" invalid as a sound option for that model.

FIG. 16, which consists of FIG. 16A and FIG. 16B, illustrates the manner of associating one or more constraints (specifically, a query constraint) with a selected parameter in the developer environment 18, and how the constraints are applied to cause the value of the parameter to be displayed in accordance with the constraints and conditions. The discussion example of FIG. 16 is based on the automotive sound system configuration example of FIGS. 14 and 15.

Incidentally, FIG. 16A further illustrates a query selector window that is utilized for selection of a query for association with a query constraint.

In addition to the toolbar 501 and object inspector regions 503, the parameter explorer window 1603 is displayed on the right hand side of the screen (the window is preferably resizable and repositionable). The parameter explorer window is activated by selection of the Parameter Explorer command under the View menu 1604. The Parameter Explorer window 1603 is displayed at this juncture because the developer desires to associate and attach constraints to a particular parameter, in this case the SoundSystem parameter 1608.

As will be recalled from the discussion above, parameters are grouped in the parameter explorer window (and in other parameter associated windows) with a parameter group icon, as shown at 1606. A plurality of parameters are shown in association with the Sound parameter group, including SoundSystem 1608, Special Sound Options Available 1610, CD 1612, and Amp wattage 1618. It will be noted that certain of these parameters include an associated group of constraints, as indicated by constraint group icons shown at 1616 and 1620. It will further be noted that the constraint group icon 1616 associated with the SoundSystem parameter 1608 has associated therewith a plurality of constraints, shown as Q SSList 1622 (a query constraint), X Standard 1624 (a discrete constraint), and Special Options List 1626 (a string list constraint), which is associated with a small square icon. The constraint group icon 1620 associated with the Amp wattage parameter 1618 has associated therewith the constraints WattageRange (a range constraint) and NA When standard (also a discrete constraint). These examples cover all five different types of constraints that are provided in the preferred embodiment.

Query Constraint Application

As with other data items in the present invention, constraints are data objects, for which properties can be displayed and edited in the object explorer window 503. Still referring to FIG. 16A, the query constraint object 1622 is shown highlighted. Accordingly, this query object and its properties are displayed in the object inspector window 503. The Name of this particular constraint is SSList 1630, it is of object type TbtQuery Constraint as shown at 1631 and it includes a Query 1632 identified as:

Queries.Quark.Interior.SoundSystem.

The attributes and properties of the query identified Queries.Quark.Interior.SoundSystem are inspected and manipulated via a Query Explorer 1670, shown in FIG. 16B.

Note also that the properties of the query object 1622 displayed in the object inspector window 503 include a Used when property 1634 which presently has the value (None). The property UsedWhen is employed to determine the conditional application or not of the constraint. Since there is no condition attached to the query constraint, its values will be displayed unconditionally. That is, the data obtained from an external table as a result of the query are applied to the associated parameter unconditionally.

FIG. 16A also illustrates a query selector window 1650 that is displayed when the developer clicks on the selector box associated with the Query property. The query selector window shows a hierarchical arrangement of previously created queries, with query group icons 1652, 1654, 1658 for organization. The display is shown in the expanded mode, so that the queries available under the query group headings Queries, Quark, Interior are visible. For example, the developer could select the SoundSystem query 1660 or the SSCount query 1662. The display is expanded or collapsed by use of expand/collapse buttons shown at 1665.

FIG. 16B shows the display of the preferred Query Explorer window 1670 and a query builder window 1680 that is displayed in response to the developer selection of a particular query from within the Query Explorer window. The Query Explorer window 1670 is constructed similarly to the Parameter Explorer window in FIG. 16A, but displays queries instead of parameters. The Query Explorer window is the mechanism provided in the preferred embodiment for creating and maintaining queries that can be utilized to access external data in table for use in association with parameters and constraints.

The Query Explorer window 1670 includes a hierarchical display of the queries that have already been created, arranged and organized with group icons such as shown at "Queries" 1673, Quark 1675, and Interior 1676. A particular query SoundSystem 1677 is shown selected and highlighted, such that its properties as an object are displayed in the object inspector region 503.

Note that the properties of the selected query object SoundSystem include an SQL property 1679, with associated selector box 1678. In response to the developer activation of the selector box, a query builder window 1680 is displayed. The query builder window includes a variables region 1681 for display and selection of parameters, a functions region 1682 for display and selection of SQL related functions, and an SQL expression region 1684 for construction of an SQL query, such as the query. The specific SQL query 1685 illustrated, denominated SoundSystem, is operative to retrieve data from an external table that is identified in the known SQL language, and selects fields of data from the identified external data table in the manner known to those skilled in the SQL arts.

Note also that the Query Explorer window 1670 includes a "Q" icon 1690 displayed at the lower region of the window. This icon is a "new query" command icon that creates a new query object and displays the object in the hierarchy (e.g. like the SoundSystem query 1677). This new query icon is displayed when the developer selects a query group icon, e.g. 1675, 1676.

Discrete Constraint Application

FIG. 17 illustrates the parameter explorer window 1603 when the Standard discrete constraint 1624 is selected. The properties of the selected constraint item or object are shown in the object inspector window 503 and similarly include a Name at 1730 of Standard, object type TbtDiscrete Constraint 1731, a conditional UsedWhen property 1734, and a Value property 1736. The Value property 1736 represents the discrete constraint's actual data value that is applied either unconditionally, or conditionally as a function of whether the UsedWhen property evaluates to true or false.

Sting Constraint Application

FIG. 18 illustrates the parameter explorer window 1603 when the Special Options List string type constraint 1626 is selected. The properties of the selected constraint 1626 are shown in the object inspector window 503 and include a Name at 1830 of SpecialOptionsList, an object type of TbtStringListConstraint 1831, a UsedWhen property 1834, and a Strings property 1836. The UsedWhen property 1834 includes a formula, as indicated by the indicator (Formula) and the selector box 1840.

The Strings property 1836 shows a data value of (Strings), which when selected, displays a selector box 1842 that allows access to the character strings to be displayed. It will be recalled that these character strings are those as shown at 1414 in FIG. 14B and at 1514 in FIG. 15B, namely, High Performance Package #1, High Performance Package #2, and After Market Setup Only.

Figure 19:
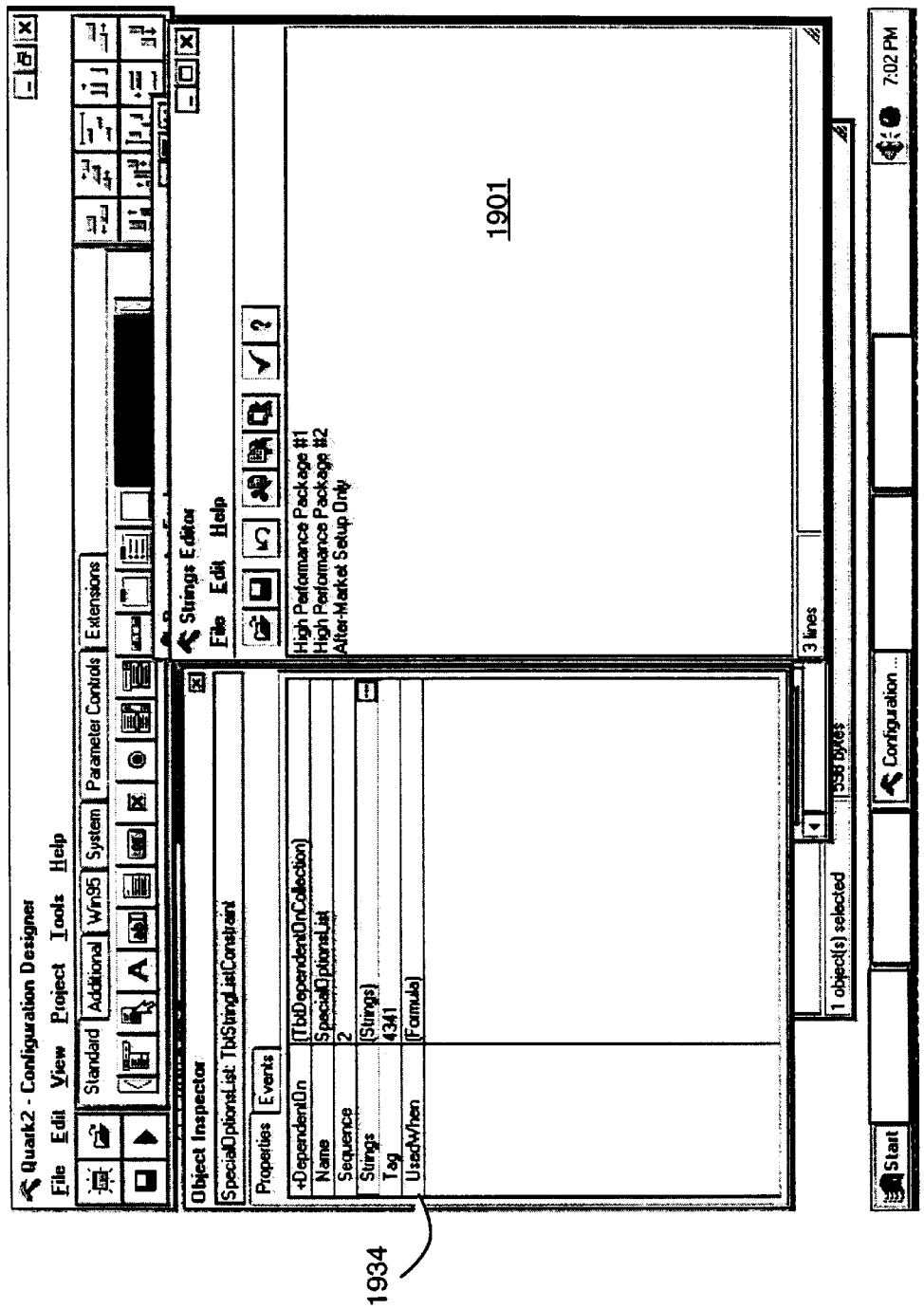
FIG. 19 illustrate a Strings Editor window that is displayed in connection with the string list constraint of FIG. 18.

FIG. 19 shows a Strings Editor window 1901 that appears in response to the developer's selection of the (Strings) selector box 1842. This window provides a text editing window that operates in a well known manner, and provides an area in which the developer can type text strings that form the strings applied in a strings constraint.

FIG. 19 shows the formula builder window 2001 that is displayed when the selector box 1840 of the UsedWhen property in FIG. 18 is activated by the developer. The formula builder window 2001 allows the developer to navigate amongst various parameters and queries, select logical functions, and build a logical formula that evaluates to a true or false condition to control the application of the particular constraint.

Thus, the formula builder 2001 comprises a variables window 2006, a functions window 2008, and a formula window 2010. A label 2014 is displayed at the top of the window to indicate the particular path being evaluated which in this case is:

Parameters.Interior.SoundSystem.Constraints.

SpecialOptionsListList.UsedWhen

The variables window 2006 provides a hierarchical display of the parameters 2020 and queries 2022 that have been previously constructed by the developer. By clicking on the group icon shown at 2020; 2022, a hierarchical display of the available parameters and queries, arranged as shown in the parameter explorer and parameter selector windows, is provided for ease of navigation and selection from amongst the various choices.

The function window 2008 displays a collection of logical functions which can be applied to define predetermined conditions for application of the associated constraint, for example Lookup, Display, Display When, UsedWhen, and Used Except When. One of these functions can be selected and applied by double clicking on a desired function, and the function with its associated generalized syntax automatically appears in the formula window 2010.

The example shown in FIG. 19 is a formula that employs the UsedWhen function. The formula is:

UsedWhen(Parameters.Interior.Sound.SpecialSoundOptions Available=True)

It will be appreciated that this expression resolves to the Boolean state (true or false) of the parameter appearing in the formula. Stated in other words, if the application of data and user input causes the parameter SpecialSoundOptionsAvailable to be true, the UsedWhen formula evaluates as true and consequently, the string list indicated by the SpecialOptionsList shown in FIG. 18 is applied, thereby causing display of the data values shown at 1514 in FIG. 15.

Range Constraint Application

FIG. 21, consisting of FIGS. 21A and 21B, illustrates application of a range constraint. A range constraint is operative for specifying a valid numeric range and increment. For example, the developer can require that a certain parameter be constrained to have a certain beginning number, a certain ending number, and a specified step size or increment of values therebetween. However, if the UsedWhen condition associated with a range constraint evaluates to false, then the numbers no longer result in a valid condition.

The range constraint in this example is labeled WattageRange 1630, and is associated with the exemplary parameter Amp wattage 1618. This example indicates that a configuration such as the power ratings of an audio amplifier for an automotive sound system can assume certain values, and can be selected in certain wattage ranges.

In response to creation by the developer of a range constraint, the properties of the range constraint object will be displayed in the object inspector 503. These properties include a Name property 2101, e.g. WattageRange, a RangeBegin property 2103 for entry of an initial numeric value, a RangeEnd property 2105 for entry of an ending numeric value, and a RangeStep property 2107 for entry of a step size or increment of values between the beginning and, ending values. The properties also include a UsedWhen property for application of conditional logic for application of the constraint.

FIG. 21B illustrates how a new constraint is added. When a constraint group icon is selected instead of a particular constraint, for example the constraint group icon 2140, the Parameter Explorer window 1603 includes a display of selectable constraint types at 2142. These constraint types are those described above, and in connection with FIG. 5. If the developer clicks on one of these icons, a new constraint of the selected type is created, underneath and adjacent to the selected constraint group icon. This essentially is the manner in which a new constraint is created and associated with a parameter.

Formula Constraint Application

FIG. 22, FIG. 23, and FIG. 24 relate to application of a formula constraint. This example utilizes the example automotive related configuration, which includes the Maximum Budget numeric edit box 605 introduced in FIG. 6. This numeric edit box user control object, placed by the developer on the template in a previous operation, has been selected by the developer by pointing and clicking so that the properties of this object are visible in the object inspector window 503. It will be noted that the Parameter property 2203 shows association of this numeric edit box with the parameter Parameters.Price.MaxBudget.

FIG. 23 shows the developer's display screen after invoking the View command (under the File menu 2301) to view the parameter explorer window. In the parameter explorer window 2302, the parameters hierarchy is expanded to show the parameter group Price 2303 with its associated parameters MaxBudget, As configured, and PercentofMaxBudget which are shown collectively at 2304. Under the parameter MaxBudget, a constraints item 2306 indicates the presence of a formula constraint 2308 GreaterThanPriceAsConfigured, denoted by the X=Y symbol to the left of the variable 2308.

If the developer selects the formula constraint item 2308 by pointing and clicking, item is highlighted in the parameter explorer window and the properties of the formula constraint are displayed in the object inspector window 503. It will be noted that the Formula property 2310 shows that a formula has been created, as indicated by the (Formula), and a selector box 2312 is displayed when the Formula property is selected. When the developer clicks on the selector box 2312, a formula builder window as shown in FIG. 24 appears.

FIG. 24 illustrates a formula builder window 2401 that appears upon activation of the selector box 2310, which is utilized to define a formula for application of a constraint to a parameter. The formula builder window, which is similar to the formula builder window that determines the conditional application of a constraint described above, include a Variables window 2403, a Functions window 2405, and a Formula window 2408. In this particular example, the Valid when function 2410 has been utilized. The developer may invoke any function in the Functions window and the text and syntax of the selected function appears in the Formula window 2408 for editing.

The Formula window 2408 shows a formula including two parameters that are related by greater than or equal to function:

Parameters.Price.MaxBudget>=Parameters.Price.AsConfigured

This particular function causes the associated parameter, namely Parameters.Price.MaxBudget (FIG. 22), to assume a valid or invalid state, depending upon the outcome of evaluating the mathematical expression of the formula. In other words, if the value of the parameter MaxBudget equals or exceeds the value of the parameter As configured, the formula will evaluate to a true condition. If the formula evaluates to a false condition, thereby causing the associated parameter MaxBudget assumes an invalid state or condition.

An invalid condition in the present invention is manifested by display of an indication of invalidity (visual in the disclosed embodiment, but other indications are contemplated) in connection with all controls associated with the particular parameter having the invalid state. In the preferred embodiment, this is shown in various forms, but principally that of turning the associated control red and showing text in reverse video (white characters on a red background). If tab controls are utilized, as shown in FIG. 22, a red is displayed on any tab having a user control associated with an invalid parameter.

In this regard, FIG. 25 illustrates the exemplary automotive related configuration with the POP (preferred option package) tab selected, with an invalid choice of preferred option packages that causes the price as configured, with a value of $32,985 to be displayed. It will be noted that the invalid condition is shown in two different manners in FIG. 25. First, information in the data field labeled Maximum Budget 605 is shown highlighted in reverse video to indicate the invalid condition. Second, the general tab 612*a* and the POP tab 612*b* have a red "X" through the check mark. This indicates that the invalid condition has effects on user controls appearing in the General options subframe as well as in the preferred option packages (POP) subframe.

From the foregoing, those skilled in the art will understand that a formula constraint is useful for assigning an invalid value to a constrained parameter. Use of the various functions shown in FIG. 25, e.g. Lookup, Display, DisplayWhen, Valid when, and ValidExceptWhen, allow a logical condition associated with a parameter to be evaluated. and, if the evaluation produces a false condition, cause the a visual indication of invalidity (e.g. a red color) to appear in association with any user controls that reference the parameter having the invalid condition.

Preferred Software Architecture

As previously mentioned, the preferred embodiment of the developer's environment 18 for creating configuration software is implemented by object-oriented programming techniques in the Borland DELPHI™ software development environment. The next discussion will explain certain aspects of the architecture of the exemplary automotive configuration program module, as constructed with the preferred object-oriented developer's environment. After the discussion which follows, those skilled in the art will understand that the preferred DELPHI object-oriented software development environment facilitates the creation of the object-oriented user interface of the developer's environment 18 with its object inspector window, tool palette, and template for creating the user interface of the ultimate objective—a configuration software program module. Furthermore, the object-oriented architecture allows the developer to readily assign logical formulas, numeric formulas and other conditions to specific parameters and queries so that relationships between the various parameters, queries, user controls, etc. is facilitated.

Prior to discussing the specific software object architecture of the preferred embodiment of the present invention, will first introduce certain object-oriented programming concepts required for an understanding of the present invention.

Object oriented Programming Concepts

The following discussion introduces certain concepts required for understanding the object oriented developer environment and the object oriented programming environment employed to construct the preferred embodiment and carry out the methods of the present invention. It is assumed here that the reader is familiar with the notion that an "object", for purposes of computer modeling, comprises a plurality of data items or properties, has a behavior, responds to messages from other objects, and issues messages to other objects.

Very generally, most people perceive the world as being organized into things or objects. Most computer filing systems, however, do not treat things in the real world as objects, but instead as tables of related data items. In an "object-oriented" representation, a computer system represents an entity or item such as a number, a person, a city, etc. as an object. "Objects" in the real world directly correspond to "objects" in the data model. Accordingly, it is expected that an object-based model representing information and processes in a computer will be more intuitive, and will more readily facilitate the mapping of information from the real world to a computer model.

There is some diversity of opinion in the computer industry as to what is meant by an "object" and the degree to which a computer program is considered "object-oriented". Various terms have emerged in the art to capture various aspects of "object-oriented" approaches. These terms include the words encapsulation, classes, inheritance, message-passing, and polymorphism.

The term "encapsulation" means that information associated with an object is to some degree hidden and not directly accessible. Encapsulated data often must be accessed and changed via indirect methods.

The term "classes" relates to objects of similar types. Objects of the same class are grouped together and have certain properties, attributes, or behaviors in common. Classes may be organized into hierarchies of subclasses in which the procedures and attributes of the class are inherited by its subclasses. Thus, a "subclass" is a group of objects that have some properties, attributes, behaviors, or procedures with other groups of objects, but could have other properties, attributes, behaviors, or procedures that are different.

The term "attribute" or "property" relates to data items or information or behavior that relates to a particular object.

The term "inheritance" means the sharing of properties, and in some cases attributes and behaviors, that characterize a subclass by its parent class. The notion of inheritance purportedly allows for easier maintenance and extension of computer programs since creation of subclasses purportedly allows the program code used to created the parent class to be readily modified and reused for subclasses.

The term "messages" means the basic mechanism of communication between and computation for objects; messages are passed between objects, and these messages invoke an object's procedures.

An object's "procedures" or "methods" are operations upon data items, attributes, and/or properties so as to cause a computing result and provide a response. The data operated upon may or may not be hidden (encapsulated) in the object.

The term "polymorphism" means that different objects may respond differently to the same message. The term relates to a system's ability to invoke one of a set of identically named procedures depending on the class (or type) of the target object on which the procedure is intended to operate. For example, a set of "print" procedures could be prepared for each of a set of classes (or object types). When an arbitrary instance of one of these classes is then sent the "print" message, the system invokes the appropriate "print" procedure by referencing the target object's type identifier, which is usually stored somewhere inside the target object. This causes the object to "print" itself with the "print" procedure that was written to handle any special aspects associated with the object's type (class). The sender of the "print" message need not maintain an awareness of the type (class) of the object it is "printing" in order to invoke the appropriate "print" procedure.

An "instance" of a class is a particular object, and generally corresponds to a particular identifiable real world entity. Since a class is a grouping of similar objects or instances of the class, all objects of the class use the same procedures and respond to the same messages.

Certain aspects of object-oriented programming techniques are utilized in the present invention so as to provide an object-oriented environment for the developer to create and a user interface for the configuration software, and to maintain the software.

Software Architecture in the Preferred Embodiment

FIG. 26 illustrates the hierarchy of software objects that are utilized to construct the preferred embodiment of the present invention. To begin with, the Borland DELPHI™ abstract class TComponent is employed to create various other components in the developer's environment that operates as described herein. A principal derived subclass of objects is that denoted TbtHiddenComponent, which is an abstract subclass itself having a number of subclasses. These subclasses include TbtDepHiddenComponent and TbtHiddenComponentDependencies.

The class TbtDepHiddenComponent includes a number of subclasses including TbtParameterBase, TbtQueryBase, TbtConstraint, TbtConstraintList, and TbtFunction (the latter three being subclasses of TbtHiddenComponent). These subclasses in particular are employed to create the types of objects utilized to display parameters and their hierarchy, queries and their hierarchy, and to assign parameters and queries to various user controls.

The TbtParameterBase subclass includes two subclasses, TbtCustomParameterGroup and TbtCustomParameter. The subclass TbtCustomParameterGroup is employed to create the Parameter Group icon for grouping of parameters in a logical hierarchy, and to provide a selectable icon that can be expanded and collapsed by a developer's command, such as clicking on the group icon. Referring back in this regard to FIG. 10, which shows a parameter group icon 1003 with its hierarchy of associated parameters Parameter 1005, Parameter 1007, etc.

The subclass TbtCustomParameter has a subclass TbtParameter which is the actual class of objects that is utilized to represent a parameter object. A parameter object is represented in the display by a parameter icon 520 (FIG. 5).

The family of objects subsidiary to the class TbtQueryBase is similar to the structure of the class TbtParameterBase. That is, the subclass TbtCustomQueryGroup is provided with two subclasses TbtQueryGroup and TbtQueryGroupBase for display and organization of the query icon 522 (FIG. 5) and the hierarchical arrangement or queries with a query group icon 530 in a query explorer window. A query explorer window has a structure virtually identical to that of the parameter explorer window, and allows a hierarchical arrangement of queries with headings, group icons, etc. identical to the parameter hierarchy, for logical arrangement and navigation of various created queries.

The TbtConstraint abstract class has five discrete subclasses, each of which corresponds to one of the five different types of constraints that have been described previously. The class TbtDiscreteConstraint corresponds to a discrete constraint, TbtStringListConstraint corresponds to a string constraint, TbtRangeConstraint corresponds to a range constraint, TbtQueryConstraint corresponds to a query-type constraint, and TbtFormulaConstraint corresponds to a formula-type constraint.

The TbtConstraintList class of objects allows creation of a list of constraints subsidiary to a parameter, which is displayed in the parameter explorer window, such as is shown in FIG. 16, in association with the constraint icon 1616 and its associated list of constraints 1622, 1624, 1626.

The TbtFunction class of objects provides the object structure for various types of functions or formulas that are displayed in the function window in a formula builder window. For example, the formula builder window 2401 in FIG. 24 shows various types of functions in the Functions window 2405. The TbtFunction class includes the subclasses TbtParameterFunction and TbtWhenFunction, which itself includes the subclasses TbtUsedWhenFunction, TbtEnabledWhenFunction, and TbtReadOnlyWhenFunction. These classes allow creation of instances of the various types of logical and mathematical functions that are used in creating formulas.

Those skilled in the art will understand that the preferred embodiment of the invention and preferred methods described herein involve modification of various abstract classes provided in the preferred Borland DELPHI™ software development environment, to create object classes as shown in FIG. 26. It will also be understood that the invention could be made and used with any other object-oriented development environment, such as C++, Java, or other object-oriented programming environment.

Those skilled in the art will also understand that computer software created with object oriented programming systems such as DELPHI do not lend themselves particularly well to conventional documentation methods such as flowcharts and pseudocode. Accordingly, it will be understood, and will not be explained in detail here, that the developer environment software 18 is constructed to determine the occurrence of a developer event such as a point and click (or double click or right click or drag) with the mouse and typing characters, determine a displayed icon or screen region in which the point, click, or typing event occurred, associate the event with an underlying object, and pass an appropriate event message to the underlying object. The underlying object, which is responsible for any data associated with the object and possesses methods, responds to the event in a predetermined manner. The response may include dispatching messages to other objects or to the computer's operating system, performing calculations, updating itself, drawing itself (or an icon representing the object) on the screen, storing data in a file, creating instances of itself and of other objects, and a myriad of other tasks too numerous to describe here.

For example, a specific function often carried out for objects that display data on the display screen is an "update" method, which is carried out if an event occurs that changes the state or value of any data displayed by the object. As a specific example, if a user types in a numeric value into a data entry field type user control object, any other objects that are dependent upon the data entry field type user control object such as a calculated value are sent a message that includes (a) the value of the new numeric value of the underlying dependent parameter and (b) and a redraw command to cause redisplay of the calculated data.

It will thus be understood that the all various objects and actions described herein as regards any particular object, or class of objects, respond in the same basic manner.

Object Architecture and Object Dependency Relationships

Figure 27:
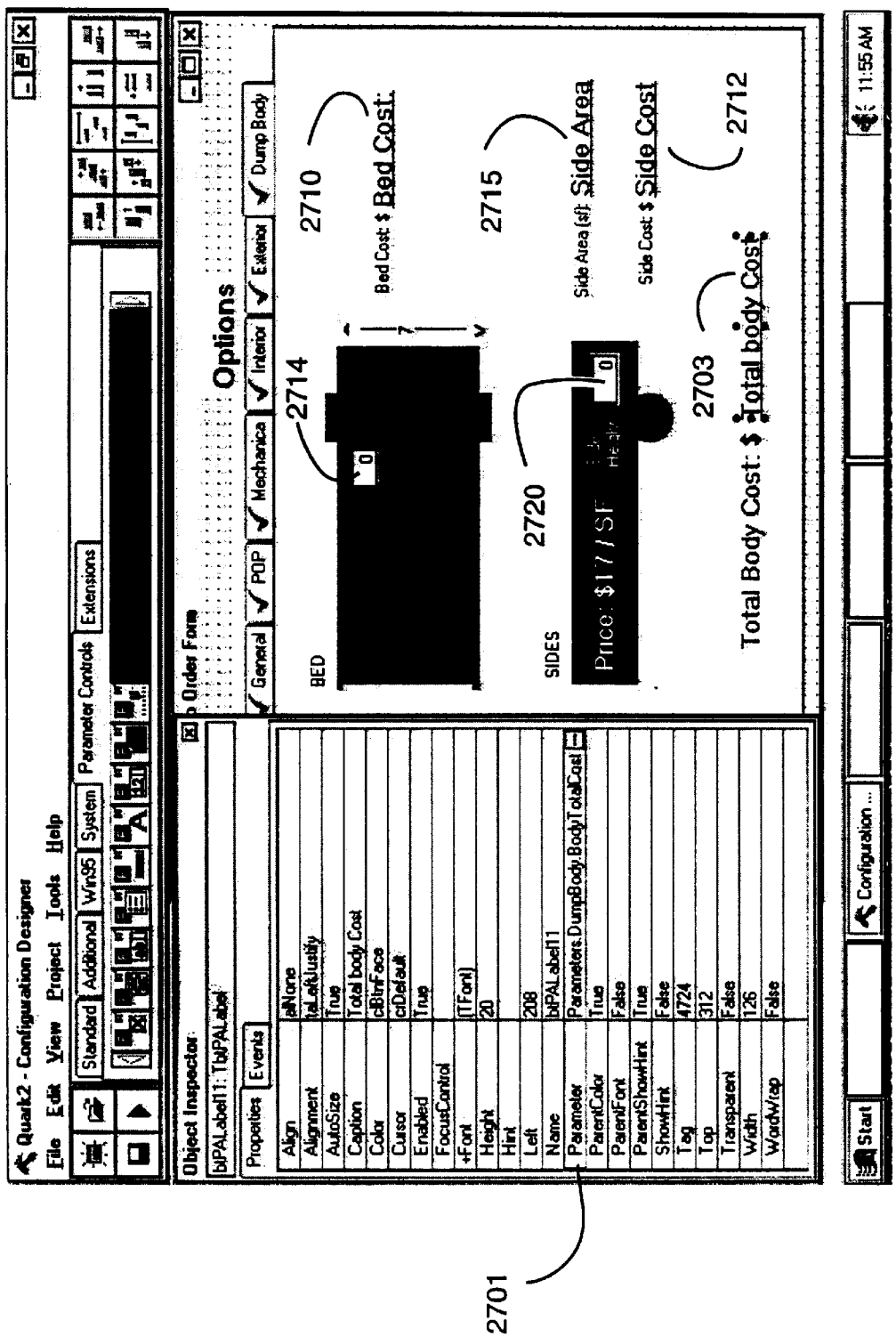
FIG. 27 illustrates various related parameters for purposes of illustrating the dependency tree concepts.

Turn next to FIG. 27 for a description of methods employed in the preferred embodiment for evaluating "dependencies of" and "dependencies on" various objects created by a developer when creating a configuration software program module. It will be recalled from prior discussion that the preferred embodiment of the present invention provides a compiled executable program module that runs on a computer system such as the salesperson's laptop 12 shown in FIG. 2. Because the configuration software is compiled and not interpreted, it executes extremely fast relative to an interpreted type configuration engine.

It is a feature of the preferred embodiment that an end user's change to a user control—such as by clicking a radio button, checking a check box, entering numeric or textual data into an edit field—causes rapid assignment of the user's data input to the various parameters in the data model. In order for this data input to be rapidly processed, parameters that are dependent upon the user control (and its associated parameter) that was responsible for receiving the user input be evaluated and constrained if necessary to derive valid values. In other words, if a user enters a number into an edit box type user control, that number is assigned to a particular parameter associated with the edit box user control. Any other parameters that reference or utilize this particular parameter in formulas, calculations, etc. must be identified and updated quickly with the newly entered information. In object oriented programming techniques, data entry is event driven, and an object (e.g. user control) that received an action (data entry) must send a message to other objects that reference or utilize the parameter associated with the object.

It will therefore be appreciated that parameters are often related in dependency relationships. In other words, a formula-defined parameter that is the result of the addition of two other parameters is dependent upon the two variables forming the equation.

Referring in this regard to FIG. 27, consider the example of a computation of the cost of a body of a dump truck. The cost of the body of the dump truck is reflected by the parameter BodyTotalCost, as indicated by the association of the parameter Parameters.DumpBody.BodyTotalCost in the parameter property 2701 with a labeled field 2703 having the name Total Body Cost. As will be shown, the total body cost as reflected by the parameter BodyTotalCost is the sum of (is mathematically related to) other, dependent parameters such as the cost of the bed and the cost of the side area. These dependent parameters are indicated by the Bed Cost field 2710 and Side Cost field 2712

The Bed Cost field is mathematically related to the bed length, as can be input by a numeric data entry field 2714 labeled Bed Length. The user can input a number here by clicking on this field (a displayed user control object) and typing in a number, which is then assigned to a parameter BedLength. The Bed Cost field (a displayed user control object) is calculated as the product of BedLength and $120 per linear foot.

Similarly, the Side Cost field is mathematically related to a parameter corresponding to the side area, as indicated by a Side Area field 2715. The side area however is mathematically related to the side height, as can be input by a numeric data entry field 2720. The Side Cost field (also a displayed user control object) is calculated as the product of BedLength·Side Height*$17 per square foot, it being understood that BedLength·Side Height=Side Area.

In the event that the user desires to change aspects of the bed length and/or the height of the side, the total body cost will vary. In accordance with the invention, a change to either of the dependent parameters Bed Length and Side Height is instantly reflected in the Total Body Cost parameter that is displayed to the user. This involves resolving a dependency tree that defines relationships between the various user control objects in FIG. 27 so that any dependencies of either of these parameters can be quickly found and sent update messages.

Figure 28:
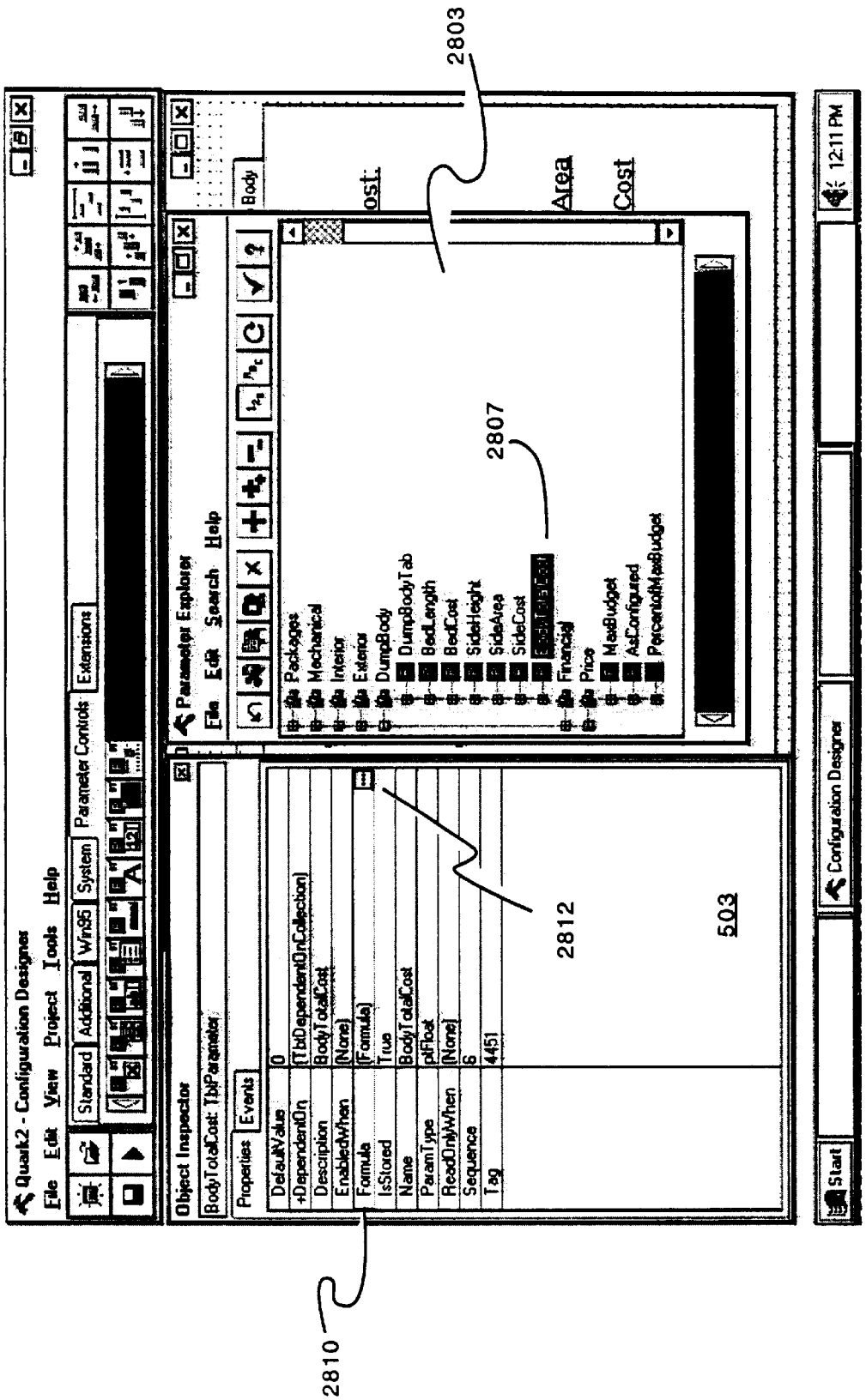
FIG. 28 illustrates the parameter explorer window showing the parameter BodyTotalCost selected, for purposes of illustrating the dependency tree concepts.

Prior to explaining the dependency tree and how dependencies are handled via object communications in the present invention, the relationships between the parameters introduced in FIG. 27 will first be described. In FIG. 28, the parameter explorer window 2803 has been displayed, again with the View command. The particular parameter BodyTotalCost is highlighted at 2807, causing display in the object inspector 503 of the properties of the parameter BodyTotalCost. The Formula property 2810 indicates the presence of a precreated formula, by the designation (Formula). When the developer clicks on the selector box 2812, a formula builder window as shown in FIG. 29 is displayed.

Figure 29:
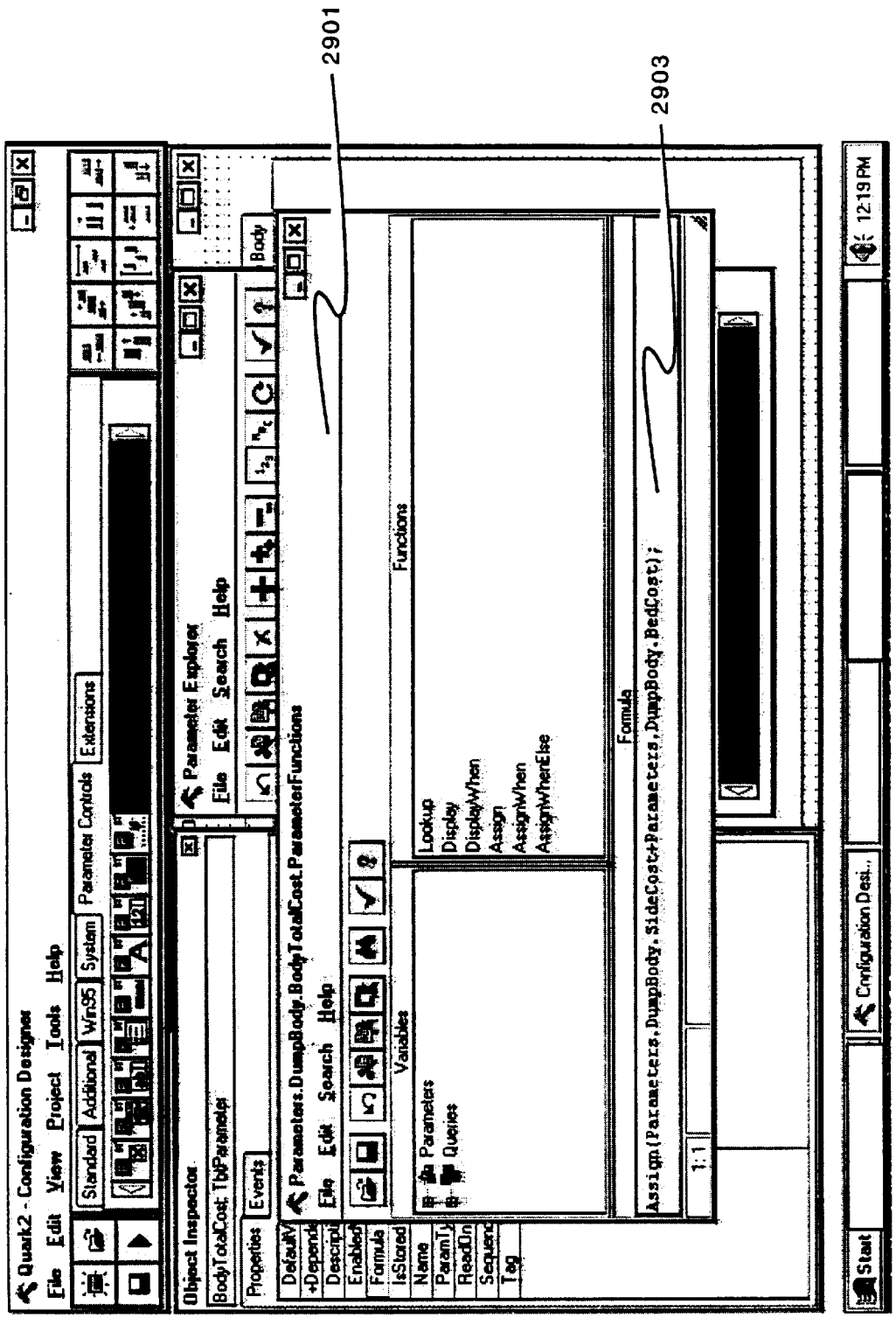
FIG. 29 illustrates a formula for assigning a value to the BodyTotalCost parameter of FIG. 28.

In FIG. 29, the formula builder window 2901 shows a formula for assigning a value to the associated parameter BodyTotalCost. The formula displayed in the Formula window 2903 is the following:

Assign(Parameters.DumpBody.Sidecost+Parameters.DumpBody.BedCost)

The parameter BodyTotalCost is "dependent on" subsidiary parameters SideCost and BedCost. These in turn are computed values, the formulas for which will be understood from the preceding paragraphs. Assume for purposes of this discussion that further dependencies may occur to cause assignment of values to the parameters BedCost and SideCost, either by assignment of actual numbers or by use of similar formulas.

Ultimately, however, both parameters BedCost and SideCost are dependent on the parameter BedLength, which is associated with the user control numeric entry box 2714 in FIG. 27.

Figure 30:
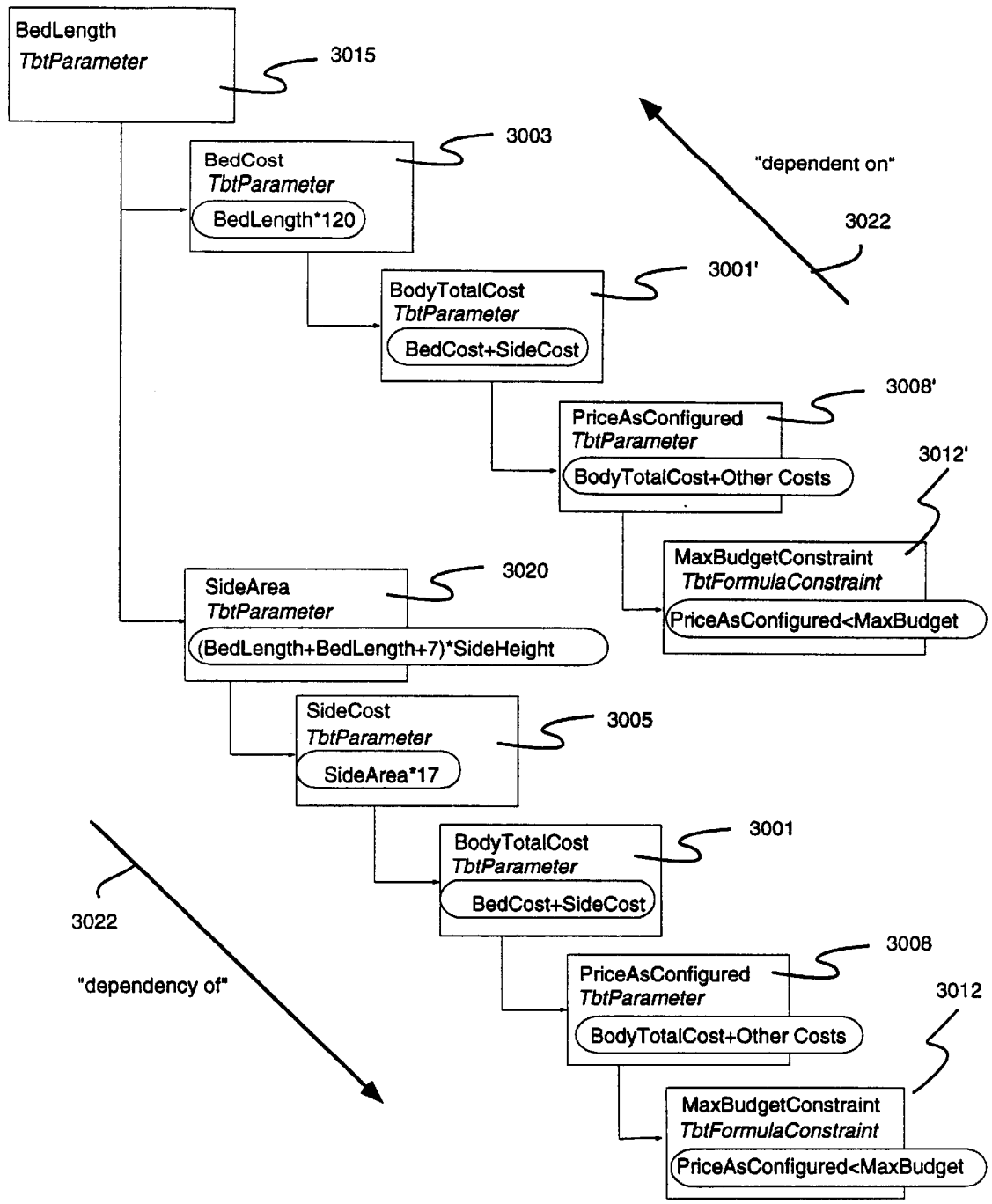
FIG. 30 illustrates a dependency tree constructed for the BodyTotalCost example introduced in FIG. 27.

Turn next to FIG. 30 for a graphical illustration of the various parameter objects involved in the relationship of the BodyTotalCost parameter and its various dependencies. It will be observed that the BodyTotalCost parameter, which is a TbtParameter object, has several dependency relationships. First, it is dependent on the parameters BedCost 3003 and SideCost 3005. Likewise, the BodyTotalCost is a "dependency of" other parameters higher in the tree, for example, the PriceAsConfigured parameter 3008 (which shows that the price as configured as related to the BodyTotalCost and other costs). The PriceAsConfigured parameter is in turn a dependency of the budget constraint MaxBudgetConstraint 2812.

The notion of "dependent on" and "dependencies of" should be carefully understood. A given parameter is "dependent on" another parameter if the given parameter requires the value of the other parameter to evaluate a condition or set a value, such as a formula or a logical condition. "Dependent on" relationships are shown going up the tree 30 in FIG. 30, going along the arrow 3020.

On the other hand, a given parameter is a "dependency of" another parameter if the given parameter is employed as a variable in a formula or provides a logical condition for another parameter. "Dependency of" relationships are shown going down the tree 30 in FIG. 30, along the arrow 3022

Dependency relationships between parameters forms a tree as shown in FIG. 30, in this case having a root of a parameter such as BedLength 3015 which is a dependency of various other parameters down along the branches of the tree. Ultimately, therefore, parameters such as MaxBudgetConstraint 3012 are dependent on a number of subsidiary parameters.

It will be noted in FIG. 30 that the parameter MaxBudgetConstraint appears are two separate locations in the tree, at 3012 and at 3012'. This is an example of a multiple dependency relationship where a given root parameter such as BedLength may be reached through different paths. These different paths may not be of the same length, as indicated in the figure.

Thus, the MaxBudgetConstraint 3012' is dependent on BedLength 3015 through three subsidiary parameters BedCost 3003, BodyTotalCost 3001', PriceAsConfigured 3008'. On the other hand, MaxBudgetConstraint 3012 is dependent on BedLength 3015 through four other parameters, SideArea 3020, SideCost 3005, BodyTotalCost 3001, and PriceAsConfigured 3008.

Assume now that the value of the parameter BedLength is changed by user input of data into the associated user control. Note that if an update message is passed from BedLength to all associated dependencies, BedCost and SideArea, and each of these objects in turn pass an update message to their associated dependencies BodyTotalCost and SideCost, the value of BodyTotalCost will resolve incorrectly because BodyTotalCost is itself dependent on SideCost, which has not yet been updated.

Because of this problem resulting from multiple dependency relationships, it is important when compiling the program to evaluate the dependency trees and resolve dependency relationships so that computations at the lower levels in the tree are evaluated prior to their utilization at higher levels in the tree. For example, because the dependency relationship for MaxBudgetConstraint 3012 has a longer path through the parameter Side Area 3020 to the root parameter BedLength 3015, the parameter SideArea should be evaluated to compute SideCost prior to computing BedCost 3003. Although BodyTotalCost requires the values for both BedCost and SideCost, the computation cannot be accurately completed until SideCost is first computed.

It will therefore be appreciated that relationships involving "dependencies of" a given parameter should be resolved when the program is compiled so that the value of a given parameter trickles outwardly along the branches of the tree and are computed in a proper order so as to produce the proper results in any parameters that are dependent on the given parameter.

Figure 31:
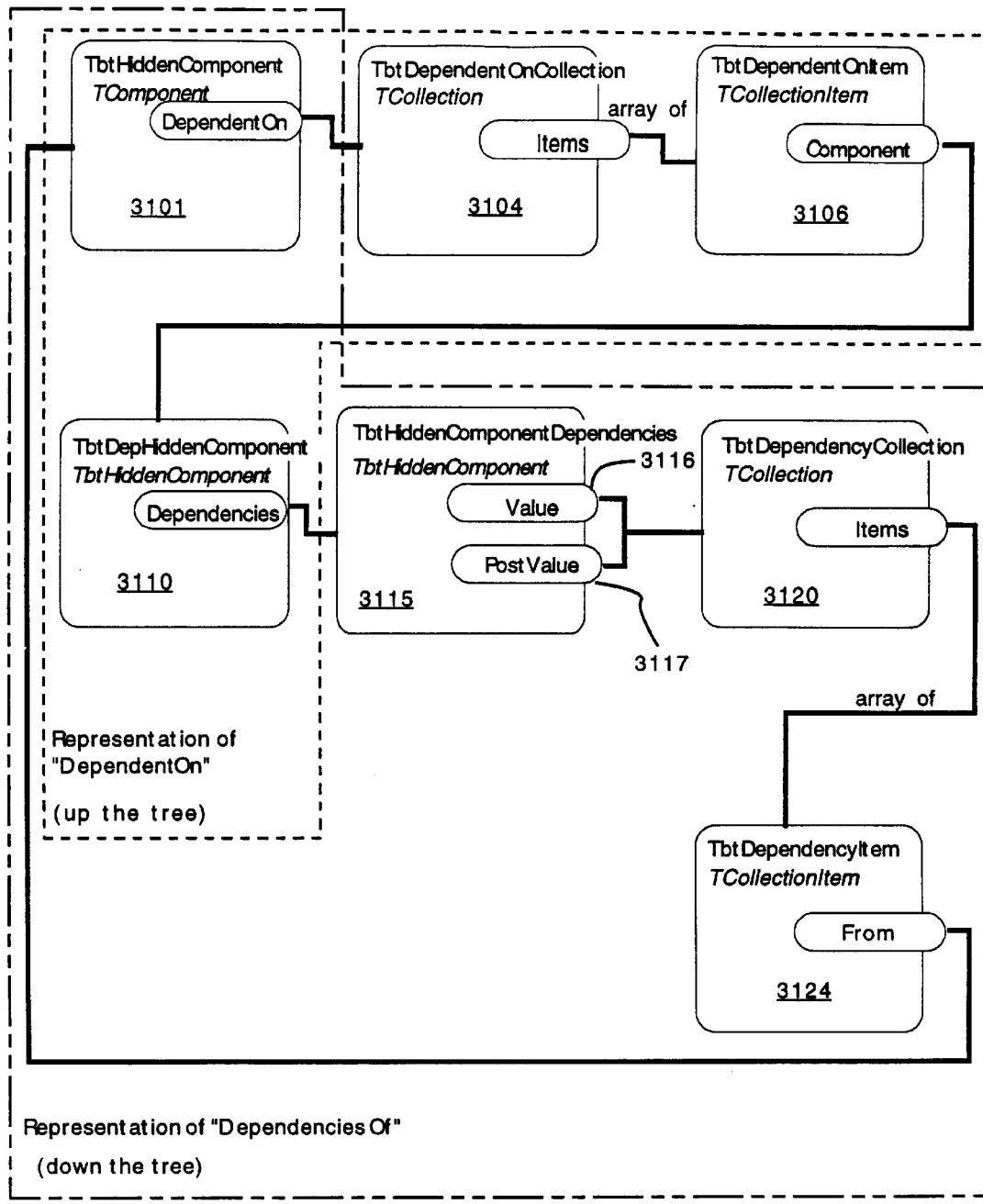
FIG. 31 illustrates general aspects of dependency relationships between objects in the preferred embodiment of the present invention.

FIG. 31 provides a general object representation of items which are "dependent on" related parameters (going up or along the branches of a tree as shown in FIG. 30), together with an object representation of "dependencies of" related parameters (going down the tree along the branches as shown in FIG. 30). It is the evaluation of dependencies of parameters at compile time that leads in part to increased efficiencies in computation of the compiled configuration software constructed in accordance with the present invention.

In the preferred implementation of the present invention, any object that is dependent on another object (such as a parameter or a query) is of class TbtHiddenComponent, which is derived from the Borland DELPHI™ class TComponent. This is illustrated at 3101.

A collection of items that a given object is dependent on is reflected in an object of class TbtDependentOnCollection 3104, which is derived from the DELPHI abstract class TCollection. Properties (in the form of a list and pointers) are provided in instances of TbtDependentOnCollection type objects to keep a list of all items that the object 3101 is dependent on. Any TbtDependentOnCollection object 3104 includes a property comprising an array of pointers to specific items, each of which are instances of the class TbtDependentOnItem, which derive from the abstract TCollectionItem 3106. A TbtDependentOnItem 3106 in turn includes a Component which points to an object TbtDepHiddenComponent 3110, which is derived from the abstract class TbtHiddenComponent. A TbtDepHiddenComponent object, it will be recalled from FIG. 26, is a parent class of many of the objects employed to implement the present invention, including parameters, queries, constraints, constraint lists, and functions.

Relationships of "dependencies of" are reflected by properties (pointers and arrays) in each TbtDepHiddenComponent 3110 instance. A Dependencies property of each instance of a TbtDepHiddenComponent object points to an object entitled TbtHiddenComponentDependencies 3115, which includes two properties Value 3116 and PostValue 3117.

Each instance of the TbtHiddenComponentDependencies class 3115 has both a Value and a PostValue property. It will be understood at this juncture that any given object—especially a parameter—can have dependencies of other parameters as well as constraints, and that constraints can similarly have dependencies. This is because the value of a parameter and a constraint of a parameter are separate objects and can have separate dependencies. However, the value of a given parameter and the constraints of a given parameter can ultimately be dependent on, the same thing.

It is therefore required that the value of a parameter be set before it is constrained. Accordingly, constraint objects, which are instances of TbtHiddenComponent 3115 include a PostValue property that forces evaluation of a constraint after an associated value has been set. Any member of the class of objects TbtHiddenComponentDependencies will include such a Value and PostValue property.

A TbtHiddenComponentDependencies object is thus connected via its Value property and PostValue property to a class of objects TbtDependencyCollection 3120, which is derived from the superclass TCollection. An instance of TbtDependencyCollection is an object comprising a collection of items forming an array of dependency items, where each individual member of the array is an instance of the class of objects TbtDependencyItem 3124 which is derived from the DELPHI™ superclass TCollectionItem. Finally, each item in the collection has a From property (a pointer) that connects the item to a particular instance of a TbtHiddenComponent class. Thus, any object derived from the TbtHiddenComponent class can be a collection item in a dependency collection.

Those skilled in the art will understand from the preceding discussion that collections of "dependent on" items collected in a given TbtDependentOnCollection instance 3104 and associated with a TbtHiddenComponent item 3101 allows the identification of all the objects on which the given object instance is dependent. An algorithm for traversing up the tree therefore merely entails inspecting each TbtDependentOn item 3106 maintained in the associated TbtDependentOnCollection 3104 to locate any objects such as parameters that the given parameter or constraint is dependent on.

Similarly, those skilled in the art will understand that in order to evaluate "dependencies of" a given item by traversing down the tree, the Dependencies property points to an instance of TbtHiddenComponentDependencies 3115, which maintains a Value and a PostValue that points to a TbtDependencyCollection instance 3120, that in turn points to each dependency item as an instance of TbtDependencyItem 3124. An algorithm for traversing down the tree therefore merely entails inspecting each Value and PostValue property of the TbtHIddenComponentDependencies instance 3115, which maintains in an associated TbtDependencyCollection 3120 to locate any objects such as parameters or query.

At compile time, the tree is traversed in both directions with appropriate algorithms to cause the value assigned to a given parameter to be employed and utilized in proper order by any other parameters that are dependencies of the given parameter.

Figure 32:
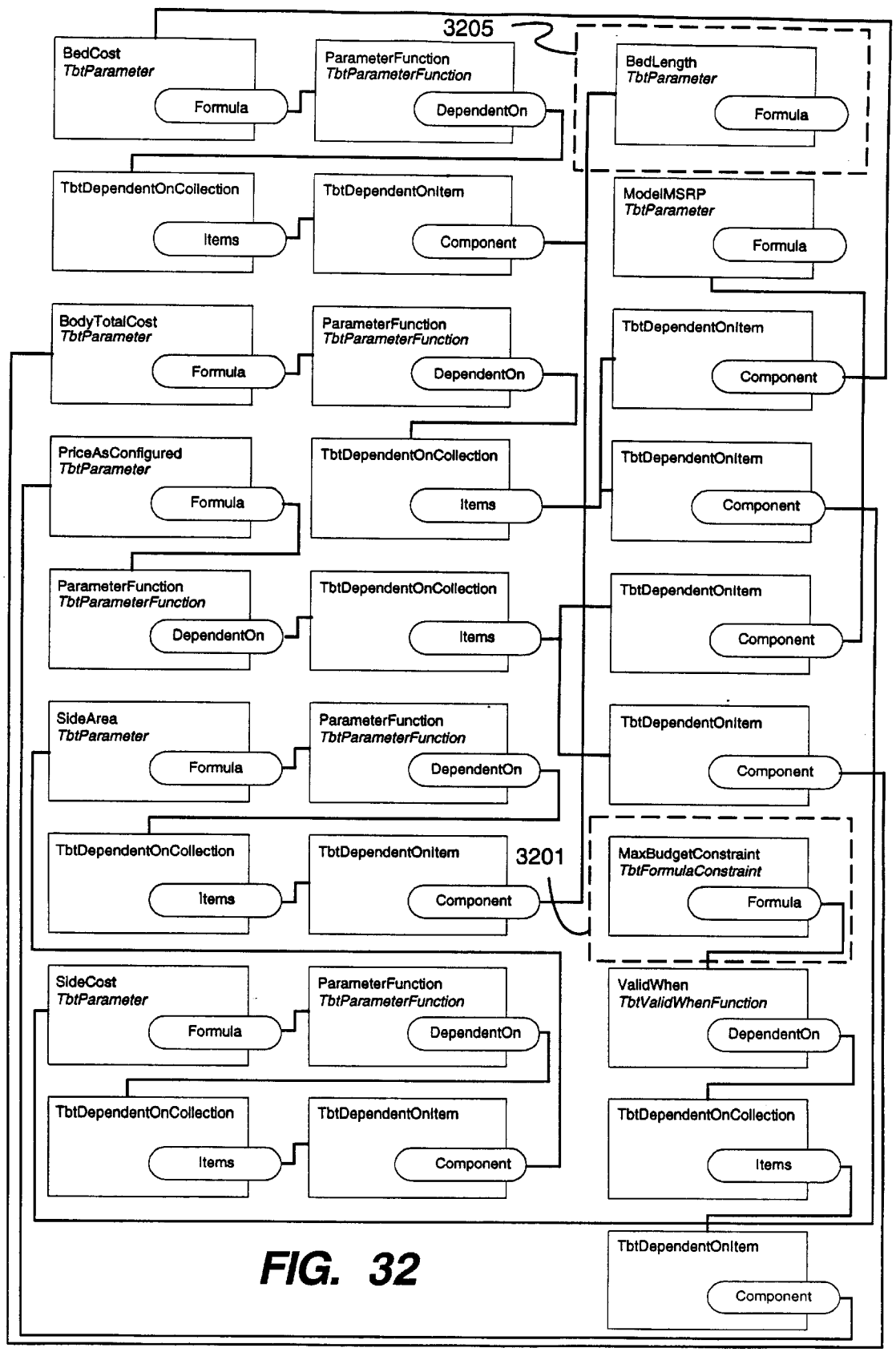
FIG. 32 illustrates specific "dependent on" object relationships between the objects involved in the BodyTotal Cost parameter example of FIG. 28.

FIG. 32 illustrates the specific example of "dependent on" relationships in context of the previously described parameter MaxBudgetConstraint, which is ultimately dependent on the parameter BedLength. This figure illustrates how to determine the parameters that MaxBudgetConstraint 3201 is dependent on, to allow construction of the dependency tree when the developer is creating a configuration software module. It is assumed in this example that the parameter MaxBudgetConstraint is assigned a value by virtue of a Formula as shown. From the discussion of FIG. 31, it will be understood that the determination of the dependent on relationship involve creation of various parameter objects, constraint objects, functions, etc., and the instantiation of item collections manifested by the TbtDependentOnCollection instances and TbtDependentOnItem instances shown in the chain, ultimately reaching the specific end parameter BedLength 3205.

Figure 33A:
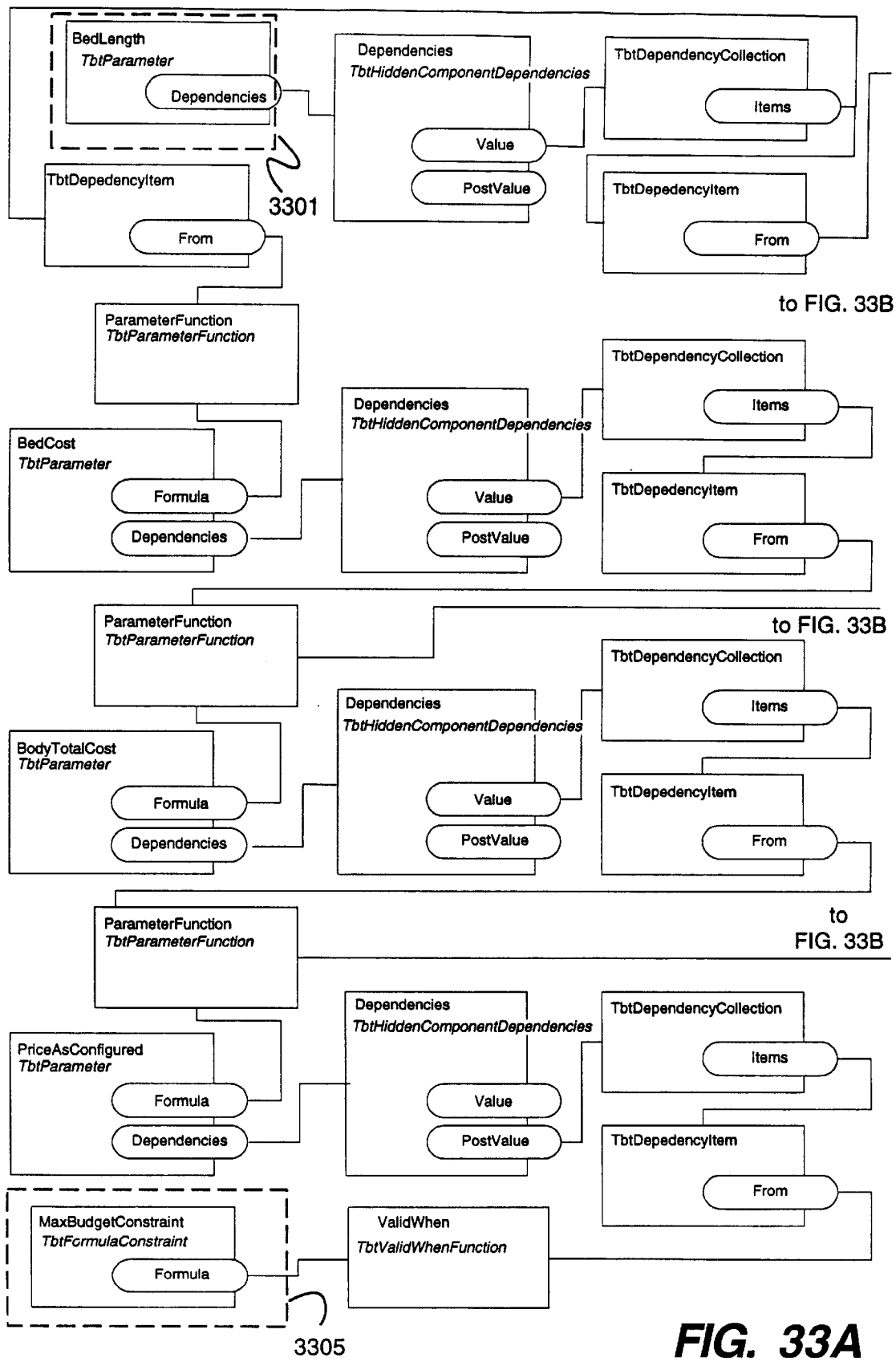
FIG. 33, consisting of FIG. 33A and FIG. 33B, illustrates specific "dependent of" object relationships between the objects involved in the BodyTotal Cost parameter example of FIG. 28.
Figure 33B:
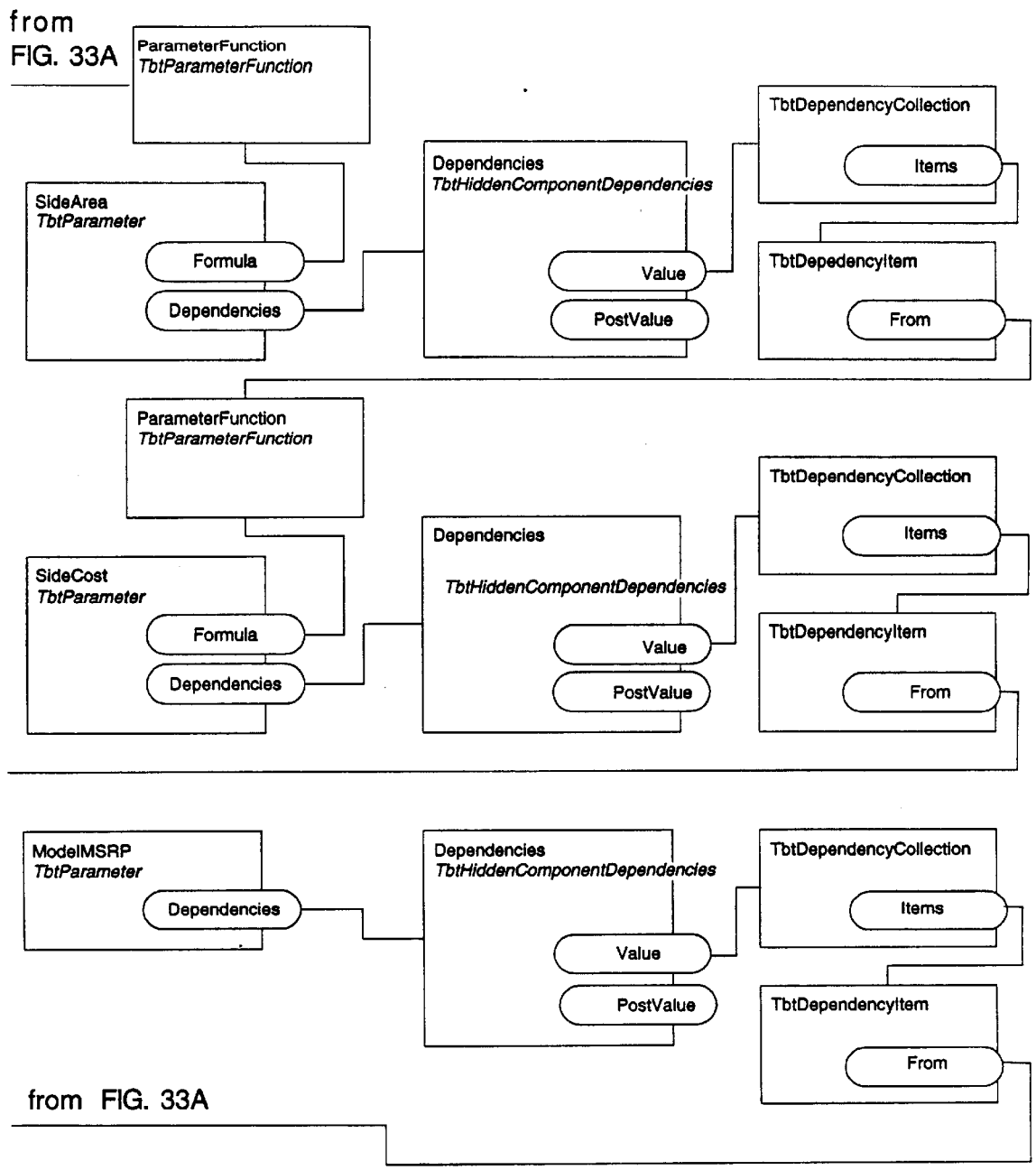

FIG. 33, consisting of FIGS. 33A and 33B, illustrates the object relationship structure for evaluation of "dependencies of" the given parameter, BedLength. In this case, the beginning point is the BedLength parameter shown at 3301, which ultimately has a number of "dependencies of" that work back up the tree as shown in FIG. 30. As discussed above, these dependencies form dependency collections, which are instances of TbtDependencyCollection 3120 as shown in FIG. 31 and TbtDependencyItem 3124. The end result of the chain of dependencies in FIG. 33 is the parameter MaxBudgetConstraint 3305, which is a parameter having a valid or invalid state as determined by formula that includes a Valid when function object. Those skilled in the art will understand from a study of FIG. 33 that the dependencies of the BedLength parameter 3301 can all receive their value, including numeric value or a state of validity or invalidity, depending upon functions or calculations assigned which occurs upon the user's entry of a value into BedLength via a user control. The compiled configuration software is responsive to the entry of data to the BedLength field provided by user of the configuration software, and any dependencies of that particular parameter are evaluated by traversing the tree as shown in FIG. 33, until all ultimate dependencies of that parameter are reached and the values employed so as to provide appropriate indications of validity or invalidity, or to provide appropriate calculated values, as required. This structure allows a very rapid response time of a configuration software module constructed in accordance with the preferred embodiment of the present invention and thereby overcomes problems with prior art interpreted type configuration programs.

It will also be appreciated that the evaluation of dependencies applies to other parts of the present invention, including construction of parameters, queries, formulas, etc., and sorted hierarchical displays of parameters and queries such as that shown in parameter selector windows, query selector windows, parameter explorer windows, query explorer windows, and variable display regions in formula builder windows and other regions that are viewable by a developer utilizing the preferred developer environment constructed in accordance with the present invention.

Flow Charts of Preferred Computer-Implemented Processes

Figure 34:
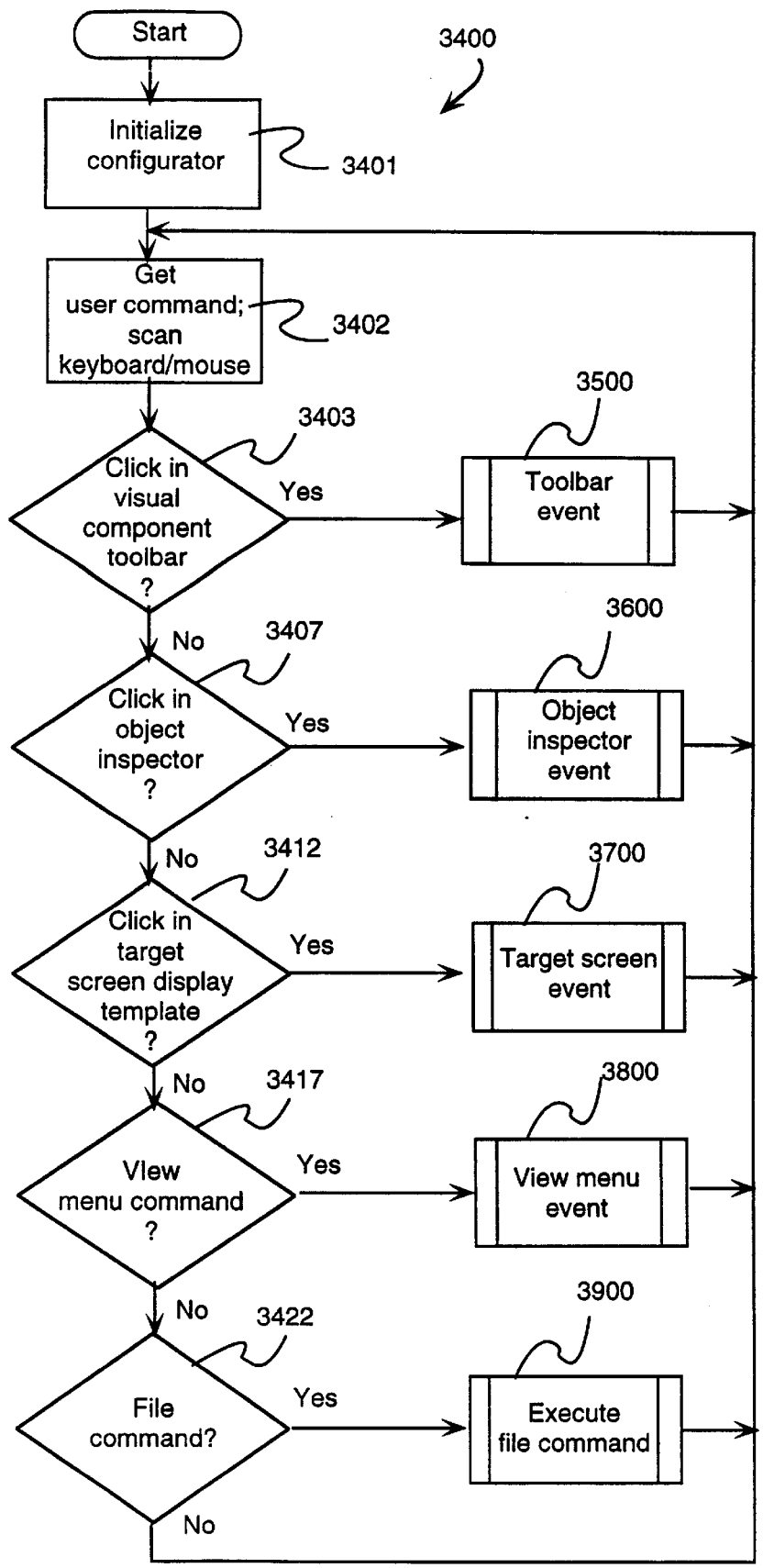
FIG. 34 is a flow diagram of the general process of handling a user command in the developer environment constructed in accordance with the invention.

FIG. 34 is a flow diagram of the general computer-implemented process 3400 of handling a user command in the developer environment constructed in accordance with the invention. The description which follows is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Starting in FIG. 34 at step 3401, when the development environment is first activated, and assuming that a new configurator is to be constructed, memory is allocated in the computer system for storage of a target display screen, objects, toolbar, and other software components of the preferred development environment. Once initialized, control passes to step 3402 to wait for a user command. When a user's input is received, the command is tested by decisions 3403, 3407, 3412, 3417, and 3422, wherein control passes to various other processes in response to detection of appropriate commands. It should be understood, however, that the decision tests in this figure are only illustrative of certain relevant steps taken in the preferred development environment for carrying out the invention. Those skilled in the art will of course understand that many other types of processes typically executed in modern computer software may also be executed. The decisions shown in FIG. 34 are those particularly relevant to the development environment and construction of a configurator in accordance with the preferred embodiment of the present invention.

At decision 3403, the user command is tested to determine if the user has clicked in the visual component toolbar 501 (FIG. 8). If so, process 3500 is executed to handle a toolbar event.

If at decision step 3407 the developer has clicked in the object inspector region 503 (FIG. 8), process 3600 is executed to handle an object inspector event.

If at decision 3412 the developer has clicked in the target screen display template 505 (FIG. 8), a target screen event handling process 3700 is executed.

If at step 3417 developer has clicked the View menu to cause display of the View menu 1604 (FIG. 16A), a View menu event process 3800 is executed.

Finally, if at decision 3422 a File command has been entered by the developer by clicking one of the commands such as 809, 811, 817, 820 (FIG. 8), a file command process 3900 is executed.

Figure 35:
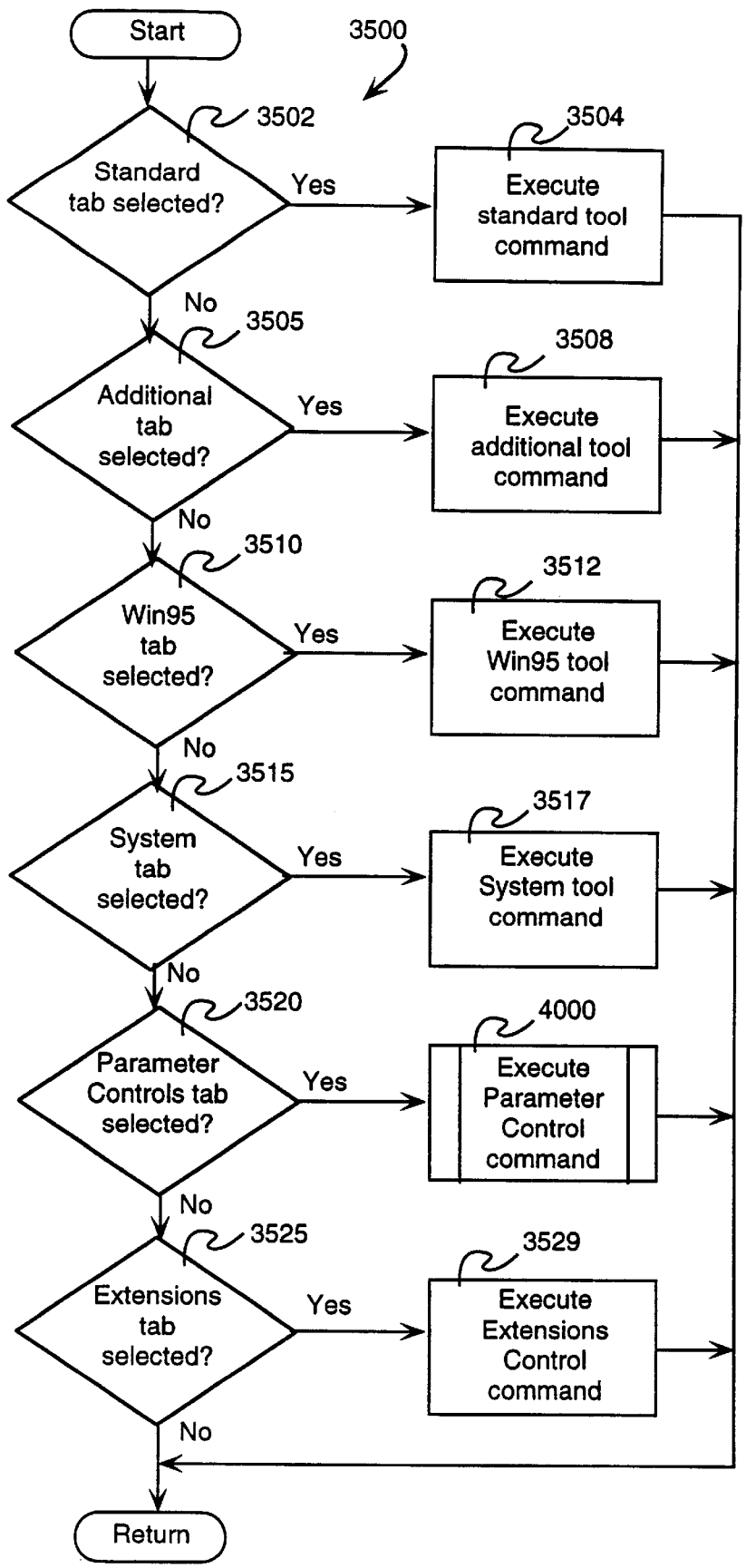
FIG. 35 is a flow diagram of the preferred toolbar event handling process.

FIG. 35 illustrates the process 3500 for handling a toolbar event. Referring back to FIG. 8, a number of different tools are provided in the toolbar region 501 which are preferably organized and accessible under user-selectable tabs, for example a Standards tab, Additional tab, Win95 tab, System tab, Parameter Controls tab 806 (FIG. 8), and Extensions tab. The system determines at decisions 3502, 3505, 3510, 3515, 3520 and 3525 which of these various tabs have been selected by the developer. For purposes of the present invention, only the process 4000, which is reached in response to a yes branch taken from decision 3520 in response to activation of the Parameter Controls tab 806 is significant to the creation and maintenance of parameter-associated user controls for construction of a configurator as described herein.

At decision 3502, the command is tested to determine whether the Standard tab has been selected. If so, at step 3504 a process is executed to implement a standard tool command. Such standard tools are software components that may be used in creating a configurator in accordance with the invention, but since such tools are non-parameter associated, their functions will be more general. Those skilled in the art will understand that these standard tools include non-parameter specific user controls such as main menus, labels, popup menus, edit boxes, OK and other buttons, check boxes, radio buttons, list boxes, combo boxes, and other various types of user controls which are not parameter specific.

At decision 3505, the command is tested to determine whether the Additional tab has been selected. If so, the process 3508 is executed to carry out such additional tool commands. Such additional tools include other non-parameter software development tools not forming a part of the invention but known to those skilled in the art, such as string grids, speed buttons, mask edits, drawing grids, images, shapes, bevels, scroll boxes, etc.

At decision 3510, the command is tested to determine whether the Win95 tab has been selected. If so, process 3512 is executed to carry out a Win95 tool command. These tools include WINDOWS 95™ non-parameter commands known to those skilled in the art, such as tab controls, page controls, tree view commands, list views, image list, header controls, status bars, progress bars, up/down controls, etc.

At decision 3515, the command is tested to determine whether the System tab has been selected. If so, then a System tool command process 3517 is executed. Those skilled in the art will understand that such system tools include commands such as OLEContainer type object not typically forming a art of the invention.

At decision 3520, the command is tested to determine whether the Parameter Controls tab 806 (FIG. 8) has been selected. If so, process 4000 is executed to carry out a Parameter Control command. Details of this particular process is provided in conjunction with FIG. 40.

Finally, at decision 3525, the command is tested to determine whether the Extensions tab has been selected. If so, process 3529 is executed to carry out an Extensions control command. Those skilled in the art will understand that extensions controls include other non-parameter specific user controls such as a page control.

After executing the various processes illustrated in FIG. 35, the process returns to the main program flow as in FIG. 34.

Figure 36:
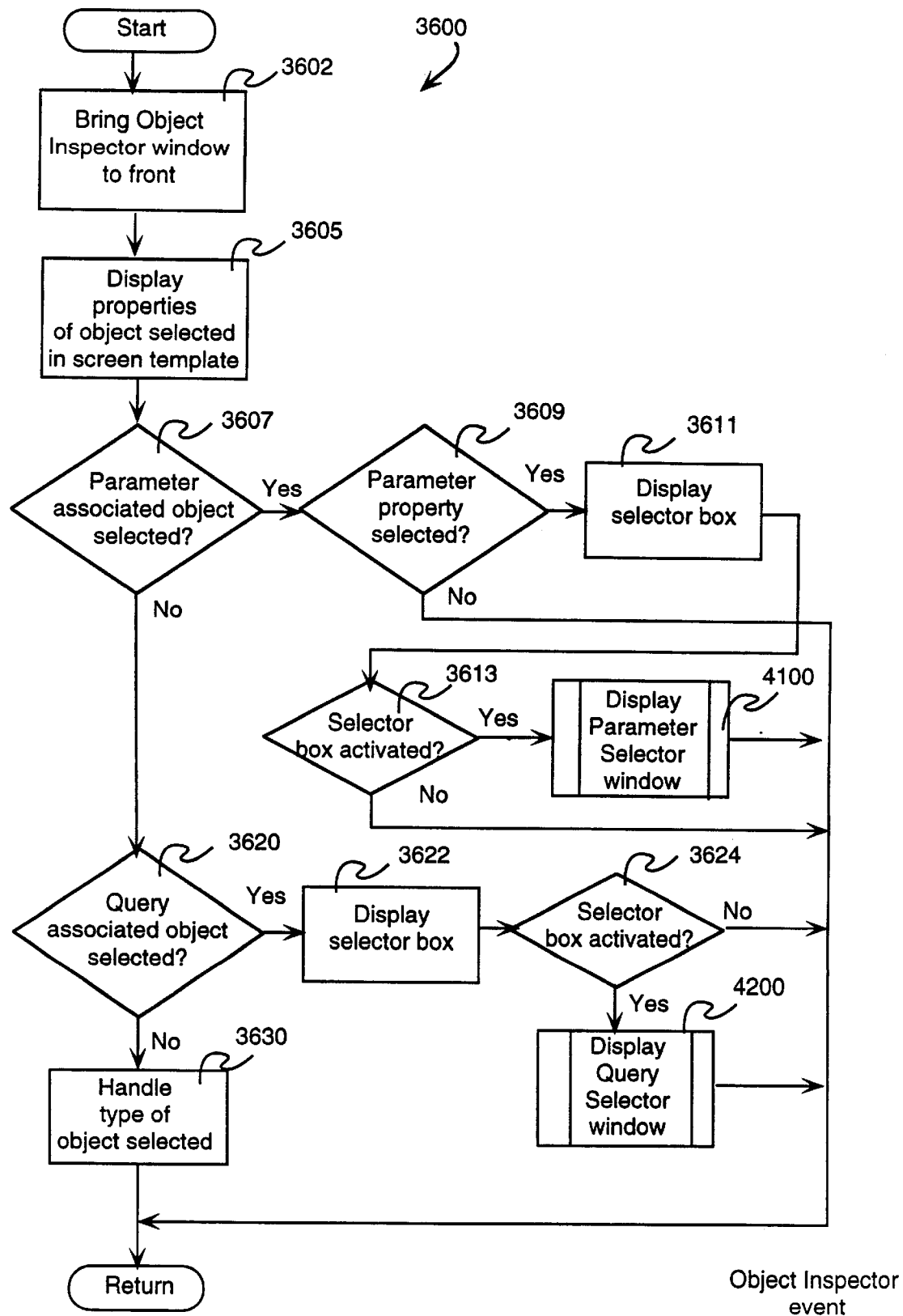
FIG. 36 is a flow diagram of the preferred object inspector event handling process.

FIG. 36 illustrates the process 3600 for carrying out an object inspector event. As previously described, such an event occurs when the developer clicks within the object inspector region 503 (FIG. 8), typically for the purposed of creating or editing properties associated with objects within the system.

Starting at step 3602, first the object inspector window 503 is brought to the front of any other windows in the known manner customary in the WINDOWS 95 operating system environment. At step 3605, the properties of an object selected in the screen template region 505 are displayed in the object inspector region. This object can be any type of user control, both parameter-specific as well as other types of user controls that the developer may utilize in constructing the configurator, such as titles, text, graphics, etc.

For purposes of the present invention, namely, the association of parameters with user control objects, such portions of the object inspector event that relate to parameter-associated objects are most important, such as is shown in FIG. 9. Thus, at decision 3607, the inquiry is made whether a parameter-associated object has been selected, for example, the control 902 (FIG. 9). If so, control passes to decision 3609, where a determination is made as to whether the parameter property of a selected object, e.g. 906 (FIG. 9), has been selected. If yes, control passes to step 3611 and the selector box such as shown at 908 (FIG. 9) is displayed in conjunction with the selected parameter 906. Control passes to decision 3613 where a determination is made whether the selector box has been activated by the developer. If so, a process 4100 is executed to display the parameter selector window. Steps relating to the process are described in connection with FIG. 41. Control then passes from process 4100 and the object inspector event handler returns.

Returning to decision 3607, if a parameter-associated object is not selected, the inquiry is made at decision 3620 whether a query-associated object has been selected. Referring in this regard to FIG. 16, it will be recalled that a query 1632 is a property of certain types of objects, in particular, a query constraint which is shown at 1622 in FIG. 16A. If the query-associated object has been selected such a the query constraint 1622, control passes to step 3622, and the selector box is displayed. At decision 3624, the test is made whether the selector box has been activated. If not, control passes out and the process of handling an object inspector event returns. If the selector box has been activated at decision 3624, control passes to 4200 and a process for displaying the query selector window is executed. Steps relating to this process are described in connection with FIG. 42.

Returning to decision 3620, if no query associated object has been selected, control passes to step 3630, and the system handles whatever appropriate action is required for the specific type of object that has been selected by the developer. Since at this stage it is assumed that no parameter or query associated objects are handled, those skilled in the art will understand that properties appropriate for the appropriate type of selected objects are executed.

Figure 37:
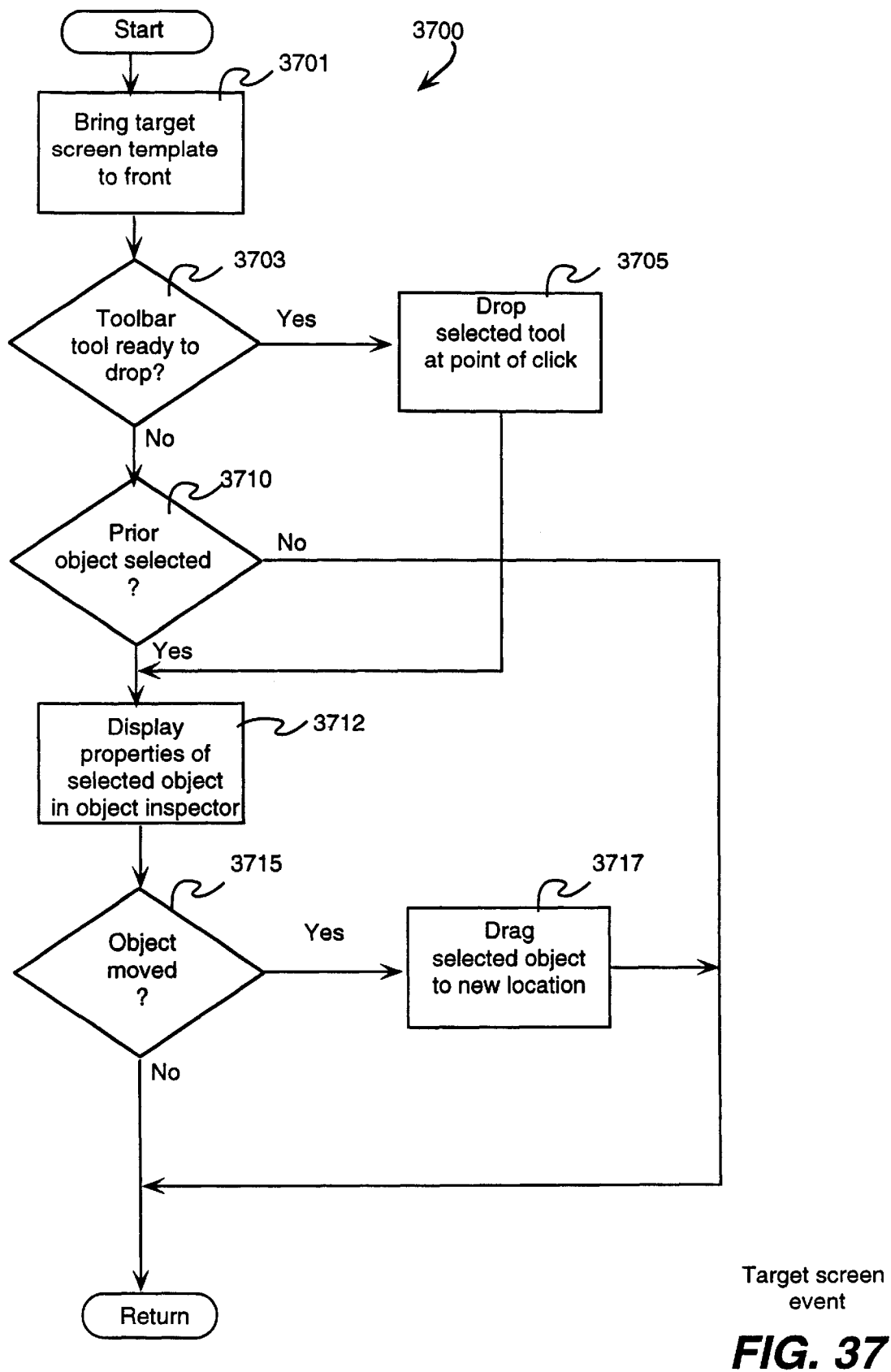
FIG. 37 is a flow diagram of the preferred target screen display event handler in the developer environment.

FIG. 37 illustrates the preferred target screen event process 3700. Starting at step 3701, the first action taken is to bring the target screen template 505 (FIG. 8) to the front of the display, if it is not already.

Control passes to decision 3703, where an inquiry is made whether a toolbar tool is ready to drop. After the discussion in conjunction with FIG. 40, it will be understood that if the user has selected a parameter-associated user control, the system may be enabled to generate the appropriate parameter-associated control at a predetermined location on the target screen template when the developer clicks at a certain location. This signifies that a toolbar tool has been selected and is ready to drop. If so, control passes to 3705, and the selected tool is dropped at the point of the click. In other words, the selected user control is placed in the target screen display at the location of the click. Control then passes to step 3712, and the properties of the selected user control object are displayed in the object inspector.

Returning to decision 3703, if a toolbar tool is not ready to drop, the inquiry is made at decision 3710 whether a prior object has been selected. A prior object for purposes of this discussion is any previously-created user control object that is displayed in the display template area. If not, the target screen event process terminates. If so, control passes to step 3712, and the properties of the selected object are displayed in the object inspector region. Control then passes to decision 3715, where the inquiry is made whether the selected object (prior or new) has been moved by the developer. If so, control passes to 3717, and the selected object is moved to a new location, in the known manner in the windows 95 operating system. The target screen event handling process then returns control to a prior process.

Figure 38:
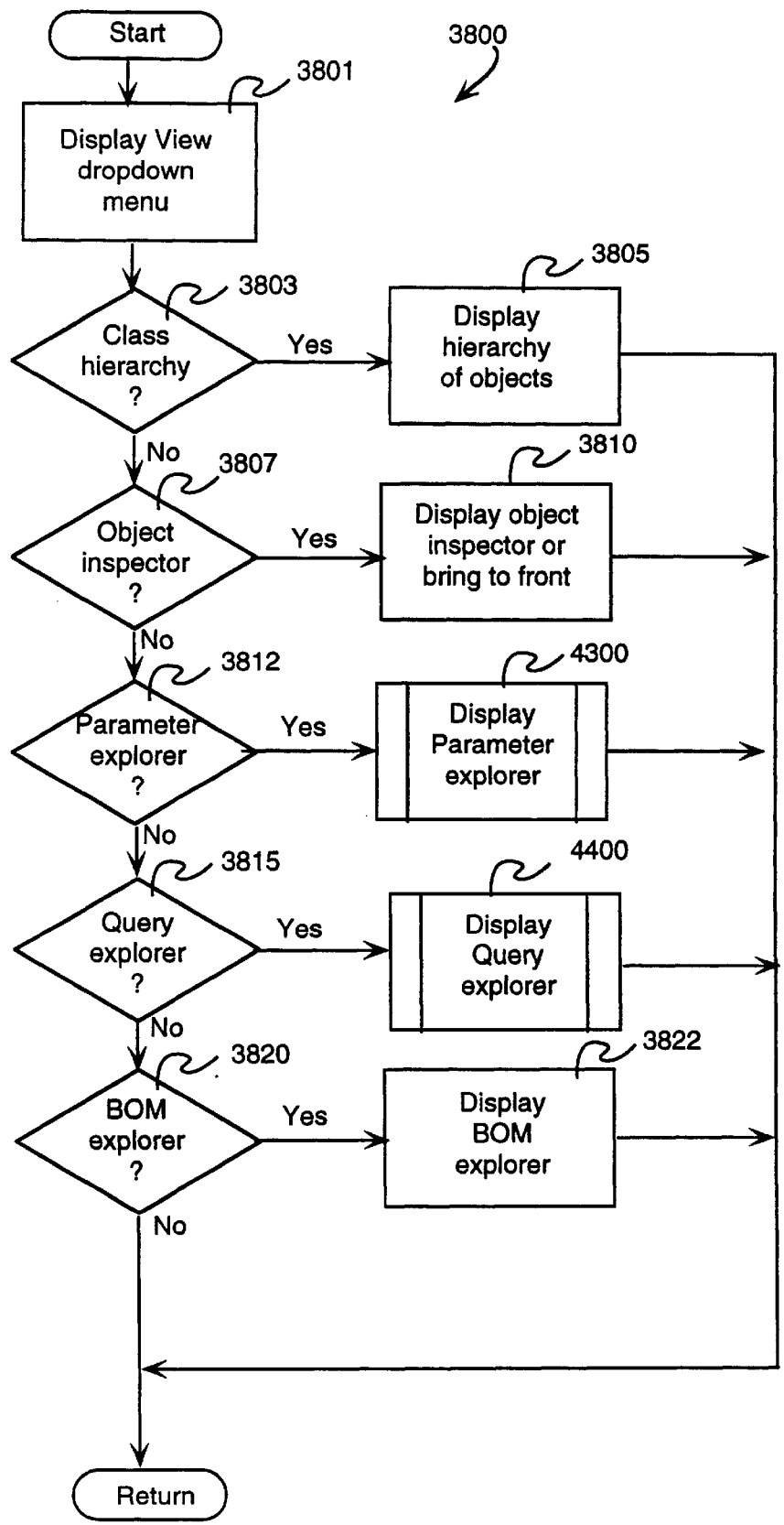
FIG. 38 is a flow diagram of the preferred View menu event handling process.

FIG. 38 illustrates the preferred process 3800 that is executed in response to the developer's activation of a View menu command, such as shown at 1604 as shown in FIG. 16A. Starting at step 3801, the first action taken is to display the View drop down menu 1604 (FIG. 16A). At decision 3803, the test is made whether the developer has selected the Class hierarchy command. If so, process 3805 is executed to display the hierarchy of objects that are available for the developer's utilization in the preferred DELPHI development environment.

At decision 3807, the test is made whether the Object Inspector command has been selected. If so, process 3810 is carried out to display the Object Inspector or to bring the Object Inspector window to the front in the known manner.

At decision 3812, inquiry is made whether the Earameter Explorer has been selected. If so, process 4300 is executed to display the Parameter Explorer window. Steps associated with this process are described in connection with FIG. 43.

At decision 3815, inquiry is made whether the developer has selected the Query Explorer command. If so, process 4400 is executed to display the Query Explorer window. Steps associated with displaying the Query Explorer are described in conjunction with FIG. 44.

Finally, at decision 3820, the inquiry is made whether the Bill of Materials (BOM) Explorer command has been selected. If so, process 3822 is carried out to display a BOM Explorer. For purposes of this discussion, the BOM Explorer is a window of information associated with a bill of materials that is generated in the preferred configurator program module constructed in accordance with the present invention, in response to user input of information about a specific product configuration of interest.

Figure 39:
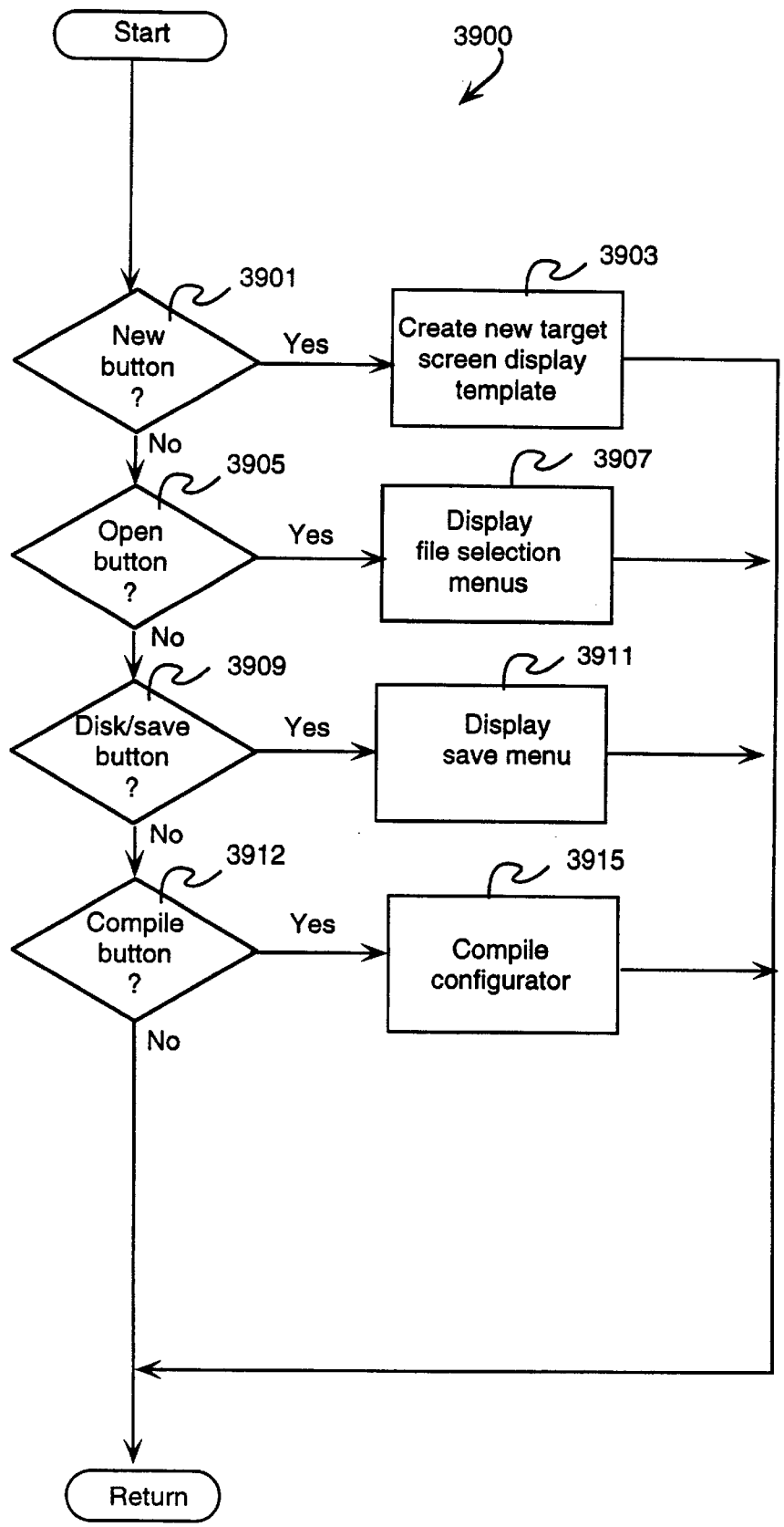
FIG. 39 is a flow diagram of the preferred File command event handling process.

FIG. 39 illustrates the steps of the process 3900 for handling a File command event. A File command is one of the system commands that can be activated by the user's entry of a command under the File menu 803 (FIG. 8), or by clicking one of the file command buttons 809, 811, 817, 820. These commands include a "new" command, an "open" command, a "save" command, and a "compile" command.

Starting at decision 3901, the command is tested is to determine whether the new button 809 or command has been activated. If so, process 3903 is executed to create a new target screen display template such as that shown at 505 in FIG. 8.

At decision 3905, the command is tested to determine whether the developer has issued a open command, or clicked the open button 811. If so, process 3907 is executed to display the file selection menus for opening a prestored file, in the known manner.

At decision 3909, the command is tested to determine whether the developer has selected the save command or clicked the save button 817. If so, process. 3911 is executed to display a "save" menu known to those skilled in the art for saving the current configuration program module file.

Finally, at decision 3912, the command is tested to determine whether the developer has pressed the "compile" button 820 or issued a compile command. If so, process 3915 is carried out to compile the configurator and generate the executable configuration software program module constructed in accordance with the present invention. This is the output of the preferred development environment as has been discussed, and is operative in the manner as has been constructed by the developer.

Figure 40:
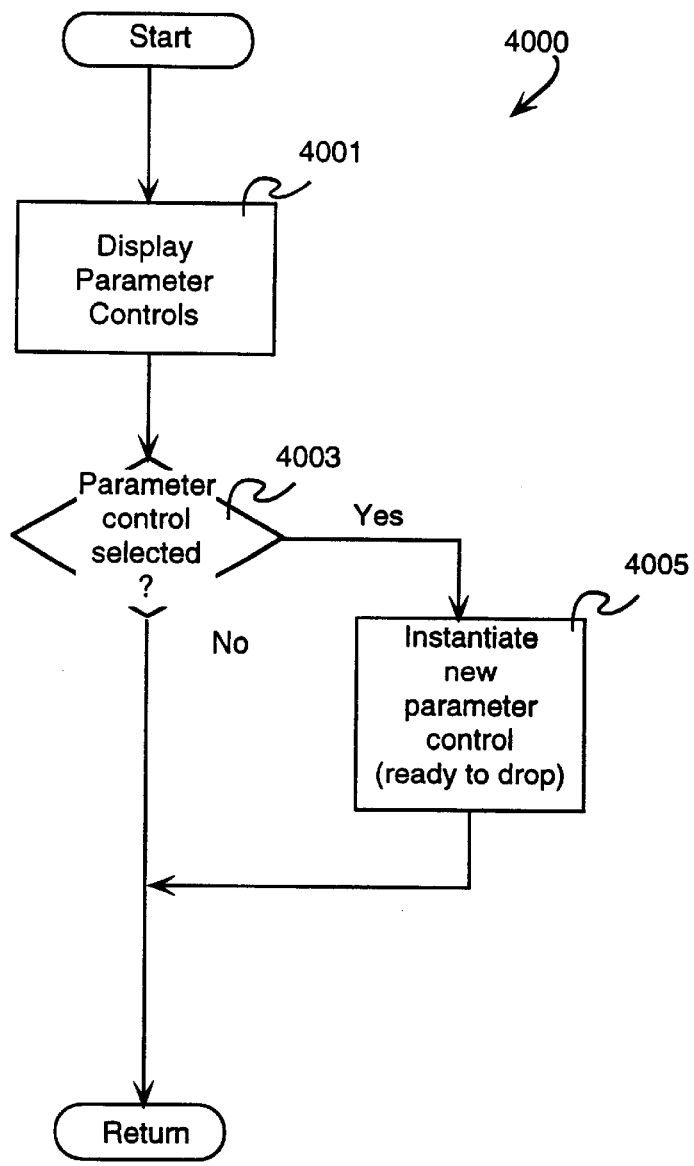
FIG. 40 is a flow diagram of the preferred parameter-associated user control event handling process.

FIG. 40 illustrates the process 4000 for executing a parameter control command on one of the toolbar events described in conjunction with FIG. 35. It is assumed for process 4000 that the developer has activated the Parameter Controls tab 806 so as to display a selectable plurality of parameter-associated user control such as check boxes, text edit boxes, radio buttons, and the like.

Starting at step 4001, the system displays the parameter-related controls in the toolbar region, as shown at 520 and generally at 910 in FIG. 9. Control passes to decision 4003 to determine if the developer has selected a particular parameter control. If so, control passes to step 4005, and a new parameter control object is instantiated and is made ready to drop upon in response to the user's clicking in the display template region 505. This is illustrated in conjunction with FIG. 9, where the check box type user control 902 is shown dropped in response to a prior selection of the check box user control that is parameter-associated 520. Control then passes back to a calling process.

Figure 41:
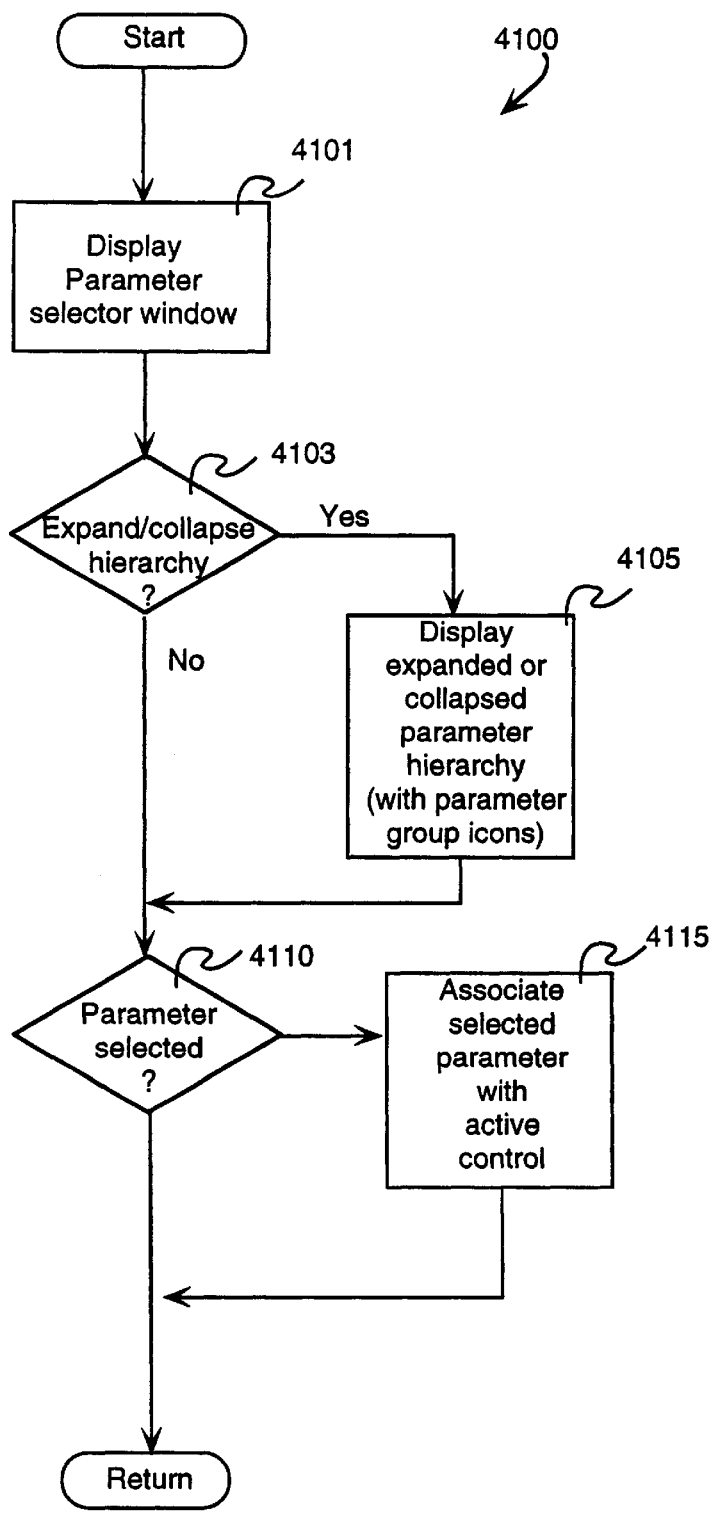
FIG. 41 is a flow diagram of the preferred parameter selector event handling process.

FIG. 41 illustrates the process 4100 that is carried out in response to a user command to display the parameter selector window, such as that shown at 1001 in FIG. 10. Starting at step 4101, the first action taken is to display the parameter selector window. Control passes to decision 4103, and the inquiry is made whether the developer has clicked one of the group icons or issued a command by clicking one of the expand/collapse buttons 1015 in the parameter selector window 1001, indicating a command to expand or collapse the hierarchy of parameters. If so, control passes to step 4105, and the system displays an expanded or collapsed parameter hierarchy, with parameter group icons. A full example of this type of expanded display is shown in FIG. 12.

At decision 4110, the inquiry is made whether a particular parameter displayed in the parameter selector window had been selected by the developer. If so, control passes to step 4115, and the selected parameter is associated with the particular active user control. An example of this was provided in FIG. 11 and FIG. 12. It will be recalled that this particular sequence of actions is only activated when the user has selected a parameter-associated user control and previously highlighted the parameter property in the object inspector window 906. Thus, the selected parameter is now associated with the active user control, in the manner of the present invention.

Figure 42:
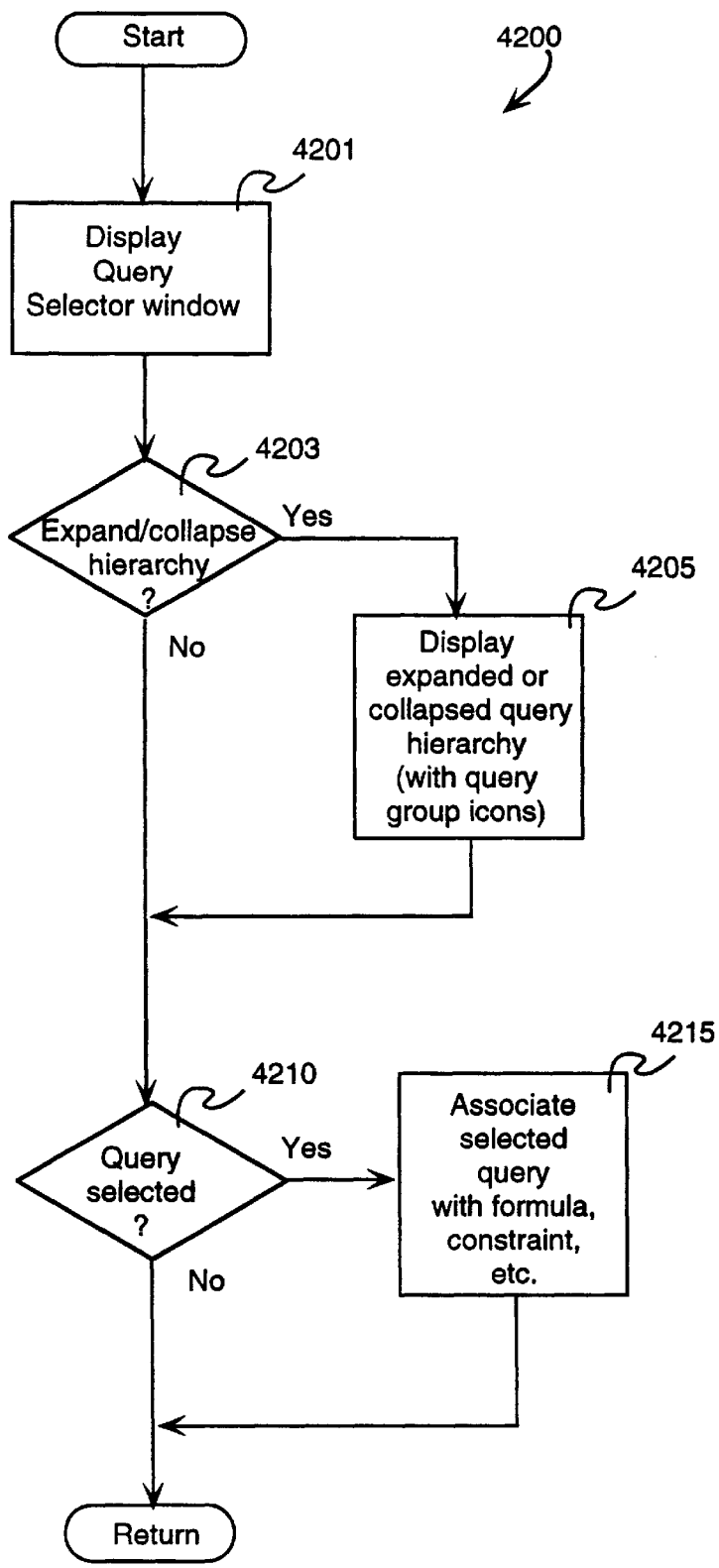
FIG. 42 is a flow diagram of the preferred query selector event handling process.

FIG. 42 illustrates the process 4200 that is carried out to display the query selector window in response to the developer's activation of the selector box of a query object, such as the query constraint 1622 shown in FIG. 16A. It is assumed that the developer has at this point previously selected a query-associated object and activated the selector box at step 3624 in FIG. 36.

Starting at step 4201, the first action taken is to display a query selector window such as that shown at 1650 in FIG. 16A. A query selector window has the same form as that shown with the parameter selector window, but displays a list of predetermined and precreated external database queries (SQL queries) that have been created in prior operations by the developer. A query from the query selector 1650, e.g. SoundSystem 1660, would be placed into the Query property 1632 of the selected query-associated object, namely, the query constraint 1622, all as shown in FIG. 16A. In the example of FIG. 16A, the particular query denominated "Queries.Quark.Interior.SoundSystem" is indicated as having previously been selected via the query selector window.

At decision 4203, the inquiry is made whether the hierarchy of queries is to be expanded or collapsed by user command. If so, control passes to step 4205, and the system displays an expanded or collapsed query hierarchy, in association with query group icons that allow the developer to create meaningful organizational labels for various types of queries. This organizational scheme is presented in a form similar to the parameter selector previously described.

At decision 4210, the inquiry is made whether a particular query displayed in the query selector window has been selected. If so, control passes to process 4215, and the selected query is associated with the appropriate formula, constraint, or other element that utilizes a query in the present invention. In this manner, a query is associated with various types of control elements that make use of queries, such as constraints that are applied to parameters or that are utilized in formulas.

Figure 43:
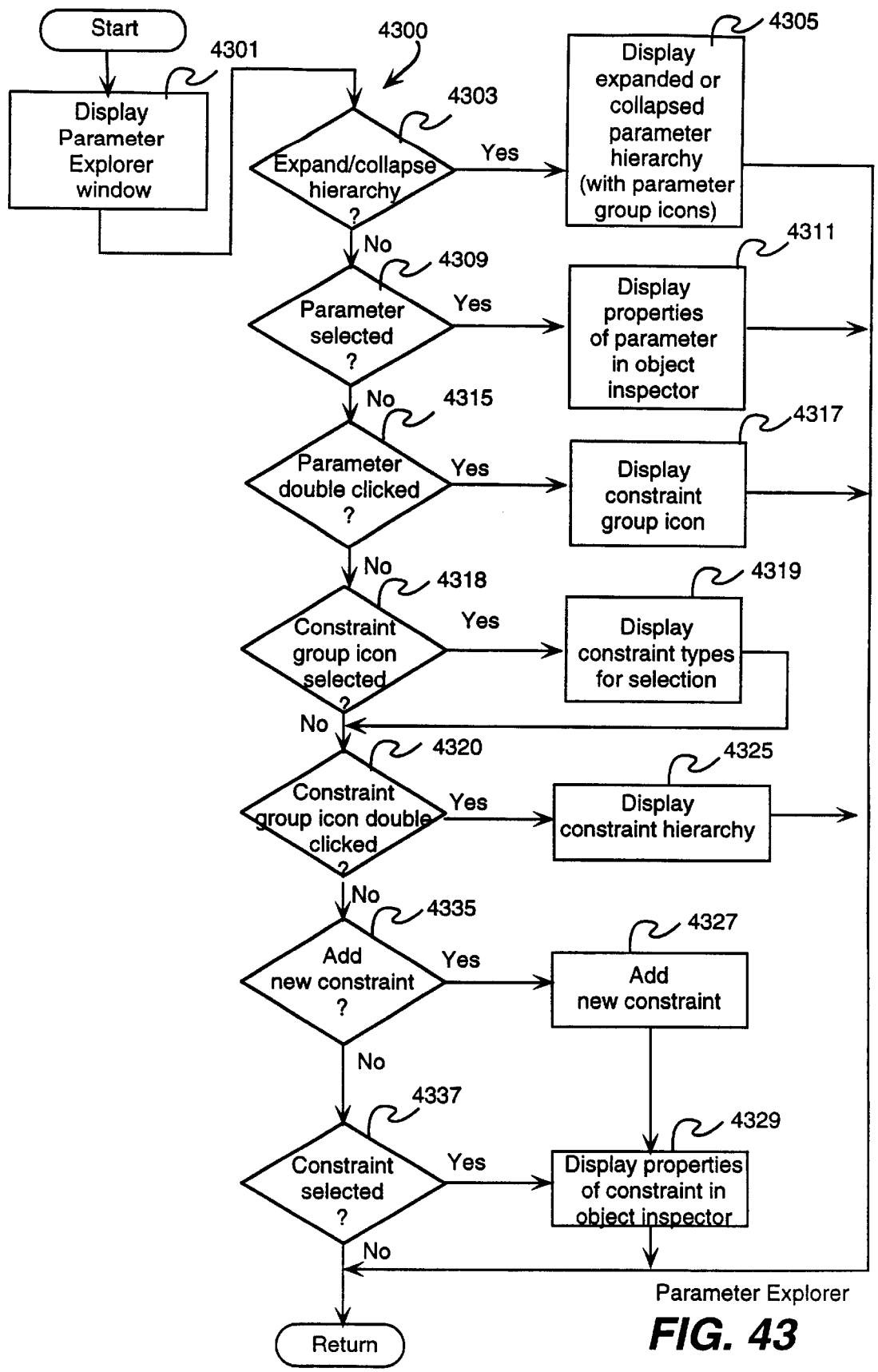
FIG. 43 is a flow diagram of the preferred Parameter Explorer event handling process.

FIG. 43 illustrates the process 4300 that is carried out in response to a developer command to display a Parameter Explorer window. Starting at step 4301, the first action taken is to display the Parameter Explorer window, such as that shown in 1603 in FIG. 16A. It will be recalled that the Parameter Explorer window is user interface is provided in the present invention to provide for creation and maintenance of parameters, with hierarchical display, and accessibility to constraints that are applied to parameters as previously described.

At decision 4303, the inquiry is made whether the developer has issued a command to expand or collapse the hierarchy of parameters, e.g. with tools 1605. If so, control passes to process 4305, and the system displays an expanded or collapsed parameter hierarchy, showing the parameter group icon as shown in FIG. 16A if expanded. At decision 4309, the inquiry is made whether the developer has selected a particular parameter. If so, at step 4311 the properties of the selected parameter object are displayed in the object inspector 503. At decision 4315, the inquiry is made whether a particular parameter has been double-clicked, which is the method provided in the preferred embodiment of the present invention for causing display of constraints associated with a particular parameter, although other methods will occur to those skilled in the art. If so, process 4317 is executed to display constraint icons in a hierarchical fashion as shown in FIG. 16A and FIG. 21A.

At decision 4318, the inquiry is made whether a displayed constraint group icon has been selected. For example, the constraint group icon 2140 is shown selected in FIG. 21A. If so, step 4319 is carried out, and the Parameter Explorer window display is modified to include the selectable constraint types. This is shown at 2142 in FIG. 21A. The developer can then click on one of the constraint type icons, as described in connection with FIG. 5, to add a new constraint in association with the parameter. Control then passes to decision 4320.

At decision 4320, the inquiry is made whether a displayed constraint group icon has been double clicked or a command issued to expand or collapse the constraint hierarchy. If so, step 4325 is executed to display the hierarchy of constraints, such as shown at 1622, 1624, 1626 in FIG. 16A and 1630, 1632 in FIG. 21A.

At step 4329, the inquiry is made whether a command has issued to add a new constraint. Adding a new constraint is possible only if the constraint icon was previously selected, yielding a display of the selectable constraint types as shown in FIG. 21A. If so, control also passes to step 4327 and a new constraint is to be added. From step 4327 control passes to step 4329, and the properties of the newly added constraint are displayed in the object inspector, and the process exits.

Finally at decision 4337, the inquiry is made whether a particular constraint within the Parameter Explorer window has been selected. If so, properties of the constraint are displayed in the object inspector at step 4329.

Figure 44:
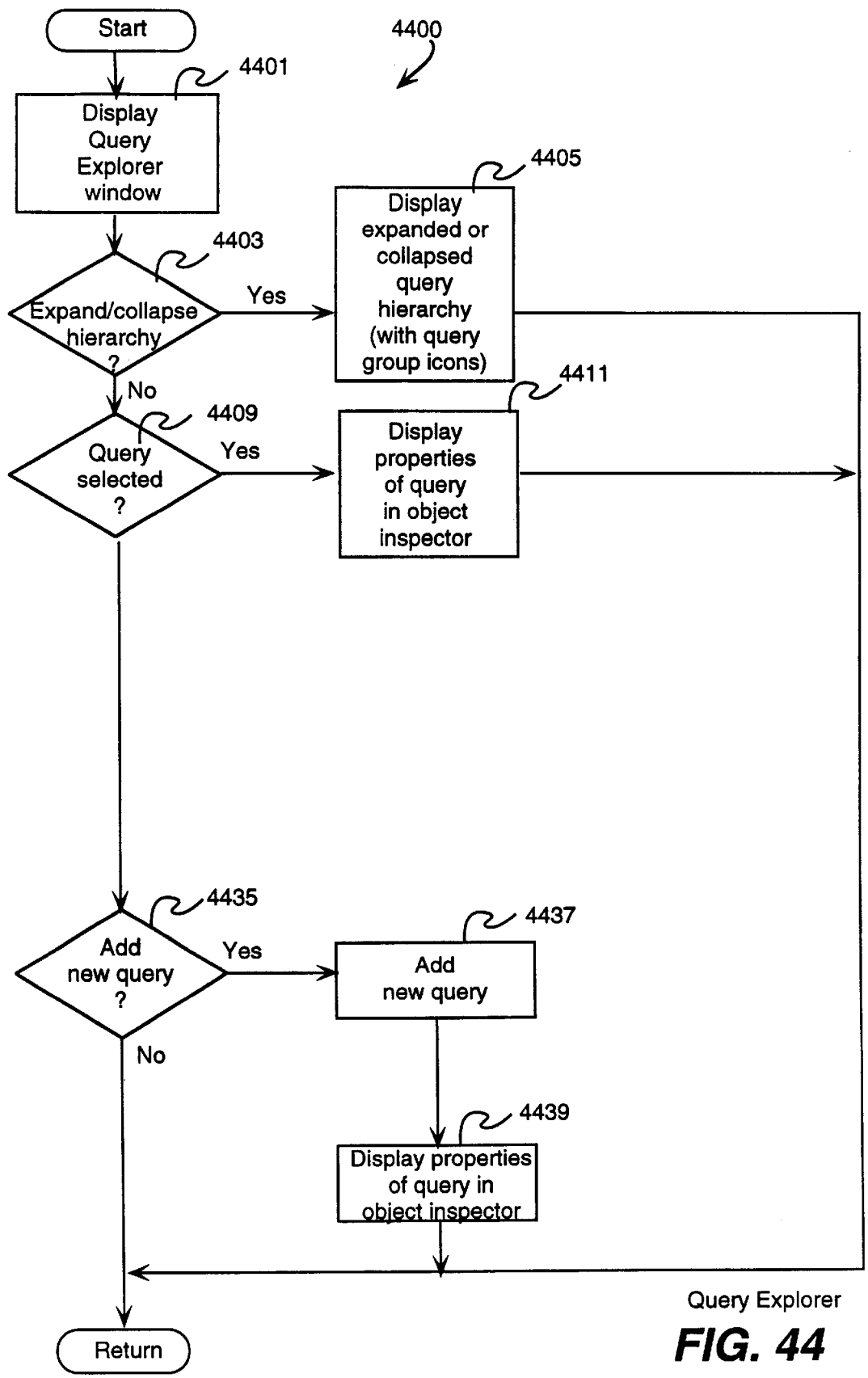
FIG. 44 is a flow diagram of the preferred Query Explorer event handling process.

FIG. 44 illustrates the process 4400 that is carried out in response to a developer command to display a Query Explorer window. An example of the Query Explorer window is shown at 1670 in FIG. 16B, and the reader is referred to this figure in connection with this discussion. It will be recalled that the Query Explorer window is the preferred developer interface provided in the present invention to provide for creation and maintenance of queries, with hierarchical display, and accessibility to queries that are applied to constraints as previously described. Queries, it will is be understood, are the mechanism provided in the preferred embodiment for accessing data provided in external tables or external databases, so as to allow a configuration program module constructed with the present invention to bring in new information without requiring that the information be embedded within the compiled configuration program module.

Starting at step 4401, the first action taken is to display the Query Explorer window, or bring the window to the front. At decision 4403, the inquiry is made whether the developer has issued a command to expand or collapse the hierarchy of queries. If so, control passes to process 4405, and the system displays an expanded or collapsed query hierarchy, showing the query group icon such as 1676 shown in FIG. 16B.

At decision 4409, the inquiry is made whether the developer has selected a particular query. If so, at step 4411 properties of the selected query are displayed in the object inspector 503.

At decision 4435, the inquiry is made whether a new query command has been issued by the developer. In the preferred embodiment, a new query is added in response to the developer's clicking on the "Q" icon 1690 which will be displayed in the Query Explorer window when a query group icon such as 1676 is selected. If so, control passes to step 4437 and a new query is added. The developer can call up a query editor window such as that shown at 1680 in FIG. 16B for creation and editing of SQL queries. From step 4437 control passes to step 4439, and the properties of the new query are displayed in the object inspector, and the process exits.

Figure 45:
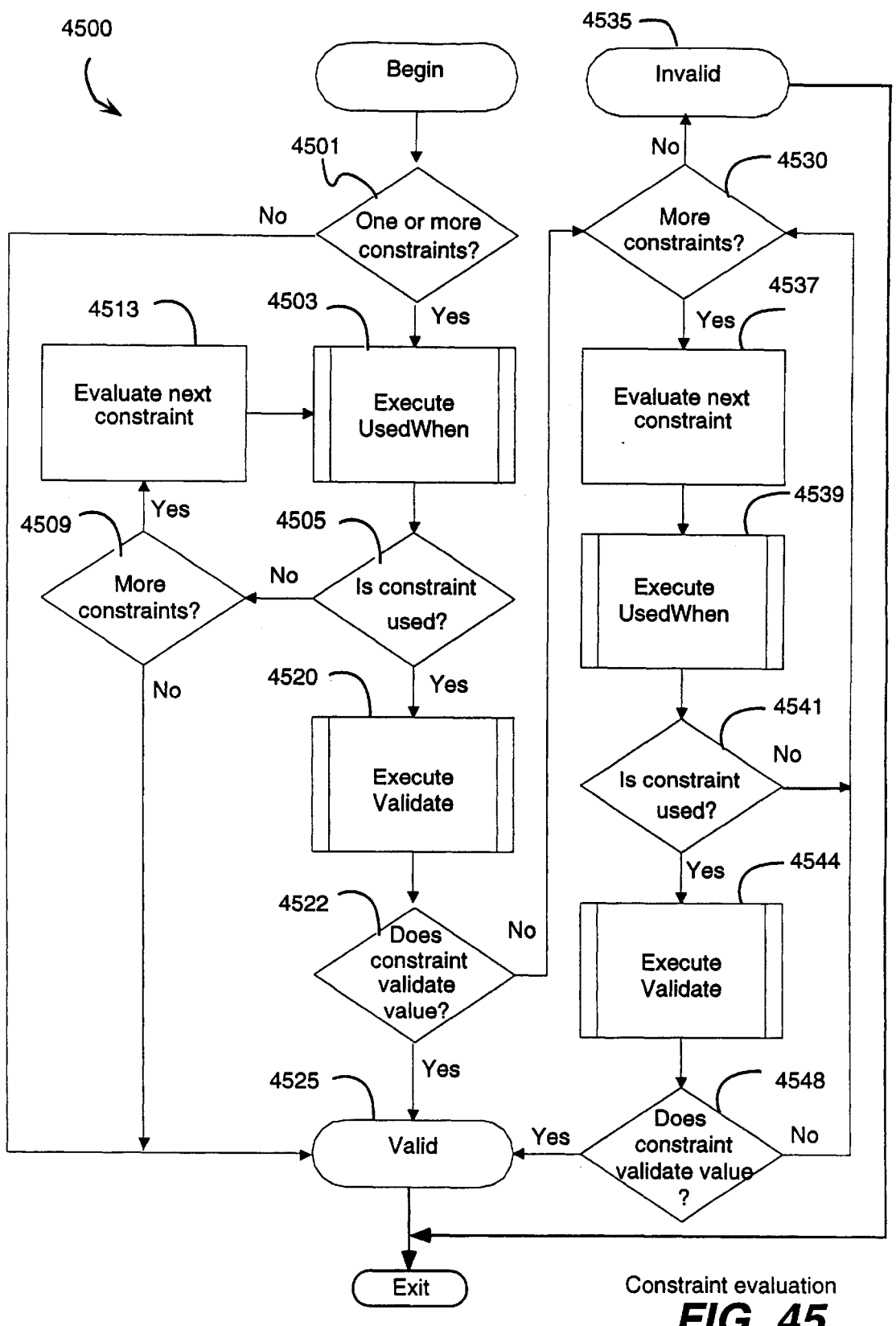
FIG. 45 is a flow diagram of the preferred constraint evaluation process carried out in a configuration program module constructed with the preferred developer environment.

FIG. 45 illustrates the process 4500 executed within a compiled configuration program module to evaluate and apply constraints to a parameter, for purposes of determining whether constraints result in a valid or invalid condition for a parameter, as well as determine the values that a parameter can assume and the conditions for applying a constraint to parameter. It will be understood that the steps shown in FIG. 45 are executed within the compiled configuration program module each time that a user, not a developer, of the compiled configuration program module provides information input to the configuration program by activating a user control such as checking a check box, entering text into an edit box, activating a radio button, etc.

Starting at 4501, the first inquiry made is whether there are one or more constraints associated with a particular parameter whose value is being evaluated in response to input of information by a user of the compiled configuration program module. If so, control passes to process 4503. Process 4503 results in the execution of the conditions set forth in the "UsedWhen" property of the constraint. It will be recalled from previous discussion that the UsedWhen property, as shown at 1634 in FIG. 16A, determines conditions for applying constraints. These properties are shown for the various types of constraints at 1634 for a query constraint (FIG. 16A), 1734 for a discrete constraint (FIG. 17), 1834 for a string list constraint (FIG. 18), 2134 for a range constraint (FIG. 21), and 2310 for a formula constraint (FIG. 23). Further, it will be recalled from the discussion in conjunction with FIG. 20 how this conditional logic is employed by the UsedWhen property for application of a constraint to a parameter.

After process 4503, the inquiry is made at decision 4505 whether the particular constraint is used. If not, control passes to decision 4509, and the inquiry made whether there are more constraints associated with the particular parameter. It will be recalled that a number of constraints can be applied to a given parameter, such as the constraints 1622, 1624, 1626, all of which are applied to the selected SoundSystem parameter 1608 in FIG. 16A. If there are more constraints, control passes to step 4513, the next constraint is evaluated, and control returns to process 4503. If there are no more constraints at this point, the no branch is taken from decision 4509 and the process executes. In this case, a Valid condition for the parameter being evaluated is indicated, as no constraints have been applied that might cause the condition to be invalid.

Return new to step 4505 where the inquiry is made whether a constraint is used. If so, the yes branch is taken to process 4520, and a validate process is executed to determine whether the application of the particular constraint validates the associated parameter or results in an invalid condition. This results from evaluation of any formulas or other computations in conjunction with the constraint.

At decision 4522, if the constraint validates the parameter, the yes branch is taken to step 4525, and the process exits with an indication of a valid condition. If not, the no branch is taken to decision 4530, and the inquiry is made whether there are more constraints to be applied to this parameter. If not, the no branch is taken to step 4535, and an invalid condition is indicated.

An invalid condition is indicated at this stage because it has been determined that a particular constraint is to be employed, but such constraint did not result in validating the associated parameter, and there are no more constraints that might further affect the validity or invalidity of the parameter. In this case, an invalid condition is indicated for the parameter.

However, if there are more constraints that might result in validation of the parameter, the yes branch is taken from decision 4530 to step 4537. Here, the next constraint is evaluated, and at process 4539 the UsedWhen condition of the constraint is evaluated in a manner as described above. At decision 4541, an inquiry is made whether the constraint being evaluated has been used. If not, the program loops back to 4530. If at decision 4541 the constraint is used, control passes to step 4544, and the Execute Validate process, similar to that of step 4520, is executed. The next step is 4548, and the inquiry made whether the constraint being evaluated validates the parameter. If so, the parameter assumes a valid condition at 4525 and the process exits. On the other hand, if not, control returns to step 4530 and further inquiries are made whether there are more constraints that might validate the parameter.

From the foregoing, those skilled in the art will appreciate that the preceding steps allow the very quick determination of the effect of the input of information via a user control in the executed configuration program module.

Finally, it will be understood that the preferred embodiment has been disclosed by way of example, and that other modifications may occur to those skilled in the art without departing from the scope and spirit of the appended claims.

What is claimed is:

1. A method for configuration software operative to carry out configuration computations for configuring a product or service from at least one selectable component based on information provided by a user during a configuration session, comprising the steps of:

providing a plurality of configuration parameters that each assume a value in a configuration computation, each parameter being associated with a visual control, with one or more visual controls being associated with one or more visual control groups;

providing a display of configuration computation results including a display of the visual controls and the visual control groups;

providing a constraint for application to a configuration parameter;

receiving user input during the configuration session that affects the parameter;

providing a condition for application of the constraint to the parameter;

evaluating the condition to determine whether the constraint associated with the parameter is applied to the parameter;

in response to determination that the constraint is applied to the parameter, evaluating the constraint based on the user input to determine whether the constraint results in a valid or invalid state for the parameter; and in response to a determination that the constraint results in an invalid state for the parameter, visually indicating the invalid state on an associated visual control and any associated visual control groups on the display.

2. The method of claim 1, further comprising the step of not utilizing the parameter in the configuration computation if the parameter assumes an invalid state.

3. The method of claim 1, further comprising the steps of:

providing a plurality of constraints for application to the parameter; and successively applying the plurality of constraints to the parameter in an additive manner.

4. The method of claim 1, further comprising the step of, in response to a determination that the parameter has a valid state after application of the constraint, utilizing the parameter in a configuration computation.

5. The method of claim 1, wherein the step of evaluating the condition comprises evaluation of a conditional logic expression.

6. The method of claim 1, wherein user input is provided during the configuration session by the user's activation of a user control selected from the group comprising checking a selectable check box, entering text into an edit box, or activating a radio button.

7. The method of claim 1, wherein the constraint is selected from the group consisting of a discrete constraint, a string list constraint, a formula constraint, a query constraint, and a range constraint.

* * * * *